United States Patent [19]

Bennett et al.

[11] 4,096,568

[45] Jun. 20, 1978

[54] VIRTUAL ADDRESS TRANSLATOR

[75] Inventors: Donald Bruce Bennett, Burnsville; Leo John Slechta, Jr., Minneapolis; Thomas Ormond Wolff, Fridley, all of Minn.

[73] Assignee: Sperry Rand Corporation, New York, N.Y.

[21] Appl. No.: 726,371

[22] Filed: Sep. 24, 1976

[51] Int. Cl.² .......................... G06F 9/20; G06F 13/00
[52] U.S. Cl. ..................................................... 364/200
[58] Field of Search ........................ 364/200 MS File

[56] References Cited

U.S. PATENT DOCUMENTS

| 3,412,382 | 11/1968 | Couleur et al. | 340/172.5 |
|---|---|---|---|
| 3,768,080 | 10/1973 | Boger et al. | 340/172.5 |
| 3,800,286 | 3/1974 | Brown et al. | 340/172.5 |
| 3,938,100 | 2/1976 | Steiner | 340/172.5 |
| 3,976,977 | 8/1976 | Porter et al. | 340/172.5 |
| 3,979,726 | 9/1976 | Lange et al. | 340/172.5 |

*Primary Examiner*—Raulfe B. Zache
*Attorney, Agent, or Firm*—Griffin, Branigan and Butler

[57] ABSTRACT

A virtual address translator comprises a content addressed memory and a word addressed memory. A task name and subsegment number from a virtual address supplied by a processor are employed as a key word to search a content addressed memory and read out a subsegment descriptor if the key word is matched. The subsegment descriptor includes an absolute base address which is added to a deflection field to obtain an absolute memory address. The memory address is applied to a memory to permit transfer of a word between the processor and the memory. The processor may present any one of several task names depending upon whether the memory reference is made for an instruction or data for the processor, or for an instruction or data for an I/O connected to the processor. Bounds, residency and access privileges are checked using the subsegment descriptor. If a search of the content addressed memory reveals that the desired subsegment descriptor is not in the word addressed memory, the translator obtains the descriptor from memory and then generates the desired absolute memory address. The translator is provided with circuits generating values which indicate the efficiency of its operation. Controls are provided for selecting any one of several widths for the subsegment and deflection fields of virtual addresses received from the processor.

6 Claims, 52 Drawing Figures

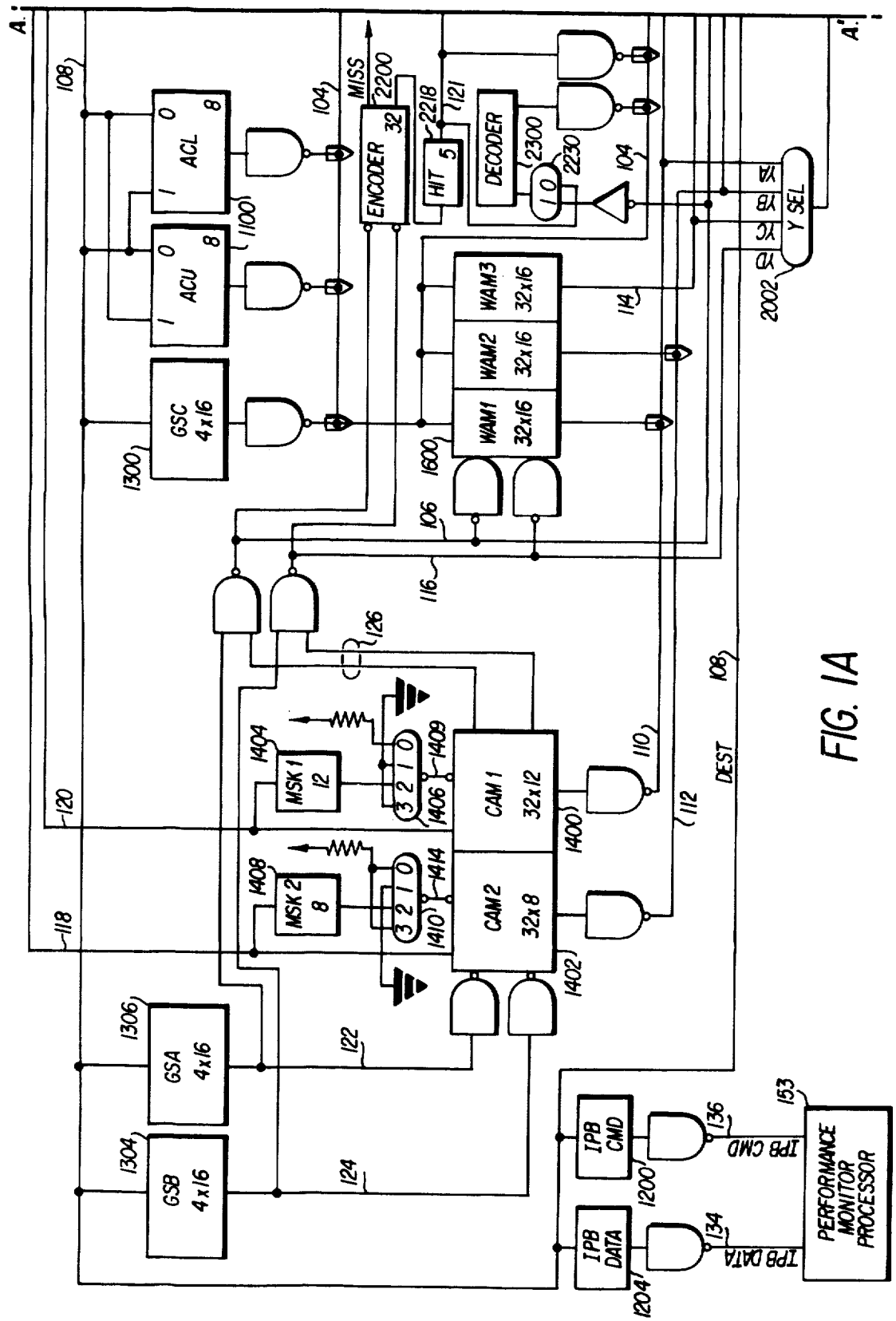

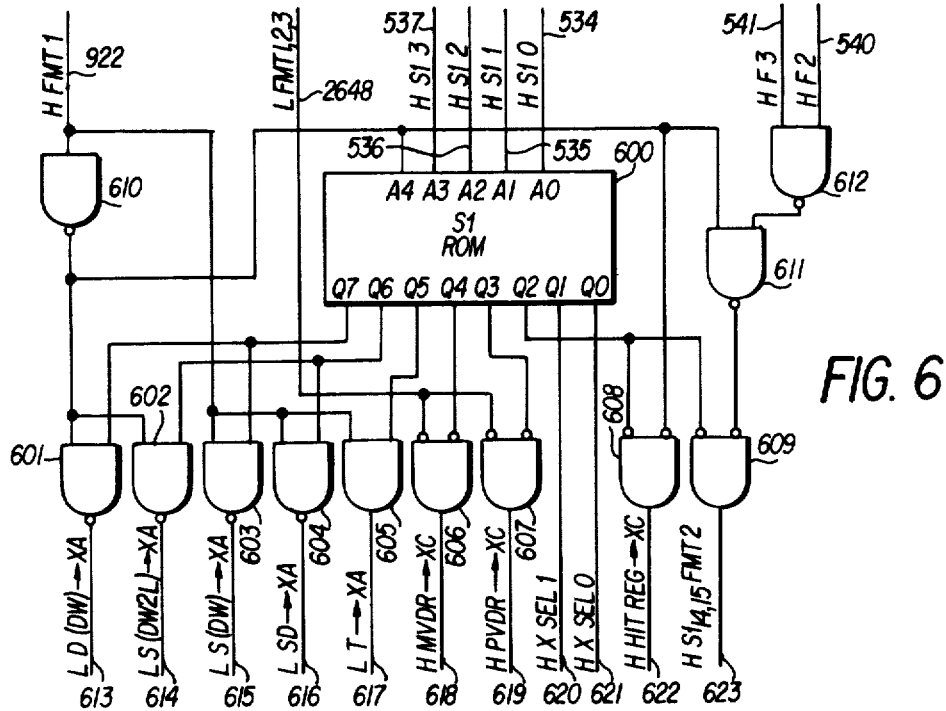
FIG. 6
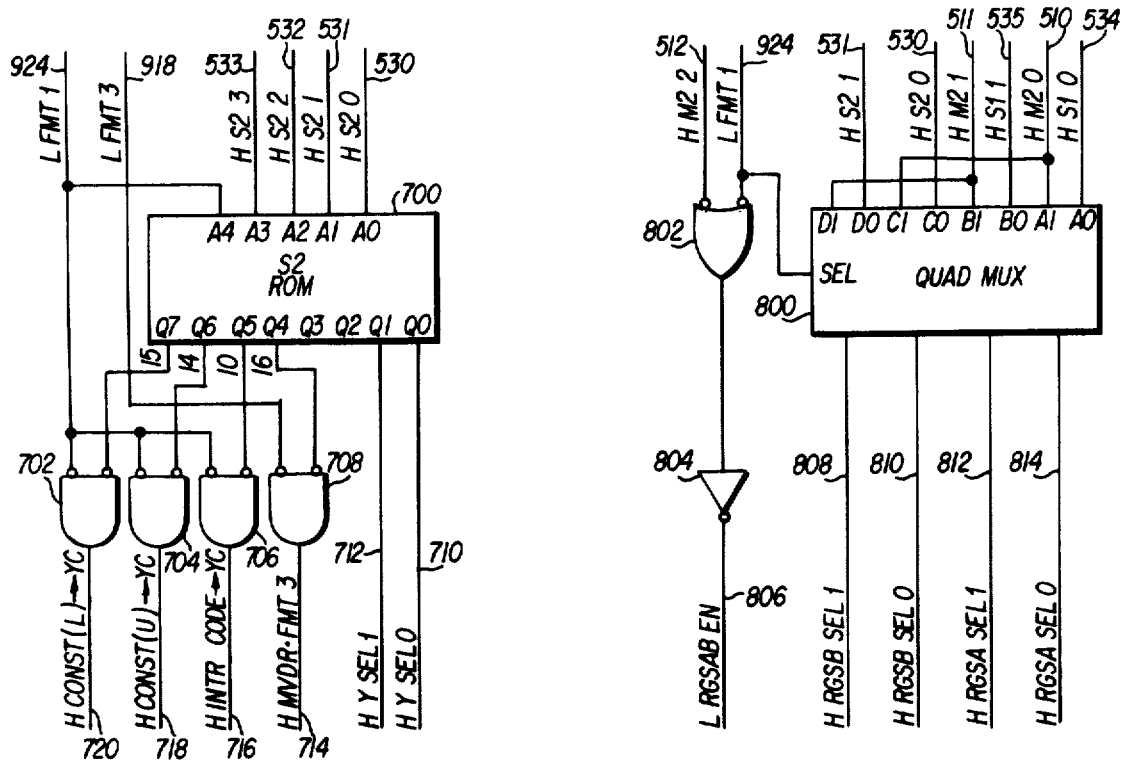
FIG. 7
FIG. 8A

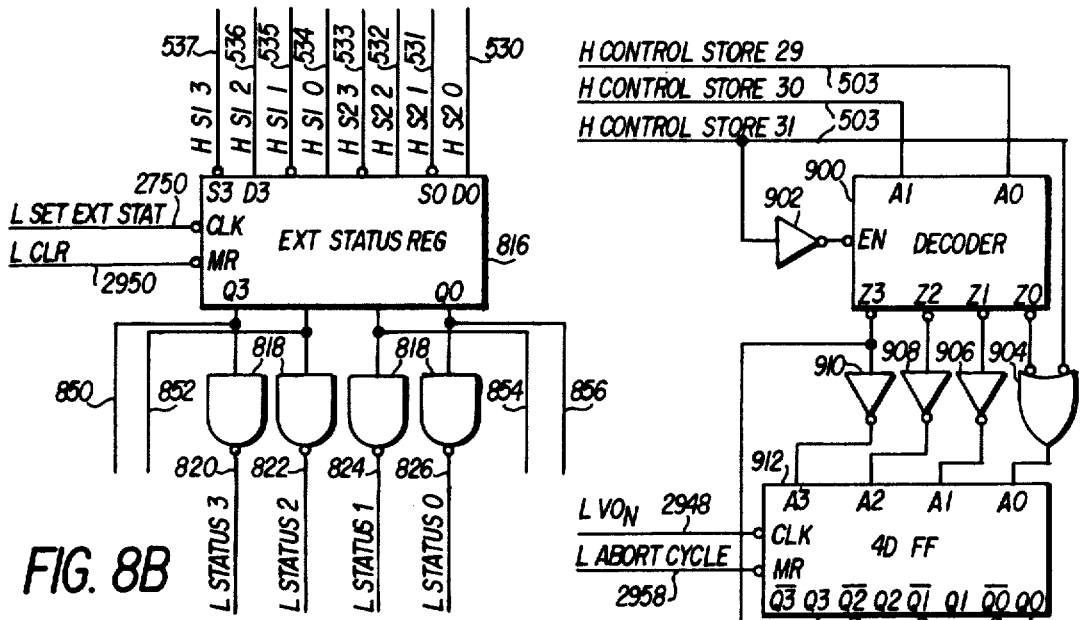
FIG. 8B
FIG. 9
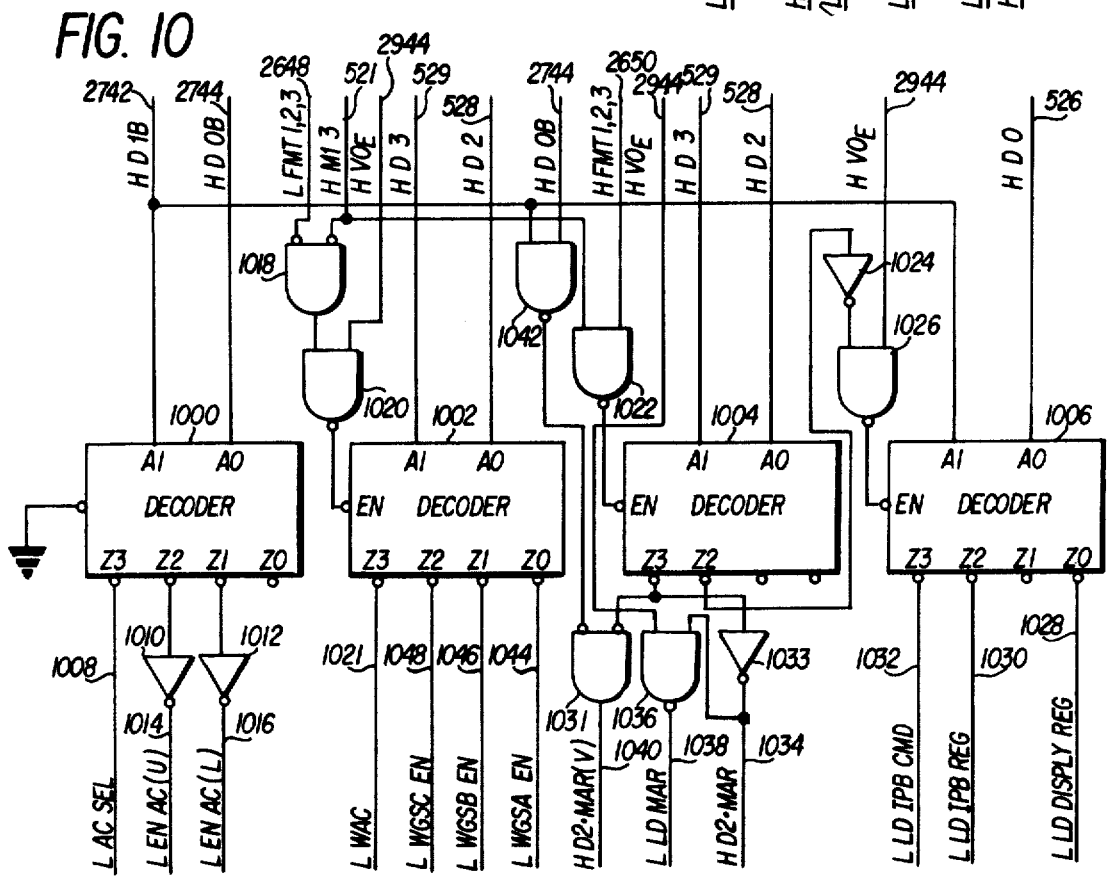
FIG. 10

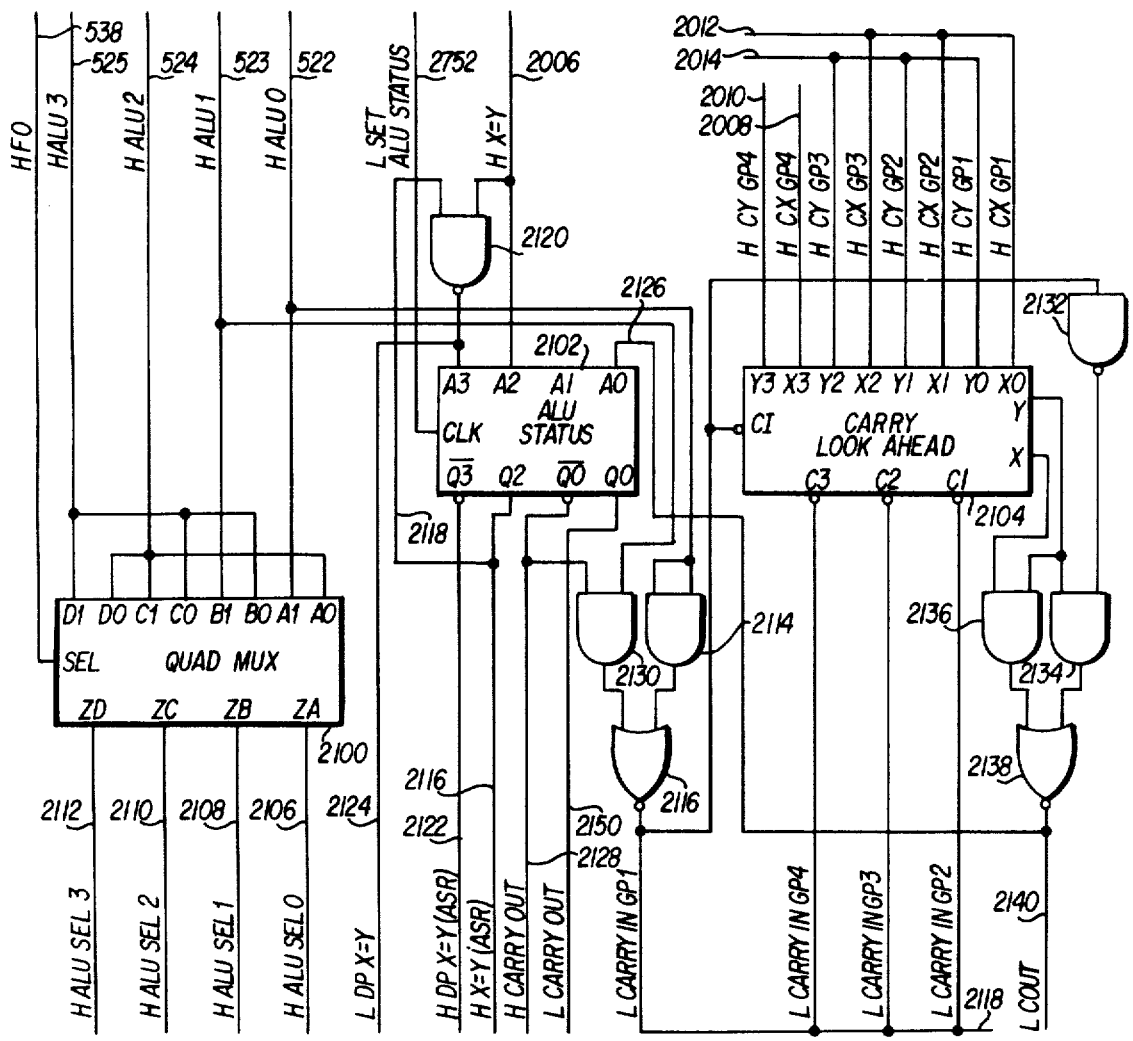
FIG. 21
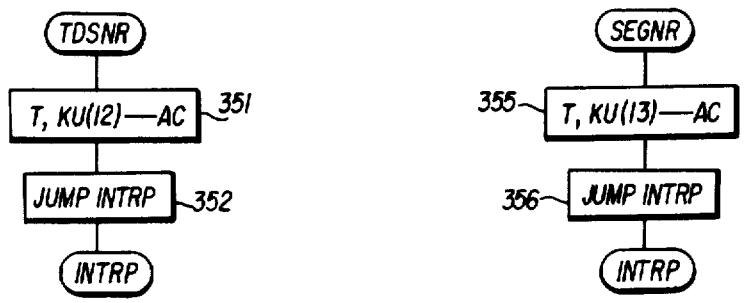
FIG. 38
FIG. 39

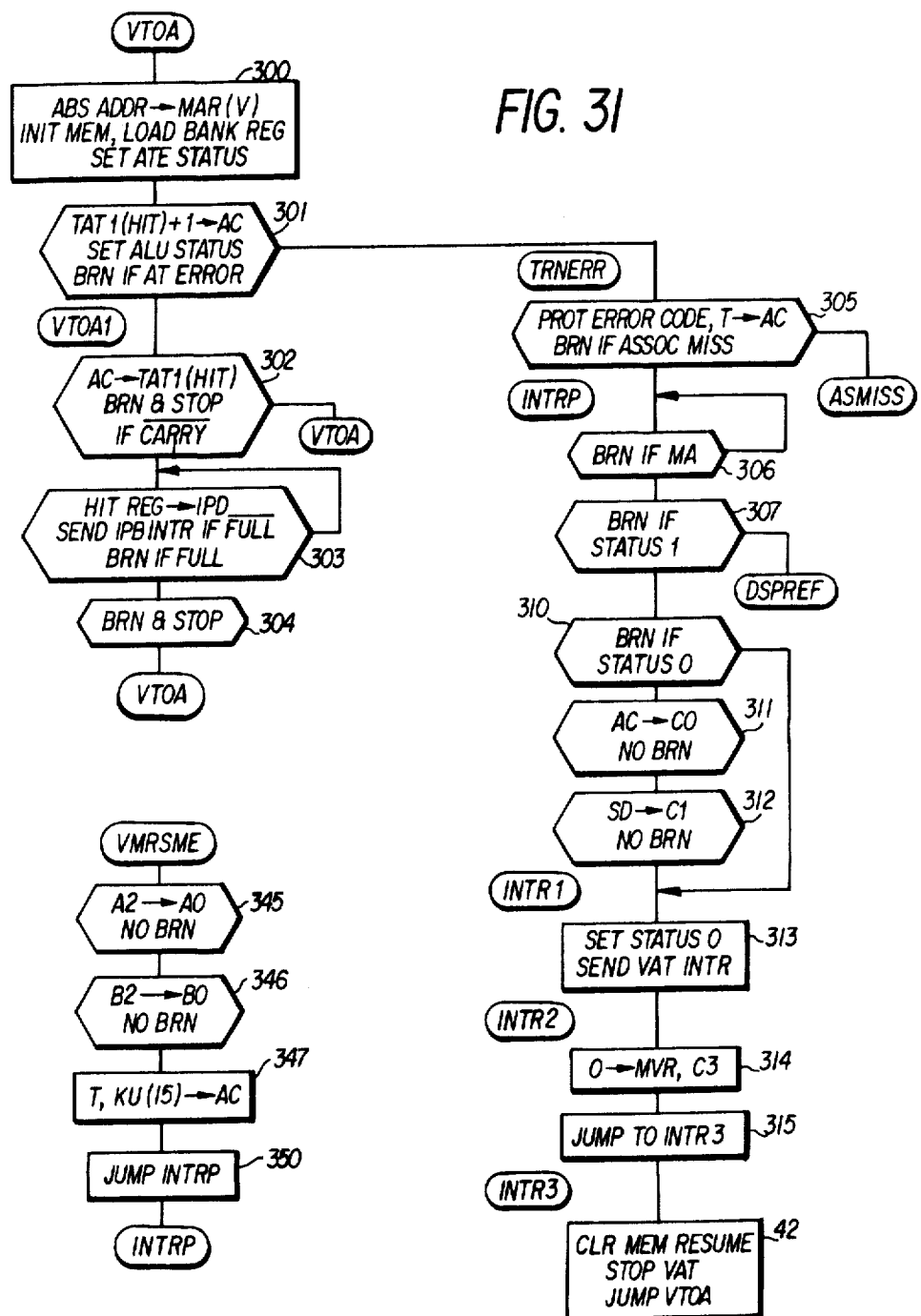

| F | S1 | S2 | D | ALU | M1 | M2.2 | M2.1 |
|---|---|---|---|---|---|---|---|
| 31  28 | 27  24 | 23  20 | 19  16 | 15  12 | 11  8 | 7  6 | 5  0 |

FORMAT 1, 2, OR 3

FIG. 41

| F | S1 | S2 | D | ALU | M1 | M2 |
|---|---|---|---|---|---|---|
| 31  28 | 27  24 | 23  20 | 19  16 | 15  12 | 11  8 | 7  0 |

FORMAT 1K

FIG. 42

| F | S1 | S2 | D | ALU | M1.2 |
|---|---|---|---|---|---|
| 31  28 | 27  24 | 23  20 | 19  16 | 15  12 | 11  0 |

FORMAT 4

| T | SD |
|---|---|
| 23  16 | 15  0 |

VIRTUAL ADDRESS

FIG. 45

| DW | BANK | ABSOLUTE ADDRESS | R |
|---|---|---|---|
| 23  21 | 20  16 | 15  1 | 0 |

|← TAT 2 →|← TAT 1 →|

TAT DESCRIPTOR

FIG. 46

| R | PROTECT | BANK | BOUNDS | ABSOLUTE BASE ADDR. |
|---|---|---|---|---|
| 47 | 44  40 | 36  32 | 27  16 | 15  0 |

|← WAM3 →|← WAM2 →|← WAM1 →|

SUBSEGMENT DESCRIPTOR

VIRTUAL ADDRESS TRANSLATOR

TABLE OF CONTENTS

Background of the Invention
Summary of the Invention
Brief Description of the Drawings
  Detailed Description of the Invention
  Virtual to Absolute Address Translator
  Overall System—FIGS. 1 and 3
  Instruction Formats
    Format 1
    Formats 2 and 3
    Format 1K
    Format 4
  Micro-Program Counter
  Control Store and Instruction Register
  S1 and S2 Field Decoding
  F Field Decoding
  D Field Decoding
  General Stack Registers
  Content Addressed Memory
  Word Addressed Memory
  Task Address Table
  Virtual Address Receive Logic
  Arithmetic Logic Unit
  Associative Miss Detector and Encoder
  Binary to Linear Select Decoder
  Address Translation and Protection Checking
  Branch Control
  Clock and Memory Control Circuits
  VTOA Routine
  CP-VAT Communication
  Micro-Code Listing

BACKGROUND OF THE INVENTION

Historically, virtual memory addressing has taken several forms. While all virtual addressing schemes map virtual addresses into real memory locations and trap virtual references to non-resident addresses, the mechanics of how these goals are accomplished differ with each of the virtual addressing forms. The three most commonly used virtual addressing schemes are segmentation, paging, and a combination of segmentation and paging. While each of these virtual addressing forms has unique characteristics, they all perform address mapping and residency testing.

In a "segmented address space," address space is regarded as a collection of named "segments," each being a linear array of addresses. "Address space" is the set of identifiers that may be used by a program to reference information. In a segmented address space, the programmer references an information item by a 2-tuple address (sd) in which s is a segment name and d is a word name within the segment identified by s. For example, the address (3,5) refers to the fifth word in the third segment. Segments are variable in length and are normally characterized by the type of information they contain (i.e. procedure segments and data segments). Each segment is described by a segment descriptor which contains information on bounds (length of segment), access privileges, location in main storage (base address of segment), and a residency flag.

Each task which is to be executed is partitioned into procedure segments and data segments and a segment descriptor table is formed to hold the segment descriptors for the task. The steps involved in forming a location address from an address space (s,d) include fetching the segment descriptor and performing a mathematical addition of the base address to the d (deflection) field, while at the same time checking the bound and other access privilege bits. If a segment s is not present in memory, a missing segment fault occurs thereby interrupting program execution until s is placed in memory.

Segmentation allows efficient organization of virtual program space. Segments are variable in length, can be structured by logical content, and have powerful protection attributes. Segmentation does, however, present some storage management problems. One problem is the need for sophisticated memory management software. Since segments are variable in length, they require complicated algorithms to position them in real memory without interfering with neighboring segments when they are needed for execution. Another problem with segmentation is real memory fragmentation. Fragmentation occurs as a result of moving segments of various lengths in and out of memory, thus leaving the memory pocketed with "holes" that are too small to hold a segment. These holes represent wasted memory. Although the holes can be collected together by moving all of the segments into one contiguous region, this process requires time and programming and represents costly operating system overhead. Thus, segmentation allows efficient organization of virtual space, but poor management of real memory.

In a "paged memory," main memory is organized into equal sized blocks of locations known as page frames, which serve as sites of residence for matching-sized blocks of virtual addresses, known as pages. The page serves as the unit both of information storage and of transfer between main and auxiliary memory. Each page frame is identified by its frame address, which is the location address of the first word in the page frame. Each page is described by a page descriptor which contains the location address of its page frame and a residency flag. Page descriptors may also contain access privilege bits although this is not common practice. Bounds or limit data is superfluous for pages because pages by definition are of fixed length.

Each task which is to be executed in the system is partitioned into pages, and a page table is formed to hold the page descriptors for a task. The processor references an information item by a two-tuple address (p,d) in which p is a page name and d is a word name (also called deflection) within the page identified by p. The pth descriptor in the page table contains the page base information. The computation that generates a memory address from the page base and deflection is trivial, amount to concatenation, since the page frames start at addresses which are integral multiples of the page size. In paging, a missing page fault occurs if p is not present in memory, thereby interrupting program execution until p is placed in memory.

Paging allows efficient management of real memory. Since virtual space is partitioned into fixed size pages that just fit into real memory page frames, it is a simple task, when a page is needed for execution, to locate a page frame and transfer the required page into it. Paging does not experience real memory fragmentation as segmentation schemes do, but some real memory waste is created by partially filled pages. This condition, called intra-page fragmentation, is not nearly as severe as real memory fragmentation. Paging does, however, present some problems with virtual program space organization. Since virtual program space is partitioned into pages and since pages are structured with physical and not software constraints, it is difficult to organize virtual space along functional lines. In addition, most paging schemes lack protection hardware. Even if protection checking is available, the lack of virtual program space organizational ability makes the protection checking difficult to use. Thus, paging allows efficient management of real memory, but poor organization of virtual space.

Some prior art systems employ a virtual addressing scheme called "segmentation and paging" that attempts to combine the virtual space organizational characteristics of segmentation with the efficient memory management characteristics of paging. The scheme is essentially two-tier addressing with each address being a three-tuple requiring two table look-ups. In segmentation and paging, the virtual address space of a task is partitioned into segments using the same software constraints followed in segmentation. Then each segment is divided into fixed size pages following the procedures used in paging. A page table is formed for each segment in the task. The page table contains page descriptors for all pages in the segment. Each page descriptor contains the location address of its page frame and a residency flag. A segment descriptor table is used to hold segment descriptors for all segments in the task. Each segment descriptor contains bounds, protection information, and a pointer to the page table of the segment. The segment descriptor table is located from a segment table origin register.

The processor references an information item by a three-tuple address $(s,p,d)$ in which $s$ is the segment name, $p$ is the page name, and $d$ is a word name (also called deflection) within page $p$. The page table pointer field of the $s$th segment descriptor in the segment descriptor table located by the segment table origin register is used to locate the page table of the segment. The $p$th page descriptor in the page table is used to generate the memory address by concatenation of the page frame location address field with $d$. Bounds and protection checks are performed using appropriate fields from the $s$ segment descriptor. In this system, a missing page fault occurs if $p$ is not present in memory, thereby interrupting program execution until $p$ is placed in memory.

Segmentation with paging provides the virtual space organizational characteristics of segmentation with the efficient memory management characteristics of paging. Access privilege and bounds protection is provided without redundant storage of these items in the page descriptors. Segmentation and paging tends to be more efficient as the ratio of segment size to page size increases. This is true because, since the page is the unit of memory management, it is not necessary to have an entire segment resident at one time to start execution. All that is needed is that the page(s) in active execution be present. As a result, it is possible to have more segments in "partial" residence than in a comparable segmentation system. Intra-page fragmentation still exists in segmentation and paging because of the fixed size page constraint. Finally, segmentation and paging tend to require a wide characteristic address word because segment length must be large enough to accommodate tasks with large program modules while at the same time the number of segments available to a task must be large enough to accommodate programs with large numbers of (probably small) procedure and data modules.

With the foregoing background in mind, the present invention was developed to provide a virtual address translator which would incorporate the virtual program space organizational ability provided by segmentation. This virtual program space organizational ability is based on the assumption that procedure and data modules of any size can be mapped into segments. This assumption, however, is not really true. Conceptually, segments can be of any size up to the maximum allowable by the characteristic address word size of the computer (i.e., the sum of the $s$ field width and the $d$ field width for a segmented machine). In actual practice, however, this is not possible. There is a tradeoff involved between maximum segment size and the number of segments available to a task. For a given characteristic address word size, increasing the maximum segment size decreases the number of segments available to a task. The traditional solution to having both a large maximum segment size and a large number of segments available to a task, has been to provide very large characteristic address word sizes in computers using the segmentation scheme.

The intent of the traditional solution is to provide a reasonable number of segments while also providing a maximum segment size large enough so that occurrences of program modules which exceed this size are exceedingly rare. As an example, one system of the prior art which uses segmentation and paging, has a characteristic address word size of 24 bits. The number of segments available to a task is 256 and the maximum length of each segment is 65K words. However, it was intended that the present invention be utilized with computers having a characteristic address word size on the order of 16 bits. Furthermore, one of the design constraints placed on the present invention was that it should function as a separate module allowing computers normally operating in an absolute address environment to operate in a virtual address environment with only a minimum modification. Therefore, in order for the present invention to use some form of segmentation, it was necessary to devise a different solution to the maximum segment size problem.

At this point it is helpful to examine the basic segmentation premise that says that program modules, regardless of size, must be mapped into single segments. This constraint is not really necessary to achieve efficient virtual space organization. A system was devised that maps each program module into a number of "fixed length segments" and one "variable length segment." It is assumed that the "variable length segment" is always smaller in size than the "fixed length segments." The number of "fixed length segments" needed to map a program module is determined by the program module length. If the program module length is less than the size of the "fixed length segment", then only a "variable length segment" is needed to complete the mapping process. "Fixed length segments" and "variable length segments" are both defined by segment descriptors having the same structure. The only difference between them is that segment descriptors for "fixed length segments" have bounds fields set equal to the maximum segment size and segment descriptors for "variable length segments" have bounds fields set equal to values less than the maximum segment size. If both the "fixed length segments" and "variable length segments" have all the characteristics associated with segments of the segmentation scheme described above, then the use of fixed length and variable length segments constitutes a segmentation scheme that solves the maximum segment length problem without having to increase the address word size of the computer. The only additional cost of this segmentation scheme over traditional segmentation is the need to store program module access and protection information redundantly in all of the fixed lengths and variable length segment descriptors.

It should be noted that in the present invention the segments are not intended to be large enough to hold an entire program module. Therefore the segments will hereinafter be referred to as subsegments and the virtual addresssing scheme will be referred to as subsegmentation. Subsegments have all the characteristics of segments except that they generally will be smaller than the anticipated average size of program modules that will be run on the associated computers. This fact lets subsegments assume some of the efficient memory management attributes that pages have in segmentation and paging schemes. If subsegments tend to be small in relation to the average size of program modules, then it is not necessary to have all of the subsegments of a program module resident in real memory at one time in order to execute the program module. All that is required is that the subsegment(s) in active execution be present. As a result, it is possible to have more program modules in "partial residence" than would be the case in a comparable segmentation scheme.

Subsegmentation has very interesting ramifications to automatic storage management when compared to automatic storage management associated with segmentation or paging. A subsegment scheme has two units of memory management — the fixed length subsegment and the variable length subsegment. As a result, real memory can be managed in two regions: the fixed length region and the variable length region. This means that with subsegmentation it is possible to realize the efficient memory management attributes of paging for at least a portion of real memory, while at the same time never experiencing the intra-page fragmentation problems associated with paging. Although real memory fragmentation can still occur with subsegmentation schemes in the variable length region of memory, the solution to this problem (i.e., collecting the variable sized segments into one contiguous area of the variable length region) is far less costly than the solution to real memory fragmentation as experienced in segmentation schemes because, with segmentation, collection must be performed over all of the real memory.

One of the difficulties encountered in virtual memory systems is the problem of task switching. If a virtual memory computing system is multi-programmed, then portions of several tasks will be resident in memory at any one time. Since most of the virtual memory systems built today provide only one "task defining register", this register must be constantly loaded and changed as tasks are switched. For paging systems, this "task defining register" is called the page table origin register and it is used to hold a pointer to the page table of the task currently in active execution. Each time a task is switched in a paging system, the page table origin register has to be loaded with a pointer to the new task's page table. For segmentation or segmentation and paging systems, the "task defining register" is called the segment table origin register and it is used to hold the pointer to the segment descriptor table of the task currently in active execution. Each time a task is switched in the segmentation or segmentation and paging system, the segment table origin register must be loaded with a pointer to the new task's segment descriptor table.

In accordance with one aspect of the present invention, the task switching capability is improved as compared to the above systems by means of a task address table. Whenever a task is created in the VAT-equipped system, it is assigned a task number and a task segment descriptor by the executive. The task descriptor segment contains cells into which the executive stores the task subsegment descriptors. The task descriptor segment is located in main memory at a base address which is entered into the task associated cell within the task address table. The task address table is a 256 word memory located in the virtual address translator that serves as "task defining registers" for the 256 tasks that can be active at any one time in a translator-equipped system. Task address table cell 0 contains a pointer to the task descriptor segment for task 0, cell 1 contains a pointer to the task descriptor segment for task 1, and so on. Each virtual address sent to the virtual address translator from the computer has an eight-bit preamble which is the task name for the program currently executing in the computer. This task name locates the correct "task defining register" within the task address table. Once the correct "task defining register" has been found, address mapping proceeds just as in segmentation.

The use of task names in the virtual address allows simple and efficient task switching. All that is necessary in the way of task switching overhead is that the associated task address table entry be initiated when a task is first entered into the system. The actual task switching is then effected by simply changing the contents of the task name registers in the computer. The computer associated with the virtual address translator is provided with two eight-bit task registers. One of these task registers is called the "instruction task register" and it holds the name of the task currently in active execution. The other task register is called the "data task register" and it holds the task name of the data subsegment currently being processed. The instruction task register supplies the task name to virtual addresses for all instruction references to memory and the data task register supplies the task name to virtual addresses for all operand references. This use of two task registers allows one task to process data from other tasks.

In prior-art systems, even those employing virtual addressing, it has been conventional to utilize absolute addressing techniques for input and output (I/O) operations. The use of multiple task names makes it possible to handle all I/O addresses in the same fashion as central processor (CP) addresses. The effect of this implementation is to extend all the attributes of virtual memory to I/O. These include relocatability, access and overflow checking, and simplification of overlay by the double program name concept. The simple extension to I/O of all these capabilities is logical except for the traditional read-write-execute transaction privilege bits. There is no automatic correspondence between the transaction privileges which are appropriate for I/O as opposed to CP. In accordance with the present invention, each subsegment includes separate read-write-execute bits for I/O which are distinct from those for CP. The CP provides a discrete signal to the VAT which declares the virtual address to be I/O, and this causes the transaction privileges of the I/O to be used in the validity checks.

Virtual I/O addressing also allows I/O to load noncontiguous areas of memory in a single buffer transaction, which helps to allow small blocks for efficiency in memory management, and larger blocks for auxiliary store efficiency.

SUMMARY OF THE INVENTION

An object of the present invention is to provide a virtual address translator responsive to virtual addresses received from a central processor for generating absolute addresses for addressing a memory, said virtual address including a task name field and a segment/deflection field.

An object of the present invention is to provide associative memory means for storing subsegment descriptors, means for applying a name field and a segment field of a virtual address to said memory means to read a subsegment descriptor therefrom, and means for adding a base address contained in the subsegment descriptor to a deflection field in the virtual address to obtain an absolute base address for addressing a memory.

An object of the present invention is to provide a virtual address translator having a task address table for storing descriptors, an associative memory means for storing subsegment descriptors, means for applying the task name in a virtual address to the task address table to read out a segment descriptor, means responsive to the segment descriptor read from the task address table for controlling the application of the task name and a subsegment field from the virtual address to the memory means to read out a subsegment descriptor, and means for combining a base address from a subsegment descriptor read from the memory means with a deflection field contained in the virtual address to obtain an absolute address for addressing a memory.

An object of the present invention is to provide a virtual address translator as described above in combination with a central processor having means for storing a first task name which is utilized during instruction references to memory and a second task name which is utilized during data references to memory.

A further object of the invention is to provide a virtual address translator as described above in combination with a central processor having a plurality of input-/output units connected thereto, the central processor having means for storing an instruction task name and a data task name for each input/output unit, and means for reading out one of these task names when the associated input/output unit desires to make a memory reference.

An object of the present invention is to provide a virtual address translator as described above wherein each subsegment descriptor includes protection bits defining permissible operations utilizing the subsegment descriptor, and means for comparing the protection bits with discrete signals from the central processor defining the type of memory reference being made.

Another object of the invention is to provide a virtual address translator having a task address table for storing descriptors, an associative memory means for storing subsegment descriptors, means responsive to a task name field in a virtual address received from a central processor for reading out a descriptor from the task address table, means responsive to the descriptor for applying the task name field and a segment field from the virtual address to the associative memory means to read out a subsegment descriptor, means for detecting an associative miss when the desired subsegment descriptor is not resident in the associative memory means, means responsive to said detection means for reading the descriptor from the task address table, means for combining a portion of the descriptor with the subsegment field of the virtual address to obtain the address in memory of the desired subsegment descriptor, and means for loading the subsegment descriptor into the associative memory means.

A further object of the invention is to provide a virtual address translator as described above and including register means for storing a plurality of counts, there being one count associated with each cell of said associative memory means, and means for incrementing one of said counts each time an associative search is made and the searched value corresponds to that of the associated cell.

A further object of the invention is to provide a virtual address translator with performance monitoring means as described above and including means for outputting to an associated computer a miss message when an associative search of the associative memory means produces a miss requiring that a subsegment descriptor be removed from the memory in order to receive a new subsegment descriptor.

Other objects of the invention and its mode of operation will become apparent upon consideration of the following description and the accompanying drawings.

BRIEF DESCRIPTION OF THE DRAWINGS

FIGS. 1A and 1B comprise a block diagram of a virtual address translator;

FIGS. 6 and 7 show the primary decoding circuits for decoding the S1 and S2 fields, respectively, of an instruction;

FIG. 8A shows the circuits for selecting the general stack registers;

FIG. 8B shows the external status register;

FIG. 9 shows the primary circuits for decoding the F field of a VAT instruction;

FIG. 10 shows the primary circuits for decoding the D field of an instruction;

FIG. 21 shows the arithmetic logic unit status register and the carry look-ahead circuits;

FIGS. 31-39 are flowcharts illustrating the virtual to absolute address translation routine.

FIGS. 40A and 40B illustrate the assignment of the general stack registers at the beginning of a translation operation;

FIGS. 41-43 show the formats of various instructions executed by the virtual address translator;

FIG. 44 shows the format of a virtual address as transmitted from a central processor to the virtual address translator;

FIG. 45 shows the format of a descriptor as stored in the task address table; and, FIG. 46 shows the format of a subsegment descriptor as stored in the word addressed memory of the associative memory means.

DESCRIPTION OF THE INVENTION

General Considerations

Figure 1B:
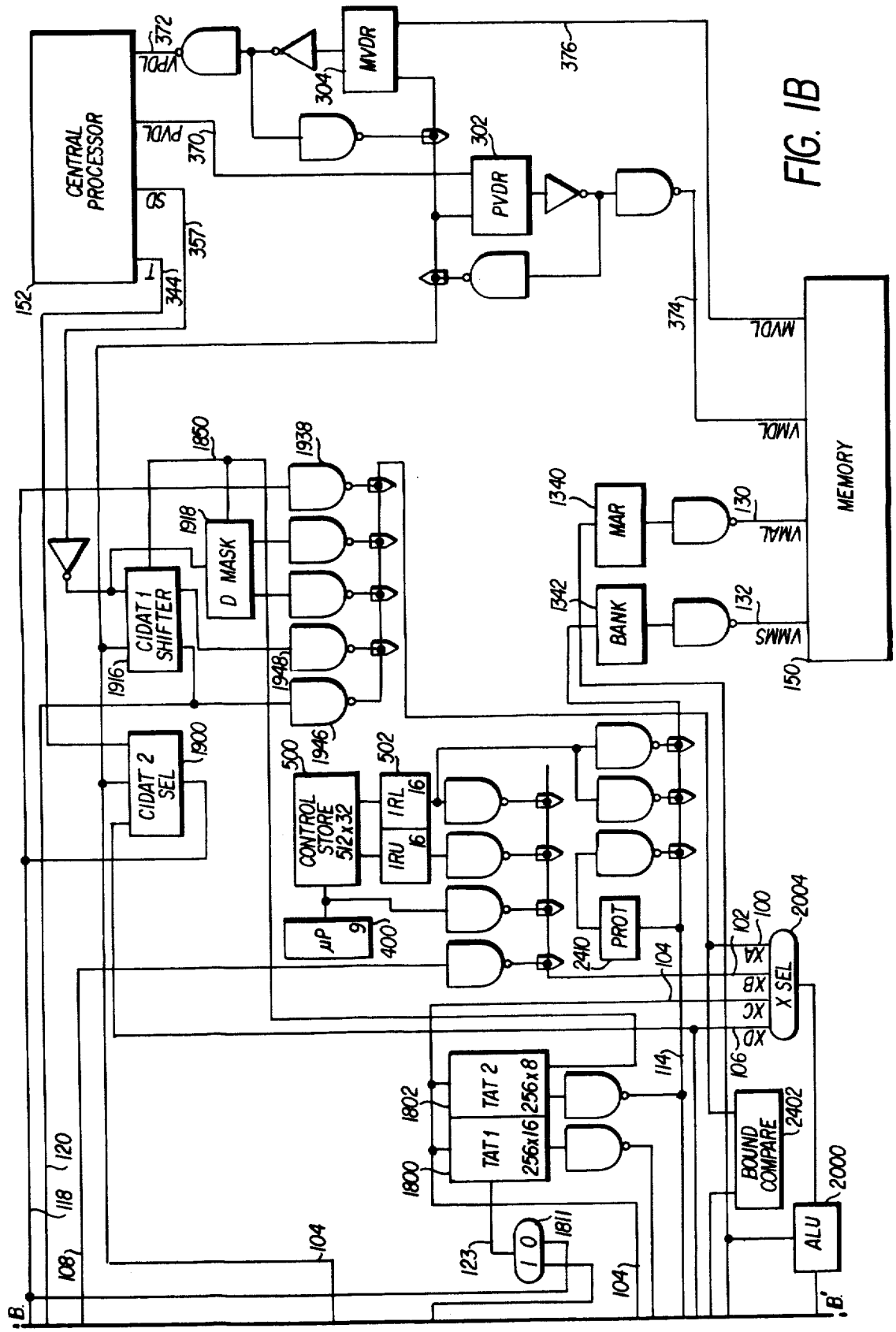

In the drawings all elements bear reference numerals having three or four digits. For three digit numerals, the first numeral designates the figure number where the element will be found. For four digit numbers, the first two digits specify the figure where the element will be found. All input leads to each figure have either a three or a four digit designation and again the first one or first two digits specify the figure from which the lead comes.

An exception is made with respect to FIGS. 1A and 1B where the elements have been assigned reference numerals such that by inspecting FIGS. 1A and 1B the reader may determine from the first one or two digits of a reference numeral the figure number where the details of the referenced element may be found.

All input and output leads are named and these names are preceded by the letter H (High) or L (Low) designating the voltage level on the lead when the named condition is true.

Virtual to Absolute Address Translation

Figure 2A:
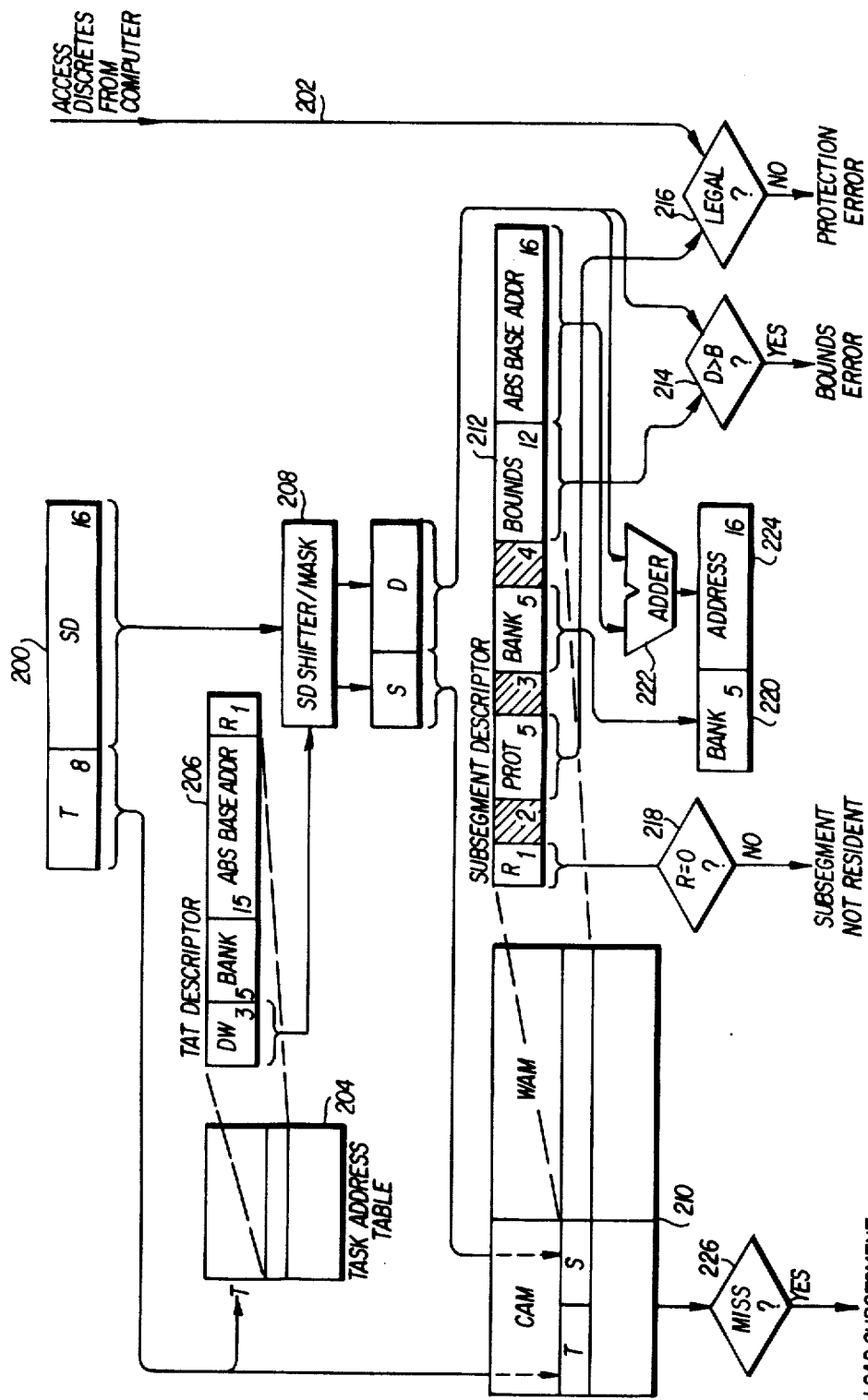
FIG. 2A is a data flow diagram illustrating how a virtual address is transformed into an absolute memory address.

The primary purpose of the virtual to absolute address translator (VAT) is to execute the virtual to absolute address translation sequence (VTOA) wherein the VAT accepts a virtual address from a central processor (CP) and converts it into an absolute address for addressing memory. During execution of the VTOA sequence, additional signals, provided by the CP to indicate the type of memory operation requested, are checked to see if the CP is privileged to communicate with the memory for that purpose. FIG. 2A is a data flow diagram illustrating the VTOA sequence. The CP generates a virtual address 200 having an eight-bit task name field T and a 16 bit subsegment/deflection field SD. In addition, the CP generates signals on bus 202 to indicate the reason for the memory access, that is, whether it is reading a CP instruction, reading CP data from the memory, writing CP data into the memory, reading an I/O instruction from the memory, reading I/O data from the memory, or writing I/O data into the memory. The task field is applied to a Task Address Table (TAT) 204 to read out a TAT descriptor 206. The TAT descriptor includes a deflection/width field DW which defines, for the given task, the relative widths of the subsegment S and the deflection D in the SD field of the virtual address 200. The DW field is applied to a shifter and masking circuit 208 which separates S and D and right justifies the S field.

T and S are then applied to an associative memory means 210 comprising a Content Addressed Memory (CAM) and a Word Addressed Memory (WAM). The associative memory 210 has 32 storage locations. The WAM holds 32 subsegment descriptors 212 and the CAM holds the tags T, S relating to these subsegment descriptors. T and S are applied to the CAM as a key word to simultaneously search all 32 addresses. If the key word is found in any of these addresses, the corresponding address in WAM is read out.

Each subsegment descriptor has a bounds field which defines the limiting address in the subsegment. This bounds field is applied to a comparator 214 where it is compared with the D field to produce an error signal if D is greater than B. This is an indication that the CP has attempted to cross a subsegment boundary.

Each subsegment descriptor also includes a protection field which defines the CP-memory operations allowed when accessing the subsegment. The protection field is compared at 216 with the signals on bus 202 to produce an error signal if the CP is attempting an illegal communication with the memory.

Each subsegment descriptor has a residency bit R which is a 0 if the subsegment is resident in memory. A circuit 218 checks the residency bit and if it is a one, the circuit produces an output signal to indicate that the subsegment is not resident in the memory.

Each subsegment descriptor includes a bank field defining which bank of memory contains the subsegment. The bank field is applied to a bank register 220. The subsegment descriptor also includes an absolute base address field which is applied to an adder 222 where it is combined with the D field and entered into an address register 224. If there are no address translation errors and if the subsegment is resident in memory, then the VAT initiates operation of the memory to gain access to the absolute memory address specified by the 21 bits in the bank and address registers. The CP then communicates with the memory at the addressed location.

Figure 2B:
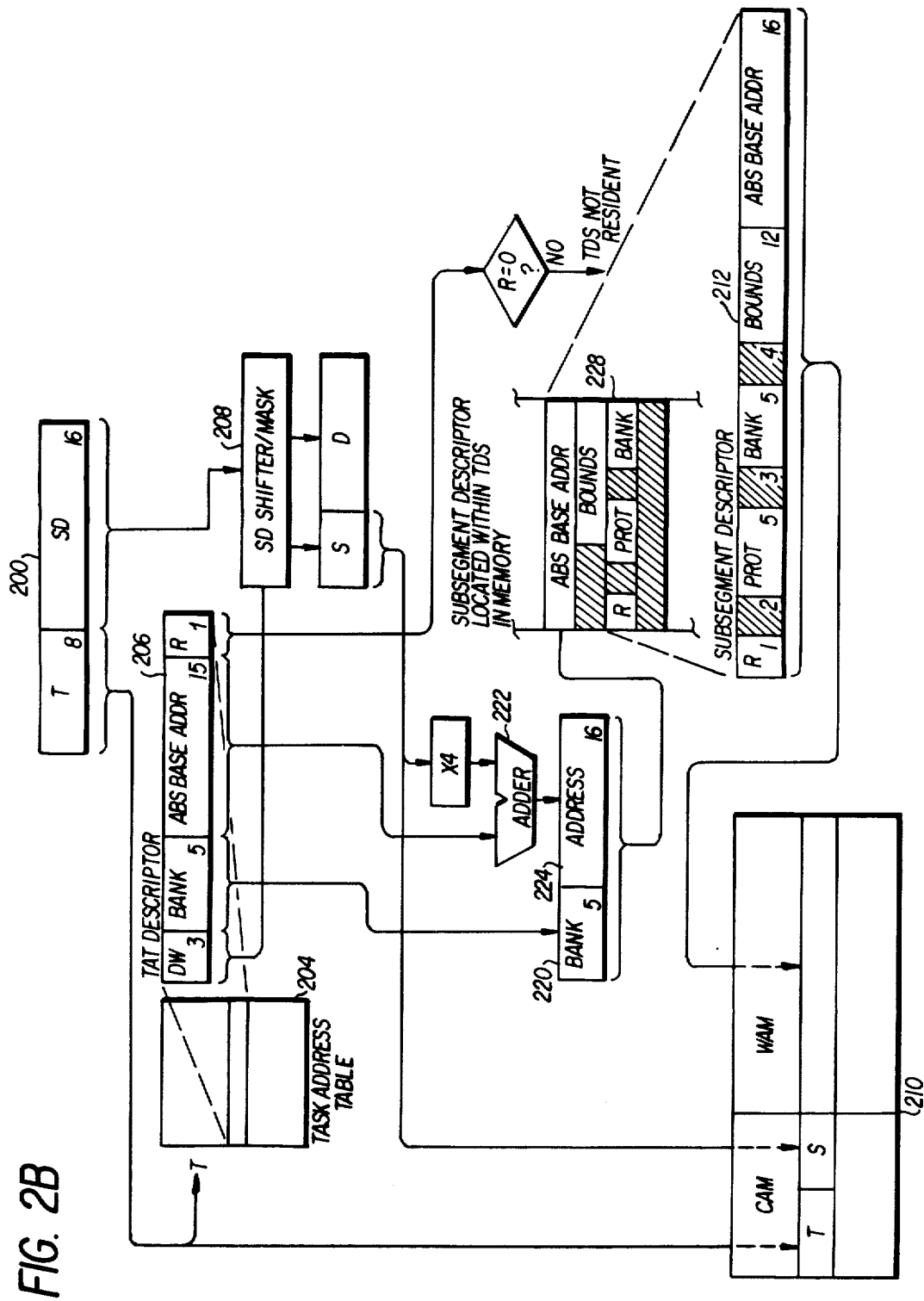
FIG. 2B is a data flow diagram illustrating how a subsegment descriptor is loaded into the virtual address translator if it is not present therein when needed for a virtual address translation.

It is possible that when the key word T, S searches CAM, it may not find a matching word therein. In this case, no subsegment descriptor is read from WAM and instead a circuit 226, which detects the miss, generates a signal which indicates that the memory must be accessed by the VAT in order to load the subsegment descriptor into CAM/WAM 210. When circuits 226 detect the associative miss, they cause the program to branch to a subroutine which loads the subsegment descriptor into CAM/WAM. During this routine, illustrated by FIG. 2B, the task name T addresses TAT 204 to again read out the TAT descriptor 206. The DW field of the TAT descriptor again controls the shifter and masking circuit 208 to separate the S and D field of the virtual address. The right justified S field is then shifted to the left 2 positions and applied to adder 222.

The TAT descriptor includes an absolute base address field which defines the base address of task t's subsegment descriptor. This address is applied to the adder 222 where it is combined with the S field and entered into address register 224. The TAT descriptor includes a bank field which defines which bank of memory contains the subsegment descriptors and this bank field is applied to the bank register 220.

Once the bank and address register are loaded, the 21 bit address is applied to the memory, and the first of three memory cycles is initiated. The address is modified by one after each access so that three consecutive addresses in memory are accessed. For design considerations, subsegment descriptors are stored in memory in three of four addresses, one of these addresses being blank. Referring for the moment to FIG. 1A, it is seen that WAM actually comprises three units each capable of storing 16 bit words. During each of three memory reference cycles a 16 bit word is read from the memory. One of these words contains the absolute base address field of the subsegment descriptor, another contains the bounds field, and a third contains the residency bit, protection, and bank fields. On one memory reference cycle, the absolute base address is stored in WAM 1, on another the bounds field is stored in WAM 2, and in another the residency bit, protection, and bank fields are stored in WAM 3. CAM is loaded with the values T and S at the address corresponding to the address in WAM in which the three portions of the subsegment descriptor are loaded.

Once the subsegment descriptor has been loaded in WAM and its tag T, S loaded in CAM, the VAT program returns to the routine illustrated in FIG. 2A in order to read out the subsegment descriptor just loaded in WAM for the purpose of accessing memory for communication with the CP.

Figure 3:
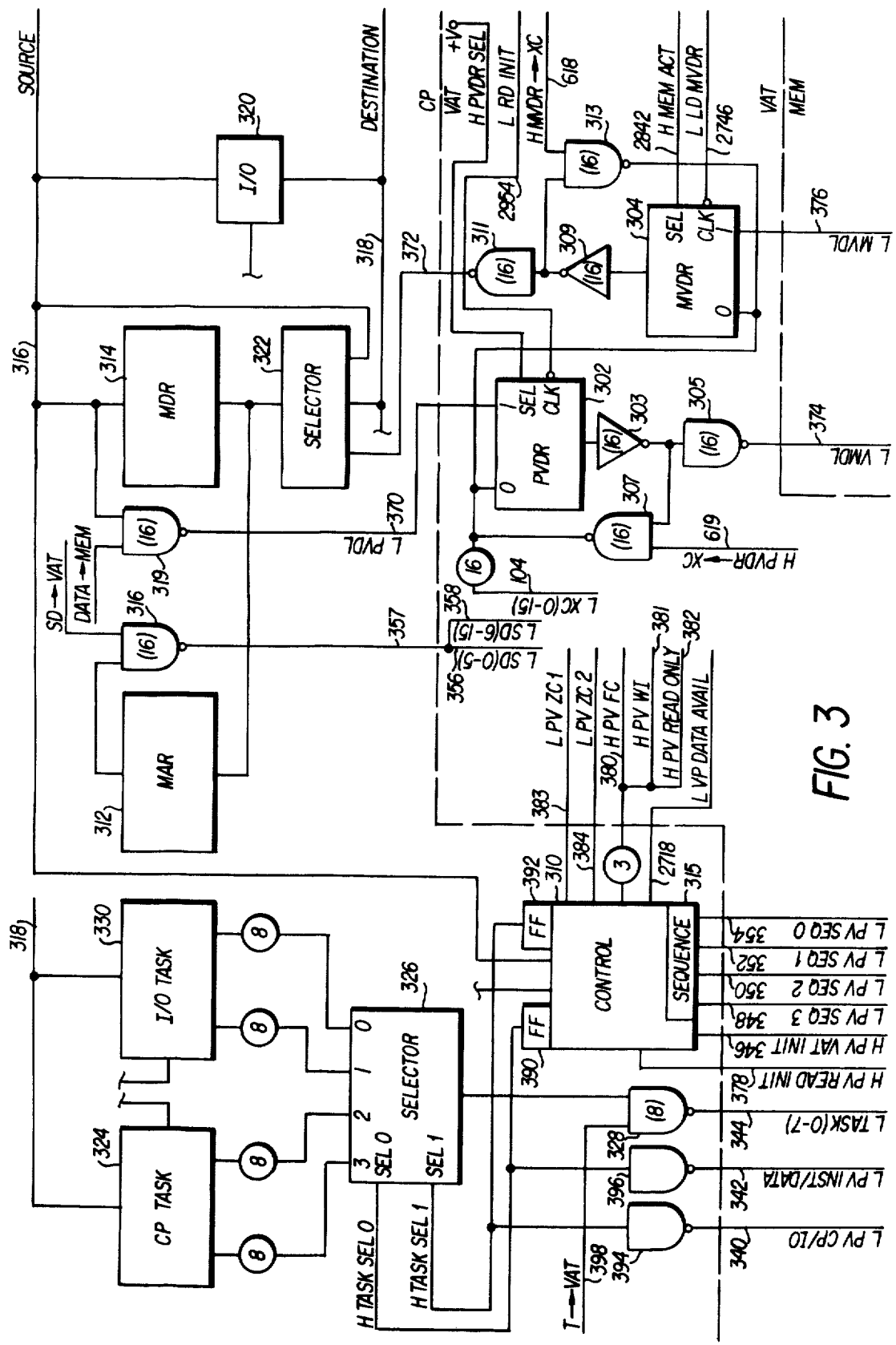
FIG. 3 shows the circuits of the central processor for generating multiple task names.

Overall System — FIGS. 1A, 1B and 3

FIGS. 1A and 1B comprise a block diagram showing the major elements of the VAT. The primary purpose of the VAT is to take a virtual address received from a CP 152, convert it to an absolute memory address, and then dispatch the absolute address to memory to perform a read or write operation. Referring for the moment to FIG. 3, the CP may be a conventional central processor having a micro-instruction counter and instruction decoding circuit generally designated as control 310, a Memory Address Register (MAR) 312, and a Memory Data Register (MDR) 314. The CP is provided with a source bus 316 and a destination bus 318. One or more input/output (I/O) devices 320 may be connected to receive information from bus 316 or transmit information to bus 318. The CP may have various other units such as an arithmetic unit connected between the source and destination buses, but such elements are not shown in FIG. 3 since they do not relate to the present invention. The source and destination buses are connected to a selector 322 which may output the selected information to either MAR 312 or MDR 314. MAR is a 16 bit register, and its output is connected through 16 NANDS 316 to a bus 357 which leads into the VAT. MDR 314 is also a 16 bit register. Its output is connected to the source bus and through 16 NANDS 319 and a bus 370 to a Processor to VAT Data Register (PVDR) 302 within the VAT. It will be understood that in an absolute addressing environment, the buses 357 and 370 would be directly connected to the addressing and memory data inputs of a memory while a bus 372 connected to selector 322 would apply to the selector information read out of the memory.

The characteristics of the CP when it is operating in an absolute address environment, i.e., connected directly to a memory with no VAT attached, may be summarized as follows.

The control unit 310 includes microprocessor circuits for executing a sequence of instructions. When the control circuits 310 require an instruction, they place an address on the source bus 316 and generate signals to pass this address through selector 322 to MAR 312. Control circuits 310 then generate a signal to gate the address through NANDS 316 to the bus 357. The memory responds by placing the desired instructon on bus 372 and the CP gates the instruction through MDR 314 to an instruction register within control circuits 310.

When an instruction being executed by the controls 310 requires a reference to memory for the purpose of reading an operand therefrom, the operation of the CP is essentially the same as for an instruction reference except that the operand received from the memory will be gated from the MDR 314 to some destination in the CP other than the instruction register.

If an instruction being executed by control circuits 310 requires a memory reference for the purpose of writing data into the memory, circuits 310 generate signals which gate the data from any desired source onto bus 318 and through selector 322 to MDR 314. Control circuits 310 then generate the memory address which is gated onto source bus 316, through selector 322 and into MAR 312. Control circuits 310 then generate enabling signals enabling the address to be gated onto bus 357 and the data onto bus 370.

Control circuits 310 generate several signals each time the MAR is loaded for accessing the memory. Circuits 310 generate zone control signals on leads 383 and 384 to control the writing into the upper, the lower, or both halves of the memory location being addressed. Control circuits 310 generate signals on leads 380, 381, and 382 to control the memory to perform a read only cycle, a write initiate, or a full cycle. Finally, control circuits 310 generate the signal READ INITIATE on lead 378 to initiate the memory for either a read or a write operation. When the memory cycle is completed, the memory generates a signal on lead 2718 to inform control circuits 310 that the memory cycle is complete. Controls 310 utilize this as a resume signal which indicates that the memory has accepted the data transmitted to it from the CP, or has made available on the bus 372 the requested data.

When the I/O units 320 require access to the memory, they send an interrupt signal to the control circuits 310. When the interrupt is granted, data if any, from the interrupting I/O is gated through selector 322 into the MDR and MAR is loaded as described above. If the I/O unit interrupts for a read operation, then the data from the memory is gated from bus 372 through selector 322 into MDR and from there is passed into the interrupting I/O unit. During I/O memory references, control circuits 310 generate the same memory control signals as they generate for CP references.

The CP circuits thus far described comprise an actual prior-art system of conventional design, hence the details are not shown since these details are not essential to an understanding of the present invention. In accordance with the present invention, all connections normally made between the CP and memory are now made between the CP and the VAT. The VAT relays the control signals and data from the CP to the memory only under certain conditions, and in like manner relays information from the memory back to the CP.

In order that the CP, which conventionally operates in an absolute address environment, may operate in a virtual address environment, a register 324 is provided for storing the name of a task being executed by the CP. When the CP desires to make a memory reference, it gates the task name from register 324 through a selector 326 and a set of NANDS 328 to a bus 344. Thus, a virtual address as generated by the CP comprises a task name on bus 344 and a segment/deflection field (formerly the memory address) on bus 357. The format of this word is shown in FIG. 44.

Actually, in accordance with one aspect of the present invention, the register 324 is a 16 bit register capable of storing two eight-bit task names. The upper half of the register 324 is connected to input 3 of selector 326 and the lower half of the register is connected to input 2. Either input 2 or 3 of the selector may be gated through to the bus 344 to serve as the task field of a virtual address. This enables the CP program to operate from its own instruction set but with operands belonging to either itself or some other program whose operands are identically arranged in virtual address space. If the task names in register 324 are the same, then the CP program operates with operands belonging to itself and if the names are different, the program operates with operands belonging to some other program.

This same capability is extended to I/O operations by providing a register stack 330 which is capable of storing eight 8-bit task names in four addressable locations. Each location stores two task names for each I/O unit and these names may be the same or different. The upper half of the register stack is connected to input 1 of selector 326 while the lower half of the register stack is connected to input 0. Both register 324 and register stack 330 may be loaded with task names applied to them from the destination bus under the control of an instruction executed by control circuits 310.

In order to select the task name applied to bus 344, two flip-flops 390 and 392 are provided. Control circuits 310 include means for determining when a memory reference is necessary for the purpose of obtaining another instruction. If an instruction is needed from memory, circuits 310 set flip-flop 390 and its output enables the select 0 input of selector 326. If the memory reference is made for reading or writing data, then the flip-flop 390 remains reset. A further means in control circuits 310 determines whether the memory reference is to be made on behalf of the CP or on behalf of an I/O unit. If it is on behalf of the CP, then the flip-flop 392 is set to enable the select 1 input of selector 326.

Consider for example the case where a memory reference is to be made for the purpose of transferring data between the CP and the memory. Control circuits 310 sets flip-flop 392, but flip-flop 390 remains reset. With the select 1 input energized selector 326 gates an eight-bit task name from the lower half of register 324 through to NANDS 328, and the control circuits 310 enable NANDS 328 to gate the task name onto bus 344. This task name will be the one assigned to CP data. On the other hand, when the memory is to be referenced for the purpose of obtaining an instruction for the CP, both flip-flops 390 and 392 are set, thus causing selector 326 to gate its number 3 inputs through to NANDS 328. This places the task name assigned to CP instructions on the bus 344 when control circuits 310 enable gates 328.

When an I/O unit 320 desires access to the memory, it sends an interrupt signal to control circuits 310 and, when the interrupt is granted, selection signals are applied to the I/O task registers 330 to identify which I/O unit is active. These signals read out both task names assigned to the I/O unit and apply them to the 0 and 1 inputs of selector 326. If the I/O unit has interrupted for the purpose of an instruction reference, flip flop 390 is set while flip flop 392 remains reset. This energizes the Select 0 input of selector 326 and gates the I/O instruction task name through the selector to the bus 344. On the other hand, if the I/O unit has interrupted for the purpose of a data memory reference, both flip flops 390 and 392 remain reset, and the I/O data task name is gated through the 0 inputs of selector 326 to the bus 344.

The outputs of flip flops 390 and 392 are inverted at 394 and 396 to provide the signals PV CP/IO and PV INSTRUCTION/DATA. These signals are applied to the VAT where they are compared with privilege bits in a subsegment descriptor to see if the memory reference being made is one that is permitted.

FIG. 3 also shows two 16-bit registers within the VAT for holding information as it is transferred between the CP and the memory. Information being transferred from the CP to the memory is applied over bus 370 to the select 1 inputs of a Processor to VAT Data Register (PVDR) 302. The select input of the register is permanently enabled, and the signals on the bus 370 are clocked into the register upon occurrence of the signal READ INITIATE. As subsequently explained, this signal is generated in the VAT clock circuits and responds to the signal PV READ INITIATE on lead 378. Information in register 302 is applied directly to the memory through inverters 303 and NANDS 305.

In some instances, it is necessary for the CP to supply data directly to the VAT and in these instances the data is entered into register 302 and a set of NANDS 307 is enabled to gate the data from register 302 onto an XC bus 104 which carries the data into the VAT.

When a CP memory reference reads information from the memory, this information passes over bus 376 to a Memory to VAT Data Register (MVDR) 304. The signal MEMORY ACTIVE will be at the high level to select inputs 1 to the register, and when the memory has placed the information on bus 376 it returns a signal to the VAT which causes the signal LOAD MVDR to clock the data into MVDR. Data in MVDR is passed through inverters 309 and NANDS 311 to the Selector 322. In addition, the outputs of inverters 309 are applied to a set of NANDS 313 which receive the signal MVDR → XC. This signal gates the data received from the memory onto the XC bus for use within the VAT itself.

The CP is provided with one further modification in order to enable it to communicate directly with the VAT as opposed to communicating with the memory through the VAT. The CP is provided with a four-bit sequence register 315. When the CP desires to communicate with the VAT itself, it loads a binary code into the sequence register and generates the signal PV VAT INITIATE on lead 346. As subsequently explained, the binary value from the sequence register is loaded into the instruction counter of the VAT and the signal on lead 346 starts the VAT so that it executes a sequence of instructions beginning with the one stored at the address specified by the binary value. It should be understood that the sequence register 315 is provided primarily for controlling the VAT during loading and housekeeping sequences and does not enter into the actual VTOA sequence.

All of the elements shown in FIGS. 1A and 1B are located within the VAT module except for the Memory 150, the CP 152 and a performance monitor processor (PMP) 153. It will be understood that Memory 150 may comprise a plurality of memory banks and may cooperate with several central processors hence it also includes some conventional form of memory manager means. Each central processor serviced by the memory is connected to the memory through a separate VAT. Each VAT has its own performance monitor 153 associated therewith for monitoring the efficiency of operation of the VAT.

The heart of the VAT is a 32 word by 68 bit associative memory means which comprises a Content Addressed Memory (CAM) and a Word Addressed Memory (WAM). The CAM comprises two units, CAM 1 and CAM 2 each capable of performing read, write, and search operations. CAM 1 has 32 cells or word locations with each word being 12 bits in length. CAM 2 has 32 cells, each capable of storing eight bits. CAM 1 holds subsegment identifiers and CAM 2 holds task names.

The CAM has the ability to simultaneously search at high speed all thirty-two of its cells for the presence of an entry that is equal to a "key word." This capability makes it possible to utilize the CAM with the WAM to form a fast look-up memory that holds the subsegment descriptors needed to translate virtual addresses. The CAM holds the subsegment descriptor tags T, S and the WAM holds the subsegment descriptors themselves.

A CAM/WAM search takes place in three steps. First the CAM is searched using the T and S fields of the virtual address as the key word. The CAM, if it contains the correct T, S entry, produces an output signal on one of thirty two match lines 126, there being one match line for each of the 32 cells. The match signals are then used as an address to address the WAM and read the associated subsegment descriptor therefrom. The entire process takes about eighty nanoseconds and allows the VAT to perform speedy address translation.

Both the CAM and the WAM are addressed using linear select addressing. That is, they are addressed by 32 bit linear select address words wherein only one of the 32 bits is set. The linear address select word is obtained by reading out one of the registers in each of the GSA and GSB register stacks 1306 and 1304. Each of these register stacks contains four registers capable of holding sixteen bit words. Any pair of registers in GSA and GSB may be utilized to address CAM and WAM but the selected register pair must contain a linear select address word.

The linear select address for the WAM is derived from the XD bus 106 and the YD bus 116. The address on the XD and YD bus is formed by taking the logical product of the GSA/B bus 122/124 and the match bus 126. The WAM can be addressed by a word on the GSA/B bus by forcing ones on the match bus, by a word on the match bus by forcing ones on the GSA/B bus, and from the logical product of the values on the GSA/B bus and the match bus. It is this third method that is used to address the WAM during the virtual to absolute translation process. The GSA/B bus which holds a 32 bit full/clear word (subsequently explained) during the address translation, is "anded" with the associative search information on the match bus to give the associative search match word. This match word is then used to address the WAM to read out the subsegment descriptor needed for address translation.

The CAM elements CAM 1 and CAM 2 are each provided with a mask register and a mask selector. Mask register 1404 is connected to mask selector 1406 having a mask bus 1409 connected to CAM 1. Mask register 1408 is connected to a mask selector 1410 having a mask bus 1414 connected to CAM 2. The mask bus is used as a search enable when the CAM performs search operations. A "one" mask bus bit causes the associated bit in the CAM entries to be included in the associative search. A zero mask bit causes the associated bit in the CAM entries to be ignored in the associative search. When the CAM performs a write operation, the mask bus is used as a write enable. A "one" mask bus bit allows the microprogram to write into the associated CAM cell bit and a "zero" mask bus bit inhibits the microprogram from writing into the associated CAM cell bit. Under microprogram control, the mask selectors allow operations such as SEARCH ALL BITS, SEARCH NO BITS, and SEARCH ON THE TASK FIELD.

The CAM may perform either read, write, or search operations. During the read operation, the contents of the CAM cells specified by the GSA/B bus 122/124 are gated onto the YA bus 110 and the YB bus 112. During the write operation, the contents of the CAM input data bus 118/120 subject to the write enable information on the mask bus, are written into the CAM cell specified by the GSA/B bus. During the search operations, the contents of the CAM input data bus 118/120 subject to the search enable information on the mask bus are compared to the contents of the CAM cells. If any CAM cells contain information that matches the key information their associated match bus lines 126 are set to one.

The WAM is a 32 word by 48 bit memory that forms the data portion (i.e., holds the subsegment descriptors) of the VAT associative memory. The WAM comprises three units, WAM 1, WAM 2, and WAM 3, each of which is capable of performing read or write operations. FIG. 46 shows the format of a subsegment descriptor as held in WAM 1, WAM 2 and WAM 3. As previously explained, the WAM is addressed by a 32 bit linear select address word on the XD and YD buses. During a read operation, the contents of the WAM cell specified by the address is gated onto the YA bus 110, the YB bus 112, and the YC bus 114. During a write operation, the contents of the XC bus 104 are written into the WAM cell specified by the address. However, during a write operation, a 16 bit word is written into either WAM 1, WAM 2, or WAM 3, depending upon which unit is selected by the S2 field of the microinstruction being executed.

A Task Address Table (TAT) comprises two units, TAT 1 and TAT 2. Together they form a 256 word memory capable of holding 24-bit words. The main purpose of TAT is to hold address pointers to the task subsegment descriptors. However, the upper 32 cells of the TAT are used as registers to hold hit counts utilized in performance monitoring. The format of a descriptor word stored in TAT is illustrated in FIG. 45.

The TAT can be addressed by a binary address from either of two sources. One source is the CAM input data bus 118 which is used when the TAT is to be addressed by the virtual address T field. The other source is the hit bus 121 which is used when performance monitoring requires that a hit count be incremented.

The TAT is capable of performing read operations or write operations. During a read operation, the contents of the TAT cell specified by the TAT address bus 123 is gated onto the YA bus 110 and the YC bus 114. During a write operation, the contents of the XC bus 104 are written into the TAT cell specified by the TAT address bus 123. The writing operation takes place into TAT 1 or TAT 2, depending upon which of these units is selected by the S2 field of the microinstruction being executed.

Figure 24:
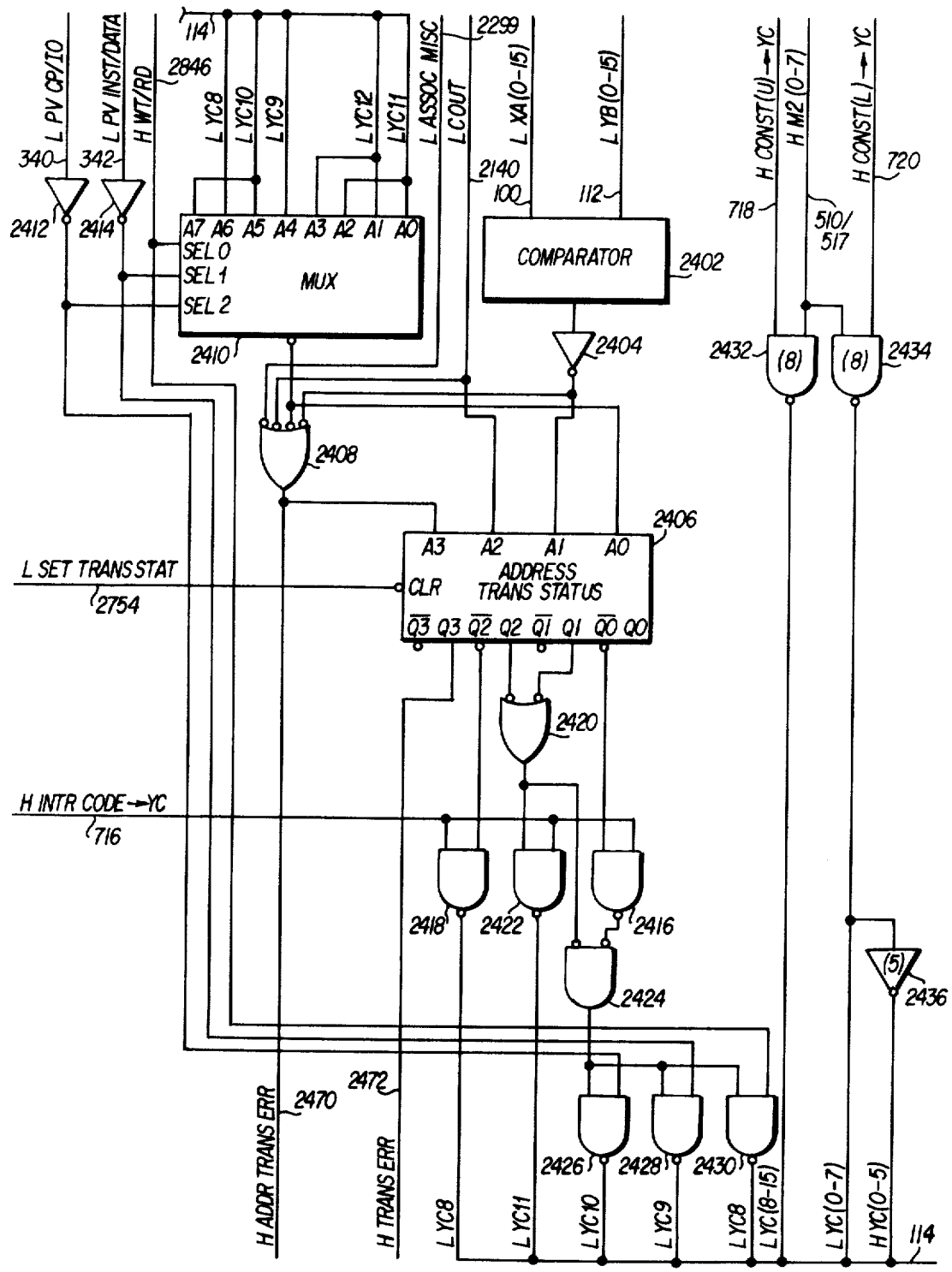
FIG. 24 shows the circuits for detecting address translation errors.

The VAT is provided with address translation status logic comprising an associative miss detector and encoder 2200, a hit register 2218, a binary to linear select decoder 2300, and address translation error checking logic including a bounds comparator 2402 as well as protection and overflow check circuits and an address translation status register. These latter elements are not shown in FIGS. 1A and 1B but the details are shown in FIG. 24. All of this logic is used directly or indirectly to perform access checks and associative miss detection during virtual to absolute address translation.

The associative miss detector and encoder 2200 is a priority encoder that accepts a 32-bit input and produces a five bit binary weighted code corresponding to the lowest order input bit set to "one". The priority encoder is driven by the XD bus 106 which provides the 16 low order inputs to the encoder and the YD bus 116 which provides the 16 high order inputs to the encoder. In addition to being able to perform as a priority encoder for any number on the XD/YD bus, it performs a special function during virtual to absolute translation. During this translation, the XD/YD bus contains the associative search match word that is used to address the WAM to read out the subsegment descriptor needed for address translation. Since the associative search match word must be a linear select address only one of its 32 bits will be true. The priority encoder converts the associative search match word into a five bit binary number representing the CAM cell that contained the match T, S tag. This code can then be utilized to address a hit counter in TAT. In addition, the priority encoder has logic to detect the case when all 32 of its inputs are false. During address translation, this logic is used to detect an associative miss.

The hit register 2218 is a five bit register that is used to hold the output of the encoder 2200. During address translation, the hit register holds the number of the "match" CAM cell. The output of the hit register may be applied to the XC bus 104, to the addressing inputs of TAT, or to the binary to linear select decoder 2300.

The binary to linear select decoder 2300 includes means for converting a five bit binary number into a 32 bit linear select address word. As subsequently explained this conversion requires two instructions with 16 bits being handled during each instruction. The output of the decoder may be gated onto the XC bus 104. The input of the decoder is connected to the output of the hit register or the five low order bits of the XD bus 106, depending upon the setting of selector 2230 by the microinstruction being executed.

The circuits for receiving the virtual address from CP 152 include a CAM Input Data 2 (CIDAT 2) selector 1900, a CIDAT 1 shifter 1916, and deflection field mask logic circuitry 1918. The CIDAT 2 selector 1900 steers one of three data paths onto the eight bit CIDAT 2 bus 118. The three data paths are the XC bus 104 (so the value on the XC bus can be written into the CAM), the XD bus 106 (so that the contents of the XD bus can be used to address the TAT) and the virtual address T field bus 344 (so that T, S associative searches may be performed on the CAM). The CIDAT 2 bus is also connected through gates 1938 to the XA bus. This gating is done when the T field of an abnormal status word (subsequently described) is formed during the error handling sequence in the virtual to absolute address translation routine.

The CIDAT 1 shifter 1916 and the deflection masking circuits 1918 are employed to split apart the virtual address field SD received from CP. This split is dependent on the deflection width (DW) field of the descriptor contained in TAT 2. The output of TAT 2 is connected by a bus 1850 to the D masking logic 1918 and the CIDAT 1 shifter 1916 for this purpose. The CIDAT 1 shifter includes for steering onto the CIDAT 1 bus 120 either a value on the XC bus 104 so that the value on the XC bus can be written into the CAM, or the virtual address subsegment field (s) so that the T, S associative search may be performed on the CAM. The subsegment field S or the subsegment field shifted two bits to the left may be gated onto the XA bus 100 through gates 1946 and 1948. The shifted S field is used when calculating the absolute address of the subsegment descriptors in memory during a descriptor loading sequence in the VTOA routine subsequently described.

The deflection masking logic 1918 is used to gate the virtual address deflection field D from bus 357 onto the XA bus 100 during the address translation sequence in the VTOA routine. The subsegment/deflection (SD) field on bus 357 may be gated onto the XA bus 100 when an abnormal status word is formed during an error handling sequence in the VTOA routine.

The accumulator register (AC) 1100 is a split 16 bit register having upper (ACU) and lower (ACL) halves. AC is used to hold intermediate calculations. The general stack C (GSC) is a four-word register capable of holding 16-bit words. GSC is used as a memory data register for the VAT memories CAM, WAM, and TAT, and as a temporary storage register. Two words of GSC are used to hold the VAT abnormal status word generated when any of several errors occurs. Both AC and GSC are loaded from a destination bus 108 which has as its sole source the output of arithmetic logic unit (ALU) 2000. AC can be loaded in four ways. The upper and lower bytes on the destination bus may be entered into ACU and ACL, respectively, the upper or lower byte on the destination bus may be entered into ACU or ACL while leaving the other half of the accumulator unchanged, or the upper byte on the destination bus may be entered into ACL while the lower byte on the destination bus is entered into ACU.

The X selector 2004 and the Y selector 2002 each comprise means for gating a 16-bit word from one of four buses onto an output bus that is connected to ALU 2000. The X selector receives words from the XA, XB, XC, and XD buses while the Y accumulator receives words from the YA, YB, YC, and YD buses. ALU 2000 is capable of performing addition, subtraction, and any of 16 Boolean operations on the two operands supplied thereto by the X and the Y selectors.

The VAT has a 16-bit memory address register 1340 and a five bit bank register 1342 for addressing the memory 150. These registers are loaded with the absolute memory address during the VTOA routine in order to provide a 21 bit absolute address for addressing the memory. The VAT is provided with an interprocessor buffer (IPB) command register 1204 and an IPB data register 1200 for the purpose of communicating with the performance monitor processor (PMP) 153. The IPB command register is a four bit register connected to the destination bus 108 and is used to load IPB stack pointers which are contained in the performance monitor processor IPB stack. The IPB data register 1204 is also connected to the destination bus 108 and, as subsequently described, is utilized to transmit miss messages to the performance monitor processor when an associative search of CAM results in a miss.

The VAT is controlled by a microprocessor counter 400 which is utilized to address a control store 500. Control store 500 is a read only memory having 512 addressable locations each capable of storing a 32-bit microinstruction. The counter 400 is a nine-bit binary counter used to hold the address in memory 500 of the next microinstruction to be executed. As each instruction is executed, the counter 400 is incremented in order to obtain the next address. The counter 400 may also be loaded in parallel by circuits not shown in FIGS. 1A and 1B to implement branch/jump microinstructions and to preset the counter to specific addresses when the CP initiates the VAT for a CP-VAT communication. A 32-bit microinstruction register receives each instruction as it is read from the memory 500 and holds the microinstruction while it is being executed.

INSTRUCTION FORMATS

The VAT is controlled by 32 bit instructions which are stored in the control store 500. These instructions may be of five types and have any one of three formats as illustrated in FIGS. 41, 42 and 43.

Format 1

As illustrated in FIG. 41, a Format 1 instruction has F, S1, S2, D, ALU and M1 fields each comprising four bits. In addition, a Format 1 instruction has an M2.2 field comprising two bits and an M2.1 field comprising 6 bits. A Format 1 instruction is characterized by the fact that the F field contains an octal value between 00 and 11 and an octal value other than 14 or 15 in the S2 field. The low order bit of the F field selects an arithmetic ALU operation if it is a 0, and selects a logical ALU operation if it is a 1. The three high order bits of the F field define five group branches as follows:

- 000 — Group 0 Branches
- 001 — Group 1 Branches
- 010 — Group 2 Branches
- 011 — Group 3 Branches
- 100 — Group 4 Branches A Format 1 instruction performs an ALU operation specified by the ALU field on two VAT registers specified by the S1 and S2 fields, stores the result in a VAT register specified by the D field, and performs a conditional branch if the condition specified in the M2.2 field is met.

The legal mnemonics for Format 1 instructions are given below as an aid to interpreting the microcodes appearing at the end of this specification.

| Octal Code | MNEM | |
|---|---|---|
| 00 | R0A | where R → VAT register inst (FORMAT 1) |
| 01 | R0L | 0 → Group 0 Branch |
| 02 | R1A | 1 → Group 1 Branch |
| 03 | R1L | 2 → Group 2 Branch |

-continued

| | | |
|---|---|---|
| 04 | R2A | 3 → Group 3 Branch |
| 05 | R2L | 4 → Group 4 Branch |
| 06 | R3A | A → Arithmetic ALU operations |
| 10 | R4A | |
| 11 | R4L | |

The octal code as given in the foregoing listing represents the octal value of the four bits of the F field.

Formats 2 and 3

Instructions having Format 2 or 3 differ from Format 1 instructions only in the value of the F field. In both Format 2 and Format 3 instructions, the low order bit of the F field selects an arithmetic ALU operation if it is a 0, and selects a logical ALU operation if it is a 1. If the three high order bits are 101, they designate a Format 2 instruction requiring the reading of the VAT memory. If the three high order bits are 110, they designate a Format 3 instruction requiring the writing into a VAT memory. A Format 2 instruction performs an ALU operation as specified by the ALU field on a VAT register as specified by S1 and the contents of a VAT memory location as specified by S2, and stores the results in a VAT register specified by the D field. Format 3 instructions write the contents of a VAT register as specified by S1 into a VAT memory location, as specified by S2. The The legal mnemonics for Format 2 and Format 3 instructions are as follows:

| Octal Code | MNEM | |
|---|---|---|
| 12 | MRA | where MR → Read VAT memories |
| 13 | MRL | MW → Write VAT memories |
| 14 | MWA | A → Arithmetic ALU operations |
| 15 | MWL | L → Logical ALU operations |

Format 1K

As shown in FIG. 42, a Format 1K instruction includes fields F, S1, S2, D, ALU and M1 each having four bits, and an 8-bit field M2. A Format 1K instruction is characterized by the fact that the three high order bits of the F field are 000 while the S2 field contains one of the octal values 14 and 15. The low order bit of the F field selects an arithmetic ALU operation if it is a 0, and selects a logical ALU operation if it is a 1. A format 1K instruction performs an ALU operation on a VAT register specified by S1 and an eight bit constant contained in the M2 field, and stores the result in a VAT register specified by the D field. The legal mnemonics for Format 1K instructions are as follows:

| OCTAL CODE | MNEM | |
|---|---|---|
| 00 | RKA | where R → VAT register inst |
| 01 | RKL | K → Constant (KU or KL in the S2 field) |
| | | A → Arithmetic ALU operations |
| | | L → Logical ALU operations |

Format 4

As illustrated in FIG. 43, a Format 4 instruction includes F, S1, S2, D and ALU fields each containing four bits, and a 12 bit M1.2 field. A Format 4 instruction is characterized by the fact that the three high order bits of the F field are 111. Format 4 instructions perform microcontrol functions and unconditional jumps. The only legal mnemonics are octal codes 16 and 17 defined as MCJ and representing microcontrol-jump.

Tables I, II, and III show the S1, S2 and D field definitions, respectively, for Format 1, 1K, 2 and 3 instructions. In these tables the column designated "octal code" represents the octal value of the four bits in a field. For example, if the bits of an S1 field are 0100, Table I shows that this designates one operand as the subsegment field for a Format 1 or 1K instruction, but designates the deflection field for a Format 2 instruction.

As a further example, Table II shows that if the S2 field has the octal value 5, then the general stack B1 register is selected for a Format 1 instruction, WAM 2 is read for a Format 2 instruction, and WAM 2 is written into for a Format 3 instruction.

Generally, speaking, the D field defines the destination of the result for a Format 1, 1K, 2, or 3 instruction. However, this result is modified somewhat by the high order bit of the M1 field. Thus, Table III has two headings, D1 and D2. If the high order bit of the M1 field is a 0, then the octal code in the D field defines the destinations under the heading D1. On the other hand, if the high order bit of the M1 field is a 1, then the octal code in the D field defines the destinations under the heading D2.

TABLE I

S1 FIELD DEFINITIONS - FORMAT 1, 1K, 2, 3 INSTRUCTIONS

| | FORMAT 1, 1K | | FORMAT 2 | | FORMAT 3 | |
|---|---|---|---|---|---|---|
| OCTAL CODE | MNEM-ONIC | DEFINITION | MNEM-ONIC | DEFINITION | MNE-MONIC | DEFINITION |
| 00 | A0 | General Stack A0 | DLH | Decode (lower, Hit Reg) | — | |
| 01 | A1 | General Stack A1 | DUH | Decode (upper, Hit Reg) | — | |
| 02 | A2 | General Stack A2 | DLD | Decode (lower, XD Bus) | — | |
| 03 | A3 | General Stack A3 | DUD | Decode (upper, XD Bus) | — | |
| 04 | S | Segment Field | D | Deflection Field | — | |
| 05 | SD | Seg/Def Field | S2L | Segment Field 2 left | — | |
| 06 | T | Task Field | MTL | Match (lower) | — | |
| 07 | AC | Accumulator | AC | Accumulator | AC | Accumulator |
| 10 | C0 | General Stack C0 | C0 | General Stack C0 | C0 | General Stack C0 |
| 11 | C1 | General Stack C1 | C1 | General Stack C1 | C1 | General Stack C1 |
| 12 | C2 | General Stack C2 | C2 | General Stack C2 | C2 | General Stack C2 |
| 13 | C3 | General Stack C3 | C3 | General Stack C3 | C3 | General Stack C3 |
| 14 | DP | Display Register | — | | — | |
| 15 | HTR | Hit Register | — | | — | |
| 16 | MVR | Mem → VAT Data Reg | MVR | Mem → VAT Data Reg | MVR | Mem→ VAT Data Reg |
| 17 | PVR | CP → VAT Data Reg | PVR | CP → VAT Data Reg | PVR | CP→ VAT Data Reg |

TABLE II

S2 FIELD DEFINITIONS - FORMAT 1, 1K, 2, 3 INSTRUCTIONS

| OCTAL CODE | FORMAT 1 MNEM | FORMAT 1 DEFINITION | FORMAT 1K MNEM | FORMAT 1K DEFINITION | FORMAT 2 MNEM | FORMAT 2 DEFINITION | FORMAT 3 MNEM | FORMAT 3 DEFINITION |
|---|---|---|---|---|---|---|---|---|
| 00 | RT1 | Read TAT 1 (HTR) | — | | T1D | Read TAT 1 (XD) | T1D | Write TAT 1 (XD) |
| 01 | RT2 | Read TAT 2 (HTR) | — | | T2D | Read TAT 2 (XD) | T2D | Write TAT 2 (XD) |
| 02 | WT1 | Write TAT 1 (HTR) | — | | T1T | Read TAT 1 (T) | T1T | Write TAT 1 (T field) |
| 03 | WT2 | Write TAT 2 (HTR) | — | | T2T | Read TAT 2 (T) | T2T | Write TAT 2 (T field) |
| 04 | B0 | General Stack B0 | — | | W1 | Read WAM 1 | W1 | Write WAM 1 |
| 05 | B1 | General Stack B1 | — | | W2 | Read WAM 2 | W2 | Write WAM 2 |
| 06 | B2 | General Stack B2 | — | | W3 | Read WAM 3 | W3 | Write WAM 3 |
| 07 | B3 | General Stack B3 | — | | — | | — | |
| 10 | PEC | Prot Error Code | — | | CM1 | Read CAM 1 | CM1 | Write CAM 1 |
| 11 | — | | — | | CM2 | Read CAM 2 | CM2 | Write CAM 2 |
| 12 | — | | — | | — | | MK1 | Write MASK 1 REG |
| 13 | — | | — | | MTU | Match (upper) | MK2 | Write MASK 2 REG |
| 14 | — | | KL | Constant (lower) | — | | — | |
| 15 | — | | KU | Constant (upper) | — | | — | |
| 16 | — | | — | | — | | MVR | Write MEM → VAT DATA REG |
| 17 | — | | — | | — | | — | |

TABLE III

D FIELD DEFINITIONS - FORMAT 1, 1K, 2, 3 INSTRUCTION

| OCTAL CODE | D1 MNEM | D1 DEFINITION | D2 MNEM | D2 DEFINITION |
|---|---|---|---|---|
| 00 | A0 | General Stack A0 | NOD | No Destination |
| 01 | A1 | General Stack A1 | — | |
| 02 | A2 | General Stack A2 | — | |
| 03 | A3 | General Stack A3 | — | |
| 04 | B0 | General Stack B0 | — | |
| 05 | B1 | General Stack B1 | — | |
| 06 | B2 | General Stack B2 | — | |
| 07 | B3 | General Stack B3 | — | |
| 10 | C0 | General Stack C0 | DSP | Display Register |
| 11 | C1 | General Stack C1 | — | |
| 12 | C2 | General Stack C2 | IPD | IPB Data Register |
| 13 | C3 | General Stack C3 | IPC | IPB Command Register |
| 14 | ACN | Accumulator | ARR | Mem. Addr. Reg, Read |
| 15 | ACU | Accumulator (U) | ARW | Mem. Addr. Reg, Write |
| 16 | ACL | Accumulator (L) | ARP | Mem. Addr. Reg, CP (R/W) |
| 17 | ACS | ACC (L → U, U → L) | ARV | Mem. Addr. Reg, CP (R/W) if no ATE's |

As previously indicated, the ALU field defines either a mathematical operation or a logical operation depending upon whether the low order bit of the F field is a 0 or a 1. The ALU field definitions for arithmetic operations and logical operations are the same for instructions having Formats 1, 1K, 2, and 3. These definitions are as follows:

| OCTAL CODE | MNEMONIC (ARITHMETIC OPERATIONS) | |
|---|---|---|
| 00 | XX | where XX → X Bus |
| 01 | XXF | AD → X Bus + Y Bus |
| 02 | XXS | SU → X Bus − Y Bus − 1 |
| 04 | AD | DC → X Bus − 1 |
| 05 | ADF | F → Force Carry |
| 06 | ADS | S → Carry Save |
| 10 | SU | |
| 11 | SUF | |
| 12 | SUS | |
| 14 | DC | |
| 15 | DCF | |
| 16 | DCS | |

| OCTAL CODE | MNEMONICS (LOGICAL OPERATIONS) | DEFINITION |
|---|---|---|
| 00 | NX | ALU = $\overline{X\ BUS}$ |
| 01 | NOR | ALU = $\overline{X\ BUS + Y\ BUS}$ |
| 02 | NXAY | ALU = $(\overline{X\ BUS}) \cdot (Y\ BUS)$ |
| 03 | ZERO | ALU = 0 |
| 04 | NAND | ALU = $\overline{(X\ BUS) \cdot (Y\ BUS)}$ |
| 05 | NY | ALU = $\overline{Y\ BUS}$ |
| 06 | EϕR | ALU = X BUS ⊕ Y BUS |
| 07 | XANY | ALU = (X BUS) · $(\overline{Y\ BUS})$ |
| 10 | NXϕY | ALU = $\overline{X\ BUS} + Y\ BUS$ |
| 11 | NEϕR | ALU = $\overline{X\ BUS \oplus Y\ BUS}$ |
| 12 | Y | ALU = Y BUS |
| 13 | AND | ALU = (X BUS) · (Y BUS) |
| 14 | ϕNE | ALU = 1 |
| 15 | XϕNY | ALU = X BUS + $\overline{Y\ BUS}$ |
| 16 | ϕR | ALU = X BUS + Y BUS |
| 17 | X | ALU = X BUS |

The M1 field definitions for Format 1, 1K, 2, and 3 instructions are as follows:

| OCTAL | MNEMONICS | |
|---|---|---|
| 0 | D1 | where D1 → D1 destination |
| 2 | D1S | D2 → D2 destination |
| 4 | D1I | S → Set ALU STATUS |
| 6 | D1IS | I → Send IPB interrupt |
| 10 | D2 | |
| 12 | D2S | |
| 14 | D2I | |
| 16 | D2IS | |

The low order bit of the M1 field is not assigned. If the next higher order bit is a 1, it sets ALU STATUS. When the next to the high order bit is a one, it causes an IPB interrupt to be sent to the IPB if the IPB stack is not full. As previously stated, the high order bit selects either a D1 or D2 destination.

The M2.2 field of a Format 1 instruction can have an octal value between 0 and 3, but it functions in combination with the high order bits of the F field to define group branches causing the following operations:

TABLE IV

| INSTRUCTION | OCTAL CODE | MNEMONIC | |
|---|---|---|---|
| | 0 | STP | Unconditional branch, STOP VAT |
| R0A, R0L (Gp 0 Branches) | 1 | SNC | Branch and STOP VAT if NOT CARRY |
| | 2 | ATE | Branch if Address Translation Error |
| | 3 | ASM | Branch if Associative Miss |
| | 0 | UBR | Unconditional Branch |
| R1A, R1L (GP 1 Branches) | 1 | SP1 | Branch if Single Precision ALU = 1 |
| | 2 | DP1 | Branch if Double Precision ALU = 1 |
| | 3 | CRY | Branch if CARRY |
| | 0 | NBR | No Branch |
| R2A, R2L (GP 2 Branches) | 1 | IPF | Branch if Performance Monitor IPB Stack FULL |
| | 2 | NRI | Branch if CP READ INITIATE Line not set |
| | 3 | MA | Branch if VAT MEM ACT flip flop is set |
| | 0 | VMR | Branch if VAT Memory Resume Error |

TABLE IV-continued

| INSTRUCTION | OCTAL CODE | MNEMONIC | |
|---|---|---|---|
| R3A, R3L (GP 3 Branches) | 1 | K1 | Branch if Switch Key 1 set |
| | 2 | K2 | Branch if Switch Key 2 set |
| | 3 | K3 | Branch if Switch Dey Key set |
| | 0 | ST0 | Branch if Display Status bit 0 is set |
| R4A, R4L (GP 4 Branches) | 1 | ST1 | Branch if Display Status bit 1 is set |
| | 2 | ST2 | Branch if Display Status bit 2 is set |
| | 3 | ST3 | Branch if Display Status bit 3 is set |

The M2.2 field for Format 2 and 3 instructions defines the following operations.

| OCTAL CODE | MNEM | |
|---|---|---|
| 0 | NO | where NO → do nothing |
| 1 | B | B → load Bank Reg |
| 2 | AS | AS → set Addr Tran Status |
| 3 | ASB | |

If the low order bit of the M2.2 field is a one, it causes the Bank Register to be loaded. If the high order bit of the M2.2 field is a one, it sets the address translator status and loads the hit register.

The M2.1 field definitions for Format 2 and 3 instructions are as follows:

they will control one stage of the status register as follows:
X0 — Reset
01 — Set
11 — No change Where the octal code represents the octal value of the bits in the S1 or the S2 field, the legal mnemonics for the S1 and S2 fields are as follows:

| OCTAL CODE | MNEM | |
|---|---|---|
| 17 | ZZ | where Z → No change |
| 15 | ZS | S → Set |
| 14 | ZR | R → Reset |
| 07 | SZ | NOTE: S2 MNEMONIC → STATUS 0,1 |
| 05 | SS | |
| 04 | SR | S1 MNEMONIC → STATUS 2, 3 |
| 03 | RZ | |

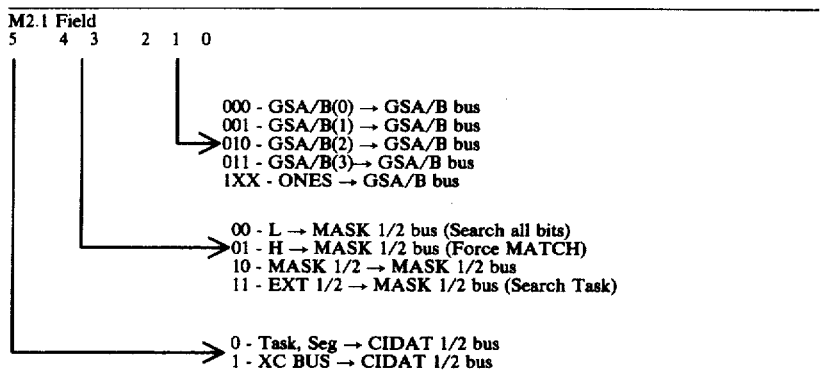

```
M2.1 Field
5  4 3   2 1 0
         └─── 000 - GSA/B(0) → GSA/B bus
              001 - GSA/B(1) → GSA/B bus
              010 - GSA/B(2) → GSA/B bus
              011 - GSA/B(3)→ GSA/B bus
              1XX - ONES → GSA/B bus └────── 00 - L → MASK 1/2 bus (Search all bits)
              01 - H → MASK 1/2 bus (Force MATCH)
              10 - MASK 1/2 → MASK 1/2 bus
              11 - EXT 1/2 → MASK 1/2 bus (Search Task)

└───────── 0 - Task, Seg → CIDAT 1/2 bus
              1 - XC BUS → CIDAT 1/2 bus
```

LEGAL MNEMONICS:

| OCTAL CODE | MNEM | OCTAL CODE | MNEN | OCTAL CODE | MNEM | OCTAL CODE | MNEM |
|---|---|---|---|---|---|---|---|
| 00 | S0 | 10 | F0 | 20 | R0 | 30 | E0 |
| 01 | S1 | 11 | F1 | 21 | R1 | 31 | E1 |
| 02 | S2 | 12 | F2 | 22 | R2 | 32 | E2 |
| 03 | S3 | 13 | F3 | 23 | R3 | 33 | E3 |
| 04 | S4 | 14 | F4 | 24 | R4 | 34 | E4 |
| 40 | CS0 | 50 | CF0 | 60 | CR0 | 70 | CE0 |
| 41 | CS1 | 51 | CF1 | 61 | CR1 | 71 | CE1 |
| 42 | CS2 | 52 | CF2 | 62 | CR2 | 72 | CE2 |
| 43 | CS3 | 53 | CF3 | 63 | CR3 | 73 | CE3 |
| 44 | CS4 | 54 | CF4 | 64 | CR4 | 74 | CE4 | where  0 → GSA/B(0)      S → Search ALL BITS
       1 → GSA/B(1)      F → Force Match
       2 → GSA/B(2)      R → MASK 1, 2, REG
       3 → GSA/B(3)      E → Search Task
       4 → ONES          C → XC BUS The S1 and S2 fields of a Format 4 instruction are used to control the setting or resetting of the stages in the status register. The two low order bits of field S2 control stage 0 while the two high order bits control stage 1. The two low order bits of field S1 control stage 2 while the two high order bits of the field control stage 3. Considering a single pair of bits, in the S1 or S2 field,

| 01 | RS |
|---|---|
| 00 | RR |

In a Format 4 instruction, each individual bit of the D field causes a specific operation if the value of the bit is 1. The low order bit stops VAT operation. The next bit clears memory resume. The next bit sends a VAT acknowledge pulse to the CP and the high order bit sends a VAT interrupt pulse to the CP.

The legal mnemonics for the D field are as follows:

| OCTAL CODE | MNEM | |
|---|---|---|
| 0 | NNNN | where N → No operation |
| 1 | NNNS | S → Stops VAT |
| 2 | NNRN | R → Clear MEMORY RESUME |
| 3 | NNRS | A → VAT ACKNOWLEDGE |
| 4 | NANN | I → VAT INTERRUPT |
| 5 | NANS | |
| 6 | NARN | |
| 7 | NARS | |
| 10 | INNN | |
| 11 | INNS | |
| 12 | INRN | |
| 13 | INRS | |
| 14 | IANN | |
| 15 | IANS | |
| 16 | IARN | |
| 17 | IARS | |

Insofar as the present invention is concerned, the ALU field of a Format 4 instruction should have the octal value 2. The jump address is in M1.2 and the only mnemonic is as follows:

| OCTAL CODE | MNEM | |
|---|---|---|
| 2 | JP | M1.2 field jump LOGIC CIRCUITS |

Micro-Program Counter (µP)

Figure 4:
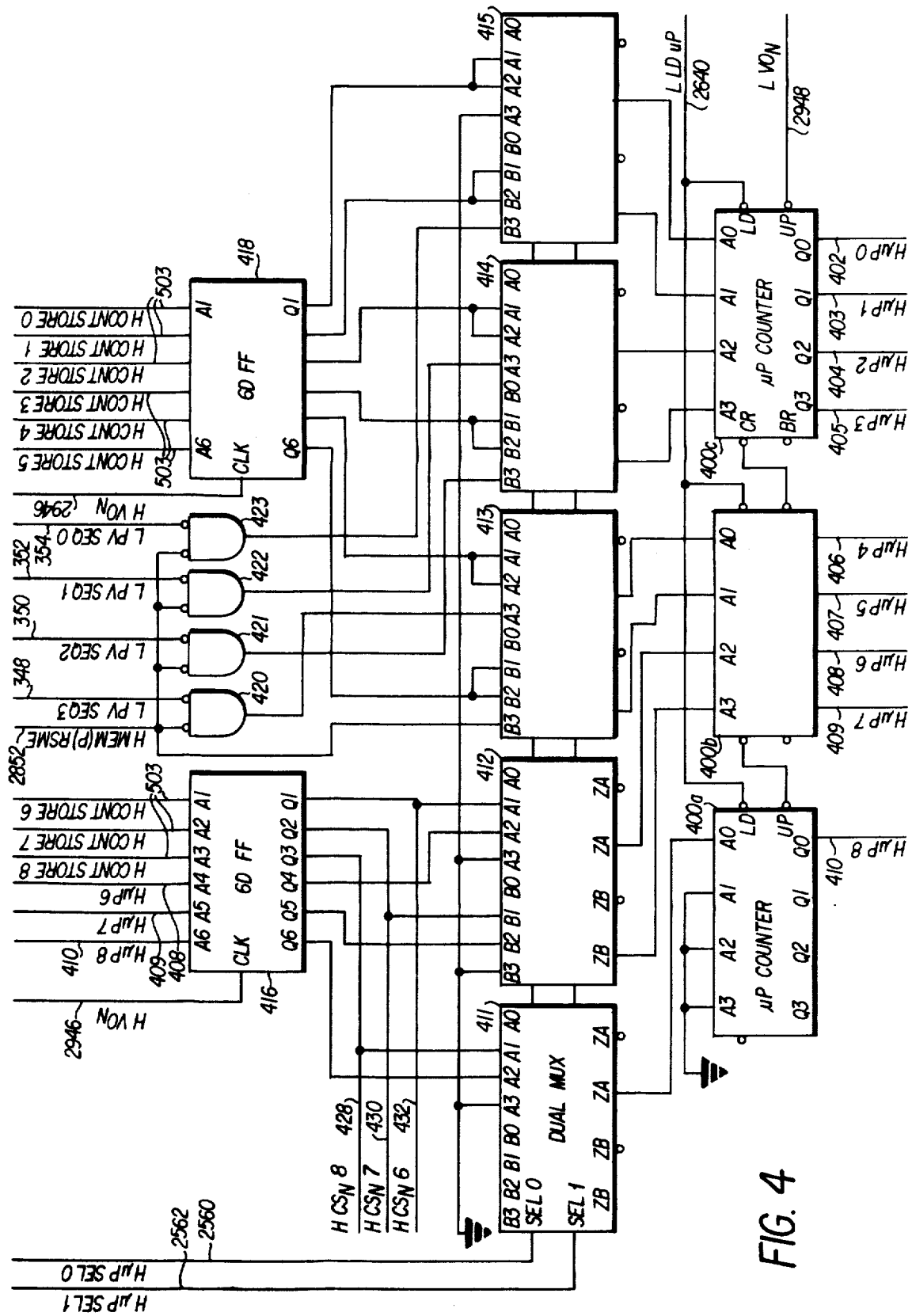
FIG. 4 shows the microprocessor counter.
Figure 5:
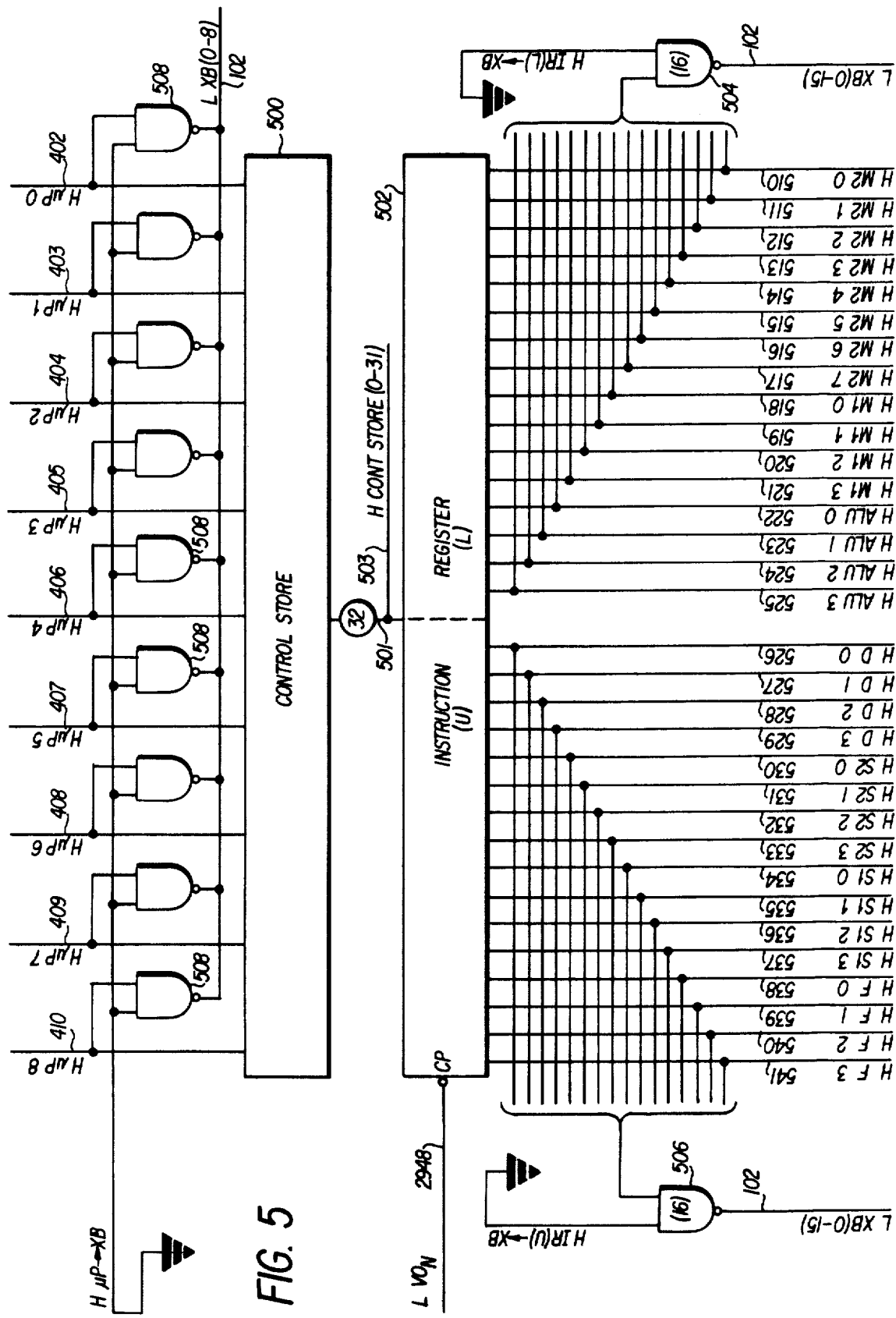
FIG. 5 shows the control store and instruction register.

As shown in FIG. 4, µP 400 comprises three counter chips 400A-400C, each containing four binary stages. µP requires only nine binary stages, hence the three high order stages of chip 400A are connected to ground. The count in µP is incremented by one each time the clock signal $V0_n$ occurs. See FIG. 30. The outputs from µP are designated µP0-µP8 and these signals are applied to the Control Store 500 to read the new instruction from the control store each time µP is incremented.

Under certain conditions, it is necessary to clear the count in µP and insert a new value therein. This may occur when a jump or branch instruction is executed or when the VAT receives a request from the CP for communication between the VAT and CP. The counter µP receives the signal load µP to enter the new value into the counter. The value entered into the counter is derived from five dual multiplexers (MUX) 411-415. The A1, A2, B1 and B2 inputs of the MUXs are connected to the outputs of 12 D-type flip-flops 416 and 418. These flip flops receive the signals Control Store 0 through Control Store 8 directly from the control store 500 each time it is read out. In addition, the signals µP6 through µP8 from the µP counter are applied to three of the flip-flops 416. The reason for this is that the microprogram is arranged so that certain branch instructions cause branches to instructions stored at addresses having the same three high order bits as the address of the instruction branched from. The signals applied to flip-flops 416 and 418 are gated into the flip flops by the clock signal $V0_n$.

The signals from flip-flops 416 and 418 are gated through dual MUXs 411-415 to the µP counter 400 on a selective basis depending upon the levels of two signals µP Select 0 and µP Select 1. These signals are derived from the branch control circuits and are applied to the select 0 and select 1 inputs of all of the dual MUXs. For a Format 1 instruction, µP Select 0 is at the low level while µP Select 1 is at the high level. This selects the A2 and B2 inputs of dual MUXs 411-415 for gating through to the µP counter. This enters into the counter an address formed by concatenating µP8-µP6 with the address read from the control store positions 5 through 0. As will become evident from the subsequent description, the signal Load µP occurs during Format 1 instructions only if the branch condition specified is met. Thus, even though an address may be gated through dual MUXs 411-415, it may not be entered into the µP counter unless a branch is to occur.

The signal Load µP does not occur during Format 2 or Format 3 instructions since it does not matter what value is gated through dual MUXs 411-415.

The signal load µP does occur during Format 4 instructions. Also, during Format 4 instructions µP Select 1 is at the low level while µP Select 0 is at the high level. This selects the A1 and B1 inputs of dual MUXs 411-415 so that the jump address from Control Store bits 8-0 is entered into the µP counter.

The VAT performs operations by executing micro-instruction sequences. These micro instruction sequences are stored in the VAT control store and are executed only upon request from the CP. The sequences are finite in length in that they have no indefinite loops and they always terminate by halting the VAT. The VAT clock is normally disabled, and the VAT is in the Halt condition. It is activated by either one of two types of VAT activation requests from the CP. These are reference requests (implicit activation) whereby the CP requests a reference to the memory 150, and VAT-CP communication requests (explicit activation) wherein the CP requests a direct transfer of information between itself and the VAT.

When the VAT receives a memory reference request from the CP, micro-instruction execution is begun by executing the micro-instruction contained in the instruction register 502, and then using the contents of the µP counter to fetch the next micro-instruction. The VAT remains active and continues to execute micro-instructions until the sequence halts itself by executing a stop VAT micro-instruction.

On the other hand, when the VAT receives a VAT-CP communication request from the CP, VAT micro-instruction execution is begun by loading µP 1-4 with the contents of the VAT activation micro-instruction M field, present in Sequence Register 315 of the CP, while loading µP5-8 and µP0 with 0. This value is then used to fetch the first micro-instruction. The VAT then remains active and continues to execute micro-instructions until the sequence terminates itself by executing a stop VAT micro-instruction.

When a VAT-CP communication request is made, the contents of the Sequence Register 315 in the CP is applied to four NANDS 420, 421, 422, and 423. The signal memory (P) resume is normally at the low level and enables each of the NANDS 420-423. The output of NAND 420 is applied to the A3 input of dual MUX 413, the ouput of NANDS 421 and 422 are applied to the B3 and A3 inputs of dual mux 414, and the output of NAND 423 is applied to the B3 input of dual mux 415. In addition, a ground level signal is tied to inputs 411-A3, 412-B3, 412-A3, and 415-A3. Both the signals µP Select 1 and µP Select 0 go to the high level in response to a VAT-CP communication request. This selects the A3 and B3 inputs of dual MUXs 411-415 so that an address is entered into the μP counter 400 in accordance with the code applied to NANDS 420-423 by the CP. The signal Load μP is activated by a VAT-CP communication request signal to enable the address to be entered into the counter. Table V lists the various VAT sequences performed in response to each combination of signals applied to NANDS 420-423. For example, if NANDS 420 and 422 are both enabled, then a signal passes through 413-A3 to 400B-A0 and another signal passes through 414-A3 to 400C-A2. This sets the μP counter to the octal value 24. This value is then applied to the Control Store 500 to read out the address 24. As shown in the micro code listing at the end of this specification, address 24 stores a jump instruction specifying a jump to control store address 561. As further shown in the micro code listing, address 561 is the address of the first instruction of the load CAM/WAM sequence.

A special form of activation is utilized when a virtual memory request results in a memory resume error. A memory resume error may occur when an attempt is made to reference non-existent memory. Under normal circumstances, the VAT, when receiving a memory request from the CP, performs address translation and protection checks, sends the request to memory if no address translation errors occur, and then halts the VAT. When the memory has processed the memory request, it responds with a signal Data Available (and the data read up if a memory read is being performed). The VAT automatically routes the Data Available signal to the CP regardless of whether the VAT is running or not. The CP, which is waiting for the memory cycle to complete, receives the Data Available signal, uses it to load its memory data register with the data read from the memory, and then continues with its micro-instruction execution. However, when a memory resume error occurs, the Data Available signal is

TABLE V

| VAT SEQUENCE CODE | ENTRY ADDRESS (OCTAL) | COMMENTS |
| --- | --- | --- |
| 0 | 0 | Initialization Sequence |
| 1 | 2 | Display Sequence |
| 2 | 4 | Read Abnormal Status Sequence |
| 3 | 6 | Load TAT Sequence |
| 4 | 10 | Lock Subsegment Sequence |
| 5 | 12 | Unlock Subsegment Sequence |
| 6 | 14 | Clear Task Sequence |
| 7 | 16 | Performance Dump Sequence |
| 10 | 20 | CP Display Set Sequence |
| 11 | 22 | CP Display Clear Sequence |
| 12 | 24 | Load CAM/WAM Sequence |
| — | 40 | CP Memory Resume entry point into the Virtual to Absolute Sequence | not generated and the CP is locked out waiting for the memory cycle to be completed (i.e., waiting to receive the Data Available signal). To overcome this problem, memory resume errors are used to explicitly activate the VAT at control store location $40_8$. This location is an entry point into a sequence that releases the CP by generating and sending an artificial Data Available to the CP.

In FIG. 4, the address 40 is generated by applying the high level signal Memory (P) Resume to the B3 input of dual mux 413. μP Select 0 and μP Select 1 will both be at the high level to gate this bit through to input A1 of 400B. This stage of the counter is set because the signal Load μP will be active. Thus, the value 40 is entered into the μP counter.

Control Store and Instruction Register

The control store 500 is a read only memory capable of storing 512 words each having 32 bits. The control store is addressed by the signals μP0-μP8 on leads 402-410. In response to each set of addressing signals, the control store produces a 32 bit word on a bus 501, and this word is entered into an Instruction Register (IR) 502. In addition, each word is applied to a bus 503 where it is distributed throughout the VAT to control various functions.

Instructions are gated into IR 502 by the signal $V0_n$. The outputs of IR on leads 510-541 have designations corresponding to the various fields of the instruction format shown in FIG. 42. For example, the leads 538-541 have the designations F0-F3 indicating that they correspond to the four bits of the F field of an instruction word. The signals on leads 510-541 are distributed throughout the VAT system to perform various control functions. In addition, the output signals from either the upper half or the lower half of IR 502 may be gated onto the XB bus 102. The 16 low order bits of the instruction register are applied to 16 NANDS 504, which are further enabled by the signal IR(L) → XB. The sixteen high orders of IR are applied to 16 NANDS 506 and these NANDS are further enabled by the signal IR(U) → XB.

Nine NANDS 508 are provided for gating the contents of the μP counter onto the XB bus, but insofar as the present invention is concerned may be considered to be permanently disabled.

S1 and S2 Field Decoding

FIG. 6 shows the primary circuits for decoding the S1 field of an instruction contained in IR 502. In all instructions except Format 4, the S1 field designates the source of an operand which must be gated onto one of the X buses and through the X selector. The signals representing the S1 field are applied to a read only memory (ROM) 600 capable of storing 32 words each 8 bits in length. Each word stores bits in selected bit positions so that, when the word is read out of the memory, gating circuits are energized to gate the selected operand from its source onto a designated X bus, and then gate the operand from the X bus through the X selector. The outputs of ROM 600 are connected to a plurality of NANDS 601-609. The signal FMT1 is applied directly to NANDS 603-605, and is inverted at 610 and applied to NANDS 601, 602, 608, 611 and ROM 600, input A4. The signal FMT1,2,3 is applied directly to NANDS 606 and 607. The signals F2 and F3 are derived from the F field of IR 500 and are applied to a NAND 612. The output of NAND 612 is applied to one input of NAND 611 and the output of NAND 611 is connected to an input of NAND 609.

Referring to Table VI, the first column represents the octal address value applied to ROM 600 and represented by the S1 field, bits 0-3 if a Format 1 instruction is being executed. The second column represents the hexadecimal value stored at each address.

TABLE VI

| OCTAL ADDRESS | HEXADECIMAL OUTPUT |
| --- | --- |
| 00-03 | 1F |
| 04 or 24 | 9C |
| 05 or 25 | 5C |
| 06 | 3C |
| 07-13, 20-23 or 27-33 | 1E |
| 14 | 19 |

TABLE VI-continued

| OCTAL ADDRESS | HEXADECIMAL OUTPUT |
| --- | --- |
| 15, 34 or 35 | 1A |
| 16 or 36 | 0E |
| 17 or 37 | 16 |
| 26 | 3F |

As an example of the operation of ROM 600, consider the case where S1, bits 0-3 has the octal value 02 and a Format 1 instruction is being executed. The ROM responds by producing the output 1F (binary 00011111) to generate the signals X Select 0 and X Select 1, and control NANDS 601-609.

FIG. 7 shows the primary decoding circuits for the S2 field of an instruction. The bits of the S2 field are applied as addressing signals to a ROM 700. ROM 700 has 32 storage locations, each capable of storing a 8 bit word. The signal FMT1 is applied to an addressing input of ROM 700 and to one input of NANDS 702, 704, and 706. These NANDS receive signals from the Q7, Q6, and Q5 outputs, respectively, of ROM 700. The Q4 output is applied to a NAND 708, which is further enabled by the signal FMT3. The Q0 and Q1 outputs of ROM 700 are the signals Y Select 0 and Y Select 1.

ROM 700 functions in much the same manner as ROM 600 in that each storage location stores bits which, when read out, cause certain control functions. Generally speaking, these functions include gating a value onto a Y bus and/or selecting a Y bus for application of its contents to ALU 2000.

Table VII shows the hexadecimal values stored at various addresses in ROM 700.

TABLE VII

| OCTAL ADDRESS | HEXADECIMAL OUTPUT |
| --- | --- |
| 00, 02, 20, 22 or 24 | FC |
| 01, 03, 12, 13, 21, 23, 26 or 32 | FE |
| 04-07, 27 or 33 | FF |
| 10 | DE |
| 11 | F6 |
| 14 | 7E |
| 15 | BE |
| 16 or 36 | EE |
| 17 | FA |
| 25 | FD |
| 30 | DC |
| 31 | F5 |
| 34 | 7C |
| 35 | BD |
| 37 | FB |

All of the S1 and S2 field decoding is not accomplished by the circuits of FIGS. 6 and 7. FIG. 8A shows the decoding of the S1 and S2 fields for the purpose of enabling and selecting registers in General Register Stacks (GS) A and B. S1 0, S1 1, S2 0, and S2 1, are applied to the A0-D0 inputs of a quad mux 800. The A1 and C1 inputs receive the signal M2 0 while the inputs B1 and D1 receive the signal M2 1. The signal FMT1 is applied to quad mux800 as a select signal. FMT1 and M2 2 are applied to a NOR 802 having its output connected to an inverter 804. Therefore, any instruction having Format 1, or any instruction wherein bit M2 2 is a 0, causes inverter 804 to produce the low level signal RGSAB EN. For Format 1 instructions, the select input of quad mux 800 is at the low level, hence the A0-B0 inputs are selected to control the outputs of the quad mux appearing on leads 808, 810, 812, and 814. For other than Format 1 instructions, the A1-D1 inputs derived from the M2 field determine the output signals from the quad mux.

As previously explained, the S1 and S2 fields in Format 4 instructions control the setting of flip-flops in the Status Register. The Status Register 816, which includes four D-type flip-flops, is shown in FIG. 8B. The signals representing the S1 and S2 fields are applied directly to the S and D inputs of the flip flops. These signals are clocked into the flip flops by the signal Set External Status which is at a low level during Format 4 instructions. The outputs of the Status Register are inverted by NANDS 818 to become the signals STATUS 0-STATUS 3.

It will be understood that the inputs S0 and D0, for example, are inputs to one of the flip-flops in the Status Register. If the D0 input is at the low level, then the flip-flop is reset upon the occurrence of the clocking signal. If the D0 input is at the high level, then the flip flop will be set if the S0 input is at the low level. If both S0 and D0 are at the high level when the clocking signal occurs, then there is no change in the state of the flip-flop.

F Field Decoding

FIG. 9 shows the primary circuits for decoding the function field of an instruction word. As previously explained with respect to instruction formats, the function field comprises the three high order bits of an instruction word. As each instruction is read from Control Store 500, the three high order bits are routed over bus 503 to the circuits of FIG. 9. Control Store bit 29 is applied to the A0 input of a decoder 900 while Control Store bit 30 is applied to the A1 input. Control store bit 31 is inverted at 902 and is applied to the enabling input of the decoder. Control Store bit 31 is applied to a NOR 904 which also receives the Z0 output of decoder 900. The Z1, Z2, and Z3 outputs of decoder 900 are inverted by inverters 906, 908, and 910 and applied to the A1 A2, and A3 inputs of three D-type flip-flops in a chip 912. The fourth flip-flop receives the output of NOR 904. The signals applied to flip-flops 912 are clocked in by the signal $V0_n$. All of the flip flops may be reset if the signal ABORT CYCLE drops to the low level.

For Format 4 instructions, Control Store bits 29, 30, and 31 are all at the higher level. Bit 31 enables decoder 900 and bits 29 and 30 cause the decoder to produce a low level signal at its Z3 output. The signal is inverted at 910 and is clocked into one of the flip-flops 912 thereby causing the flip-flop to produce the signal FMT4 on lead 916.

For Format 3 instructions, Control Store bits 31 and 30 are ones and Control Store bit 29 is a 0. Bit 31 enables decoder 900 and bits 30 and 29 cause the decoder to produce an output signal at Z2. This signal is inverted at 908 and sets a flip-flop 912 thus producing the signal FMT3 on lead 918.

For Format 2 instructions, Control Store bits 31 and 29 are ones while Control Store bit 30 is a zero. Bit 31 again enables decoder 900. Bits 30 and 29 cause decoder 900 to produce an output at Z1 which is passed through inverter 906 to a flip-flop 912, thus causing the signal FMT2 on lead 920.

For Format 1 instructions where the F field defines Group 0-3 branches, Control Store bit 31 is a zero. This causes NOR 904 to set a flip flop 912 thus producing a high level signal FMT1 on lead 922, and a low level signal FMT1 on lead 924. For Format 1 instructions defining group 4 branches, Control Store bit 31 is a one, while Control Store bits 30 and 29 are zeros. This combination of signals causes decoder 900 to produce a low level output signal that passes through NOR 904 to set a flip-flop 912 to produce the aforementioned signals on leads 922 and 924.

Figure 26:
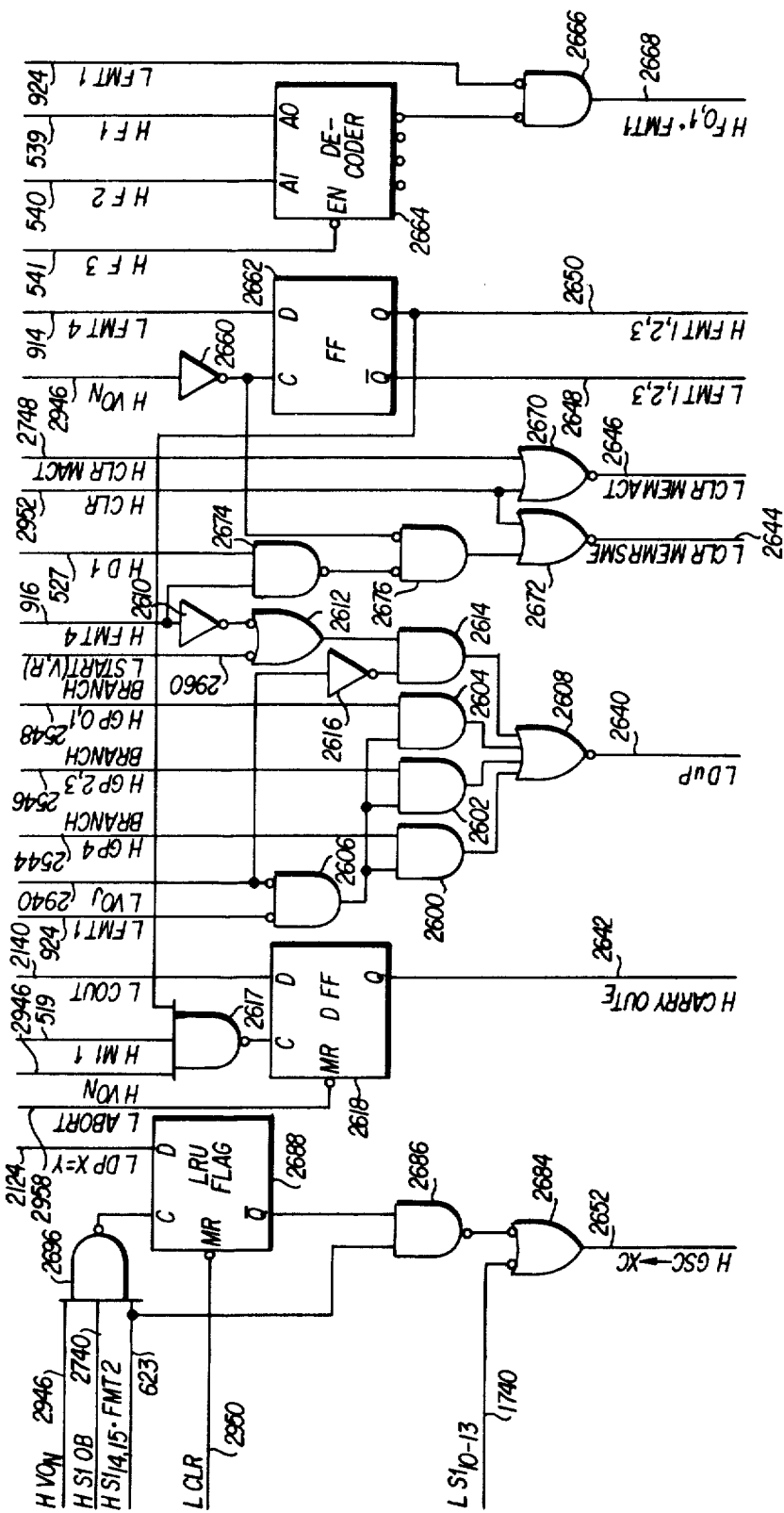
FIGS. 26-28 show the memory control circuits.

FIG. 26 shows additional circuits for decoding the F field. Bits F1 and F2 are applied to a decoder 2664 which is enabled when bit F3 is low. The output of decoder 2664 enables a NAND 2666 which also receives the signal FMT1. NAND 2666 produces a high level output for Format 1 instructions where the F field has the octal value 0 or 1.

D Field Decoding

FIG. 10 shows the primary circuits for decoding the D field of an instruction word. These circuits include four decoders 1000, 1002, 1004, and 1006.

Decoder 1000 receives the signals D 0B and D 1B which represent the two low order bits of the D field. The decoder decodes the value of the two bits and produces a low level output signal at one of four outputs depending upon the value of bits D0 and D1. If both bits are high, decoder 1000 produces the low level signal Accumulator Select on lead 1008. High level signals occur at outputs Z1 and Z2 of the decoder, and these signals are inverted at 1010 and 1012 to produce the low level signals Enable Accumulator Upper and Enable Accumulator Lower on leads 1014 and 1016.

Figure 11:
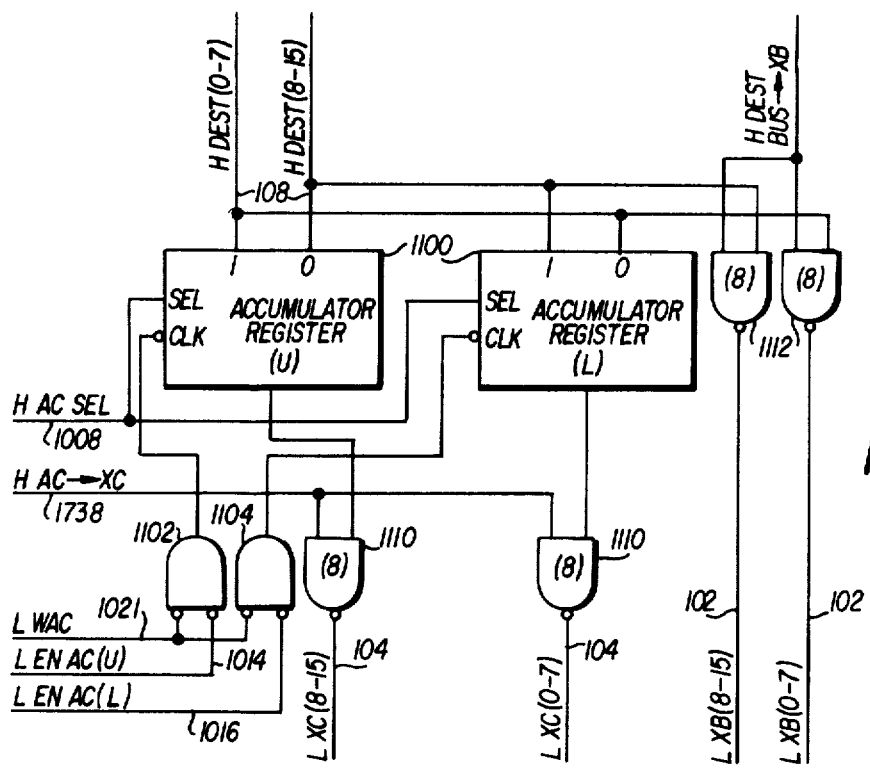
FIG. 11 shows the accumulator register.

In FIG. 11, the signal Accumulator Select is applied to the select inputs of the upper and lower halves of the Accumulator Register 1100. This selects the "one" inputs to both halves of the accumulator so that bits 0–7 on the Destination Bus are applied to AC(U) and bits 8–15 on the Destination Bus are applied to AC(L). The data on the Destination Bus cannot be gated into the register until a clocking signal occurs. This clocking signal is controlled by the signals Enable Accumulator Upper, Enable Accumulator Lower, and Write Accumulator.

The signal Write Accumulator is also generated in FIG. 10. NAND 1018 receives the signals FMT1,2,3 and M1 3 and produces an output that is applied to a NAND 1020. NAND 1020 also receives the clocking signal $V0_E$ and produces an output signal to enable decoder 1002. This decoder receives the two high order bits of the D field and if both bits are ones, decoder 1002 produces the signal Write Accumulator. In FIG. 11, Write Accumulator is applied to two NANDS 1102 and 1104. NAND 1102 is further enabled by the signal Enable Accumulator Upper while NAND 1104 receives the signal Enable Accumulator Lower. With all inputs to NANDS 1102 and 1104 enabled, data may be clocked into both the upper and lower halves of AC. Under the assumed conditions where the D field has the octal value 17, the low order bits on the Destination Bus are clocked into the upper half of AC, and the high order bits on the Destination Bus are clocked into the lower half of AC, provided of course that NAND 1018 is enabled indicating that a Format 1, 1K, 2, or 3 instruction is being executed with a D 1 destination.

The preceding example corresponds to the last line of Table III. From this example, it should be obvious how decoders 1000 and 1002 function to control the Accumulator Register 1100 when the D field has the octal values 14, 15, or 16 in a format 1, 1K, 2 or 3 instruction, and bit M1 3 designates a D 1 destination.

Data in AC is applied to 16 NANDS 1110 which also receive the signal Accumulator → XC. Upon occurrence of the signal Accumulator → XC the contents of the AC are gated onto the XC bus 104. FIG. 11 also shows gates for gating a word on the Destination Bus onto the XB bus. These gates are not utilized in executing the VTOA routine.

In FIG. 10, the decoder 1006 decodes the D field of an instruction to control the loading of the Interprocessor Buffer (IPB) Command Register 1200, the IPB Data Register, and a Display Register. The Display Register is not shown in the drawing. Decoder 1006 is enabled only when decoder 1004 produces a low level signal at its Z2 output. Decoder 1004 is enabled only by a Format 1, 1K, 2 or 3 instruction where the M1 3 bit specifies a destination 2. Under these conditions, NAND 1002 produces a low level signal to enable decoder 1004. When enabled, the decoder 1004 produces a low level signal at its Z2 output only if bit D3 is a one and bit D2 is a 0. This output signal is applied through an inverter 1024, to one input of a NAND 1026 which also receives the clocking signal $V0_E$. The output of NAND 1026 enables decoder 1006. When the decoder is enabled, it produces one of the signals Load Display, Load IPB Register, Load IPB Command depending upon whether the two low order bits of the D field have the values 00, 10, or 11.

Figure 12:
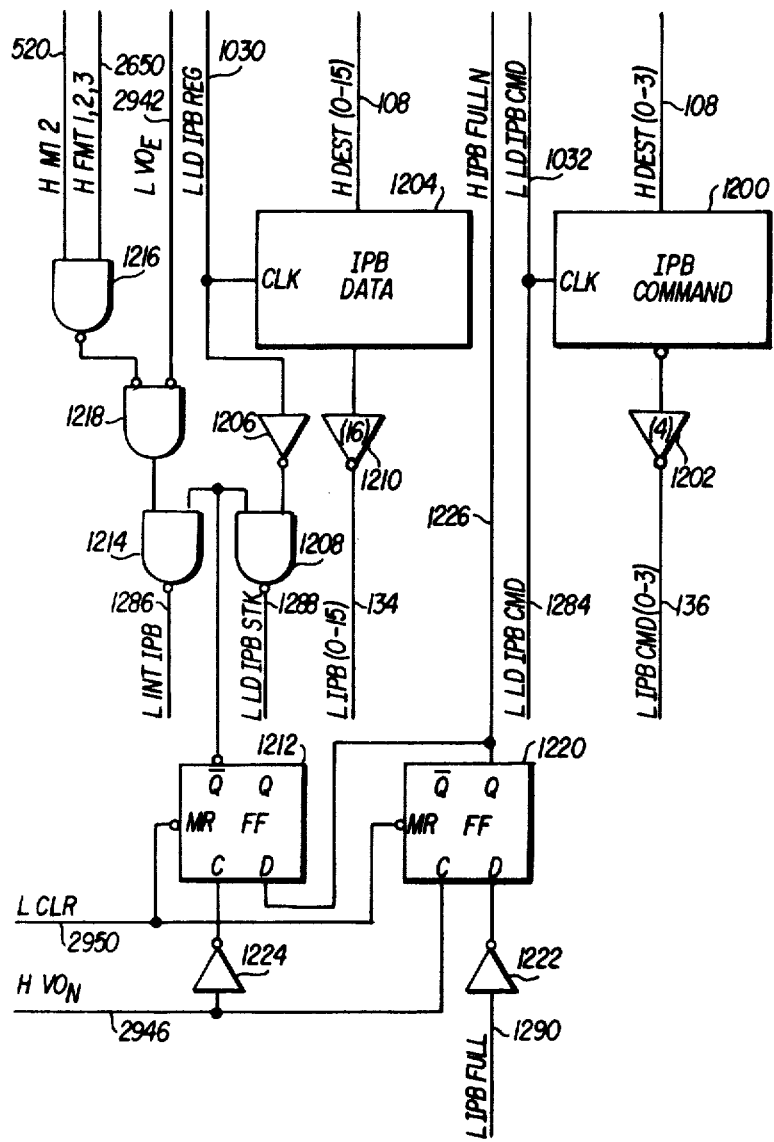
FIG. 12 shows the interprocessor buffer data and command registers.
Figure 35:
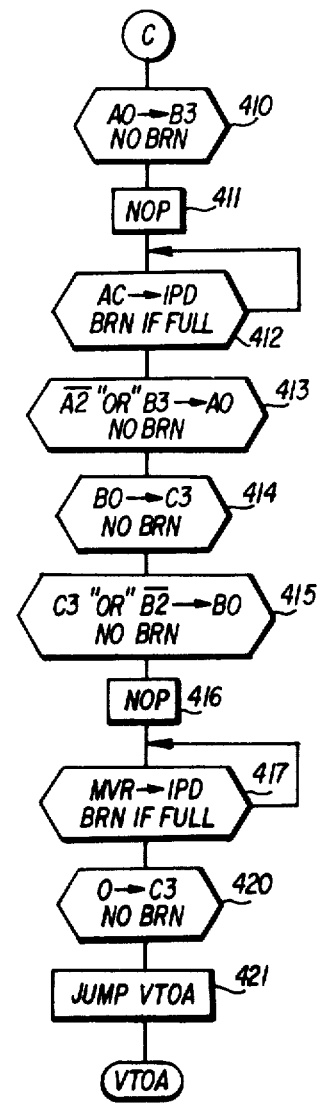

In FIG. 12, the signal Load IPB Command is applied to the clocking input of a four position IPB Command Register 1200. The register 1200 receives the four low order bits on the Destination Bus 108, and upon occurrence of the clocking signal gates these bits through four inverters 1202 to the Performance Monitor Processor (PMP) 153. The signal on lead 1032 is also applied to PMP 153 to inform it that a command is present in the IPB Command Register 1200 and ready for transfer to PMP.

The signal Load IPB Register is applied as a clocking input to the IPB Data Register 1204, and through an inverter 1206 to one input of a NAND 1208. Register 1204 has 16 stages for receiving 16 bit words from the Destination Bus 108. Upon occurrence of the clocking signal, a word is gated into the register 1204 and its output is applied through 16 inverters 1210 to PMP 153. If the flip-flop 1212 is reset, it enables NAND 1208 which produces the signal Load IPB Stack. This signal is applied to PMP 153 and gates the output of inverters 1210 into a storage stack of the performance monitor.

The output of flip-flop 1212 also controls NAND 1214 which generates the Interrupt IPB signal. This signal is sent to PMP to signal it that the VAT has data in the register 1204 ready for transfer to PMP. The signals M1 2 and FMT1,2,3 enable a NAND 1216 having its output connected to another NAND 1218. NAND 1218 is further enabled by the clocking signal $V0_E$ and the output of NAND 1218 conditions NAND 1214 to produce the interrupt signal when flip-flop 1212 is in the reset state. Flip-flops 1212 and 1220 provide synchronization for data transfers from the VAT to PMP 153. The signal IPB full from PMP is passed through an inverter 1222 to the D input of flip-flop 1220. The clock signal $V0_n$ is applied to the C input of flip-flop 1220 and is inverted at 1224 and applied to the C input of flip-flop 1212. The output of flip-flop 1220 is the high level signal IPB Full$_n$ and this signal is applied to the D input of flip-flop 1212. Normally, both flip-flops 1212 and 1220 are in the reset state. When the buffer in PMP is full, it applies a signal to inverter 1222 that drives the D input of flip-flop 1220 to the high level. When the clock signal goes to the low level, flip-flop 1220 is set, producing high level signal on leads 1226. This latter signal enables the D input of flip flop 1212 and when the clocking signal $V0_n$ returns to the low level, flip-flop 1212 is set. When flip flop 1212 is set, its output blocks NANDS 1208 and 1212 thereby preventing the transfer of data to PMP. When PMP is ready to accept data again, it applies a high level signal to inverter 1222 to reset flip-flop 1220 and the output of flip-flop 1220 in turn resets flip-flop 1212.

If the Memory Address Register (MAR) 1340 is the selected destination for an operand, decoder 1004 in FIG. 10 is enabled as previously described. However, both bits D3 and D2 will be at the high level thus causing the decoder to produce an output at Z3. The output of decoder 1004 is applied to one input of a NAND 1031, and is also passed through an inverter 1033 to become the signal D2·MAR. This signal is applied to the memory control circuits of FIG. 28. The signal D2·MAR is also applied to one input of a NAND 1036 and enables the NAND as long as decoder 1004 produces a low level signal at output Z3. The clock signal $V0_E$ is applied to a second input of NAND 1036 and the output of the NAND is the signal Load Memory Address Register, which is applied as a clocking input to MAR 1340.

NAND 1042 receives high level signals at its inputs if the two low order bits of the D field are ones. The output of NAND 1042 enables a second input of NAND 1031, hence for Format 1, 1K, 2, and 3 instructions with a D2 destination equal to octal 17, NAND 1031 produces the signal D2·MAR(V).

Decoder 1002 enables one of the stack registers GSA, GSB, or GSC if the decoder is enabled and bits D3 and D2 of an instruction have the values 10, 01, or 00. As previously indicated, decoder 1002 is enabled for Format 1, 1K, 2 and 3 instructions where the M1 3 bit calls for a destination 1. If the decoder is enabled, and bits D2 and D3 are both 0, then the decoder produces the signal WGSA Enable. If D3 and D2 are zero and one, then the decoder produces the signal WGSB Enable, and if D3 is a one, and D2 is a zero, the decoder produces the signal WGSC Enable. These outputs of the decoder are applied to FIG. 13 to enable the writing into a selected one of the registers in one of the register stacks GSA, GSB or GSC.

General Stack Registers

Figures 13A, 13B:
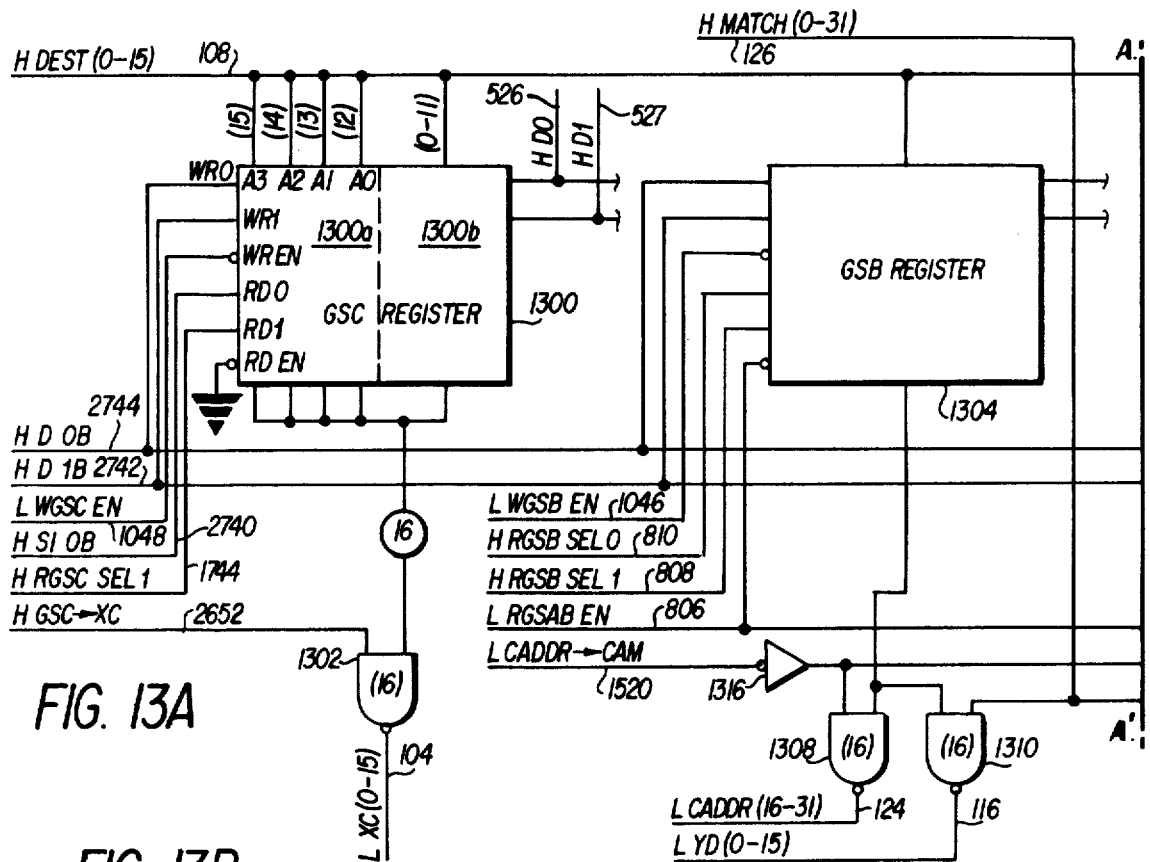
FIGS. 13A and 13B show the general stack registers A, B, and C as well as the bank and memory address registers for addressing memory.

FIGS. 13A and 13B show the three general stack registers GSA, GSB, and GSC. Referring to GSC register stack 1300, the stack comprises four 4×4 chips with the connections to only one of these chips 1300A being shown in detail. The chips are arranged so that the GSC register stack provides a means for storing four words each 16 bits in length. When an instruction specifies the GSC register stack as the destination, the signals D 0B and D 1B are applied to the Write 0 and Write 1 inputs to select one of the four registers for writing. Writing cannot occur however, unless the signal WGSC Enable is also present. Where the GSC register stack is designated by an instruction as a source, the signals S1 and 0B and RGSC Select 1 determine which one of the four registers in stack GSC will be read out. Data is written into the GSC stack from the destination bus with FIG. 13A showing the four high order bits being applied to chip 1300A and the 12 low order bits being applied to the three chips generally designated 1300B. When a word is read out of a selected register in the GSC stack, the 16 bits are applied to 16 NANDS 1302 which are further enabled by the signal GSC → XC so that when this signal occurs, the contents of the selected GSC register are read out of the stack onto the XC bus.

GSA 1306 and GSB 1304 are essentially of the same construction as GSC 1300. Both the GSA and GSB stacks must receive a low level signal on lead 806 to enable these stacks to be read out. The two signals RGSB SELECT 0 and RGSB SELECT 1 select the proper one of the four registers to be read out of the B stack while the signals RGSA SELECT 0 and RGSA SELECT 1 selects the proper register to be read out of the GSA stack. Data is written into both the GSA and GSB stacks from the Destination Bus 108. The output of GSB is applied to a first set of NANDS 1308 and a second set of NANDS 1310. The output of GSA is applied to a first set of NANDS 1312 and a second set of NANDS 1314. The signal CADDR → CAM is inverted at 1316 and applied to the NANDS 1308 and 1312. When this signal occurs, it gates an output word from GSA onto the lower 16 bit positions of the cam address bus 122/124 and an output from the GSB stack onto the upper 16 bits of the cam address bus.

Bits 16-31 on the match bus 126 are applied to the NANDS 1310 where they are matched with the output of GSB. NANDS 1310 thus produce a signal on the YB bus, bit positions 0-15, for every position where a signal on the match bus 126 and a corresponding signal from GSB are both ones. NANDS 1314 match bit positions 0-15 on the match bus with the output from GSA and for each position where both bits are a 1, a low level signal is produced on the XD bus.

Both MAR 1340 and the Bank Register 1342 are shown in FIG. 13B. MAR receivers 16-bit words from the Destination Bus 108 and this data is clocked into the register by the signal LOAD MAR. The outputs from the 15 low order positions of MAR are passed through a set of NANDS 1344 to become the address which is transmitted from the VAT to the memory. The high order position of the memory address register is applied to the A0 input of a decoder 1346. The decoder has a second input A1 derived from the Q1 output of the Bank Register 1342. The Band Register receives the signals YC0 YC4 and these signals are clocked into the register by the signal LOAD BANK REGISTER. The full capacity of the Bank Register is not utilized, but is available for further memory expansion. The decoder 1346 is permanently enabled and produces one of the signals VM MS0 - VM MS 3 depending upon the values of the two signals applied to its A0 and A1 inputs. The output signals from the decoder are applied to the memory system 150 to select the memory bank which is to be operative.

Content Addressed Memory

Figure 14:
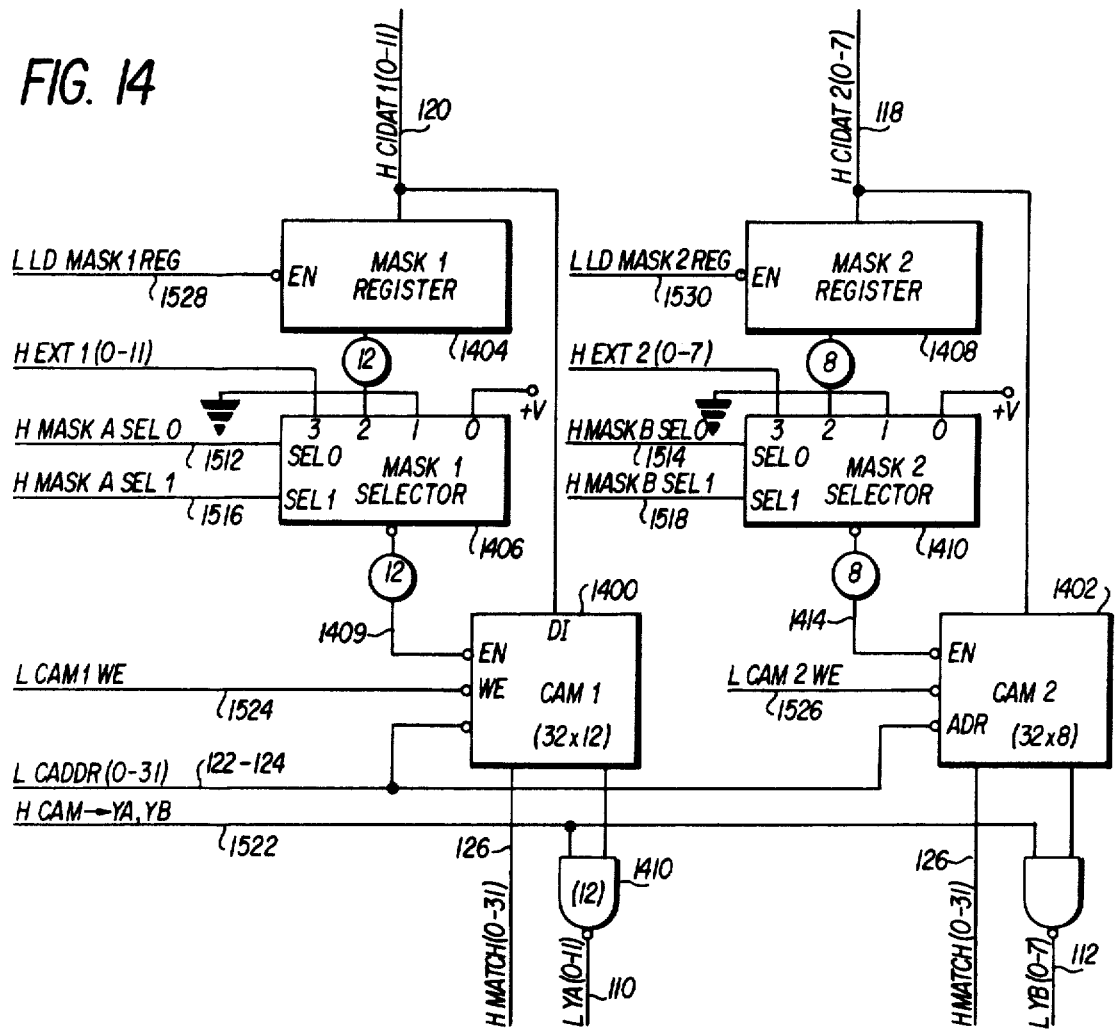
FIG. 14 shows the content addressed memories and their associated mask registers and selectors.

As shown in FIG. 14, the content addressed memory (CAM) comprises two units 1400 and 1402 designated CAM 1 and CAM 2. CAM 1 has associated with it a Mask Register 1404 and a Mask Selector 1406 while CAM 2 has associated with it a Mask Register 1408 and a Mask Selector 1410. The Mask 1 Register comprises 12 flip flops which receive 12 bit words from the CIDAT 1 Bus 120. These words are also applied to the data input of CAM 1. A word on the CIDAT 1 Bus is gated into the Mask Register 1404 by the signal Load Mask 1 Register.

Mask Selector 1406 is a gating circuit having four sets of 12 inputs each. Twelve-bit words stored in the Mask Register 1404 are applied to inputs 1406-2. Inputs 1406-1 and 1406-3 are tied to ground while inputs 1406-0 are tied to +V. The signals Mask A Select 0 and Mask A Select 1 are applied to Selector 1406 and, depending upon the level of these signals, one set of input signals to the selector is gated through to the bus 1409. These signals are applied to enabling inputs of CAM 1. For reading or writing operations, a 32 bit address is applied to CAM 1 over bus 122/124. Linear addressing is employed, hence only one bit of the address will be true to select the corresponding cell or address. For writing operations, the signal CAM 1 Write Enable must be at the low level to enable writing into the memory. In addition, during writing operaion, the outputs from Selector 1406 are employed to selectively enable desired bit positions in the addressed word to allow writing into these positions.

During a reading operation, a word is read out of CAM 1 to a set of NANDS 1410 which are all enabled by the signal CAM → YA, YB. The output of CAM 1 is applied to the YA bus.

When doing an associative search, the key word appearing on CIDAT 1 Bus 120 is applied to the data inputs of CAM 1. During search operations, the output from selector 1406 enables those bit positions which are to be included in the search. If any address in CAM 1 contains a word which matches the key word applied to CAM 1 over the CIDAT 1 Bus, at least in those bit positions which are enabled by the signals on bus 1409, then CAM 1 produces a match signal on one of the leads in match bus 126. The match bus includes 32 leads, one for each address in CAM 1. During the VTOA routine the signals on the Match Bus are utilized to address WAM to read out the subsegment descriptor associated with the CAM cell which matches the key word. CAM 1 stores subsegment numbers and CAM 2 stores task names while the WAM memory stores the subsegment descriptors corresponding to these task names and subsegment numbers. Again, linear addressing is employed, hence only one of the leads in bus 126 will carry a high level signal at any one time.

CAM 2 and its associated Mask Register 1408 and Selector 1410 function in much the same manner as CAM 1 and its associated circuits. However, CAM 2 stores 32 8 bit words which are task names. Therefore, Mask Register 1408 has only eight stages and Mask Selector 1410 has four positions for selecting any one of four input words which are eight bits in length. Thus, the bus 1414 includes only eight leads for enabling up to 8 bits to be included in a search operation or a write operation. There is one minor difference between selectors 1406 and 1410. The 1410-3 are all tied to a positive voltage whereas the inputs 1406-3 are all tied to ground. This enables a search to be conducted on a task name only. However, during the VTOA routine the key word T, S appears on buses 118 and 120 to simultaneously search CAM 1 and CAM. Thus, in the VTOA routine, CAM 1 and CAM 2 act as memory holding 32 20-bit search tags T, S.

Figures 15, 17:
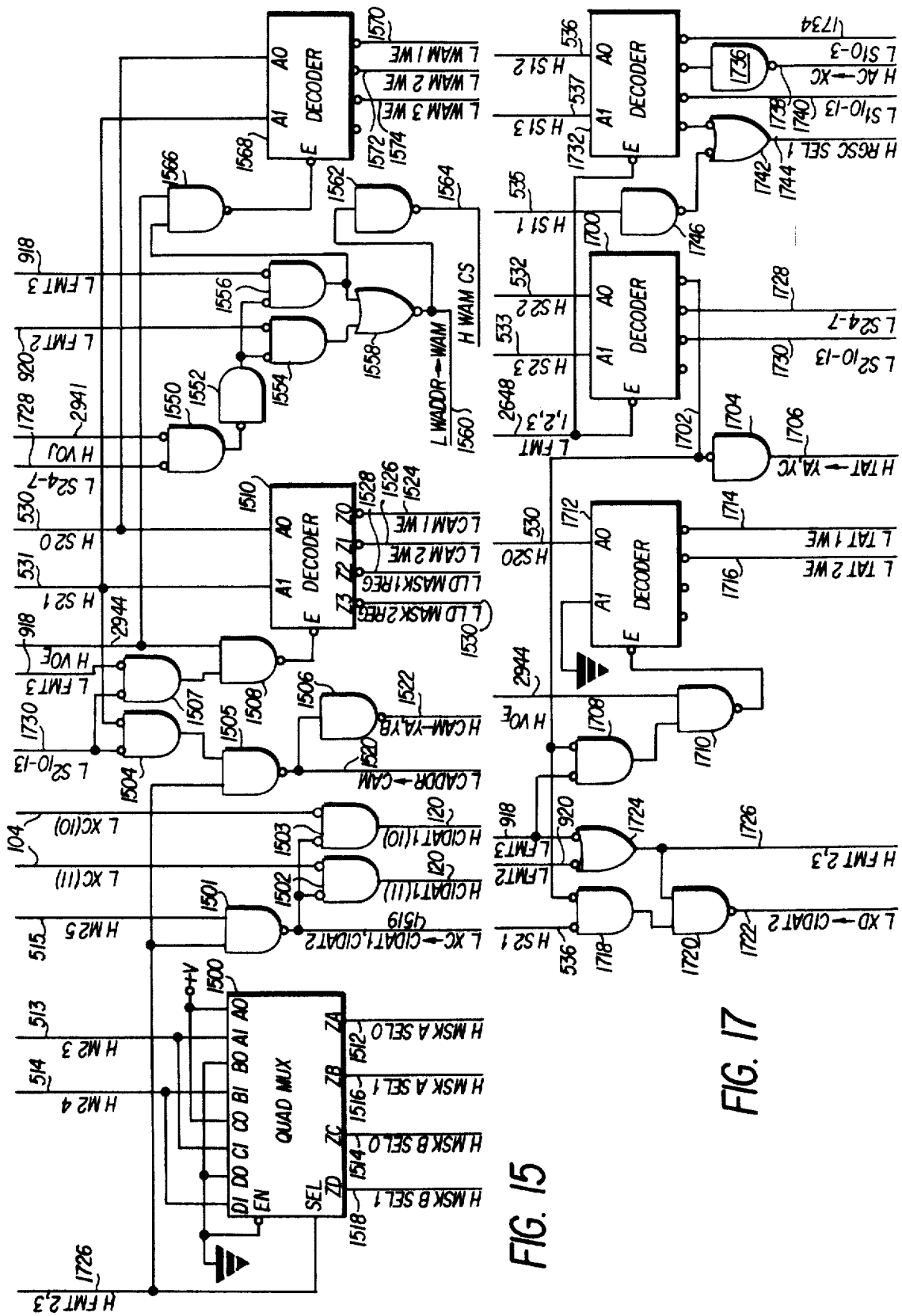
FIG. 15 shows the control circuits for the content addressed memory and the word addressed memory.
FIG. 17 shows the control circuits for the task address tables.

The circuits for controlling CAM 1 and CAM 2 are shown in the left portion of FIG. 15. These circuits include a quad mux 1500, a decoder 1510, and a plurality of NANDS 1501-1508.

Quad mux 1500 has its inputs A0 and C0 tied to +V while inputs B0 and D0 are tied to ground. Thus, in the absence of a select signal, mux 1500 produces the high level signals Mask A Select 0 and Mask B Select 0 and the low level signals Mask A Select 1 and Mask B Select 1. These signals are applied to the Mask Selectors 1406 and 1410.

The A1 and C1 inputs of mux 1500 receive the signal representing bit 3 of the M2 field while inputs B1 and D1 receive the signal representing bit 4. The select input of mux 1500 is at the high level only on Format 2 or 3 instructions. For Format 2 or 3 instructions, the Mask A Select 0 and Mask B Select 0 outputs are at the high level if bit 3 of M2 is a one. If bit 4 is a one, then the outputs designated Mask A Select 1 and Mask B Select 1 are at the high level. These latter signals are also applied to the Mask Selectors 1406 and 1410.

NAND 1501 is enabled by the signal FMT2,3 during Format 2 and 3 instructions if bit 5 of the M2 field is set. The output of NAND 1501 is the signal XC → CIDAT 1, CIDAT 2, which is utilized to control the CIDAT 1 Shifter and the CIDAT 2 Selector. The output of NAND 1501 also enables NANDS 1502 and 1503 to gate bits ten and eleven from the XC bus onto the CIDAT 1 bus.

NAND 1504 receives the signal $S2_{10-13}$ as well as the signal S2 1 hence it produces an output signal if the S2 field has the octal value 10 or 11. The output of NAND 1504 enables one input of NAND 1505 which is further enabled during Format 2 and 3 instructions. The output of NAND 1505 is the signal CADDR → CAM which is applied to FIGS. 13A and 13B during CAM read or write operations to gate an address from the GSA and GSB register stacks. The output of NAND 1505 is inverted at 1506 to become the signal CAM → YA, YB. This signal is applied to FIG. 14 to gate the contents of an addressed word onto the YA and YB buses during a CAM read operation.

The decoder 1510 is enabled only during Format 3 instructions when the value of the S2 field is between 10 and 13. The signal $S2_{10-13}$ is applied to one input of NAND 1507. The signal FMT3 is applied to the second input and the output of NAND 1507 enables NAND 1508. The clock signal $V0_E$ enables the second input of NAND 1508 and the resulting output enables decoder 1510. As shown in Table II, a Format 3 instruction which enables decoder 1510 requires a write operation into CAM 1, CAM 2, the Mask 1 Register or the Mask 2 Register. The particular operation performed is determined by the two low order bits of the S2 field. Bit 0 of the S field is applied to the A0 input of decoder 1510 while bit 1 is applied to the A1 input. Depending upon the value of the combination of signals applied to its input, decoder 1510 produces a low level output signal at one of four outputs. These signals are CAM 1 WRITE ENABLE, CAM 2 WRITE ENABLE, LOAD MASK 1 REGISTER, and LOAD MASK 2 REGISTER.

Word Addressed Memory

Figure 16:
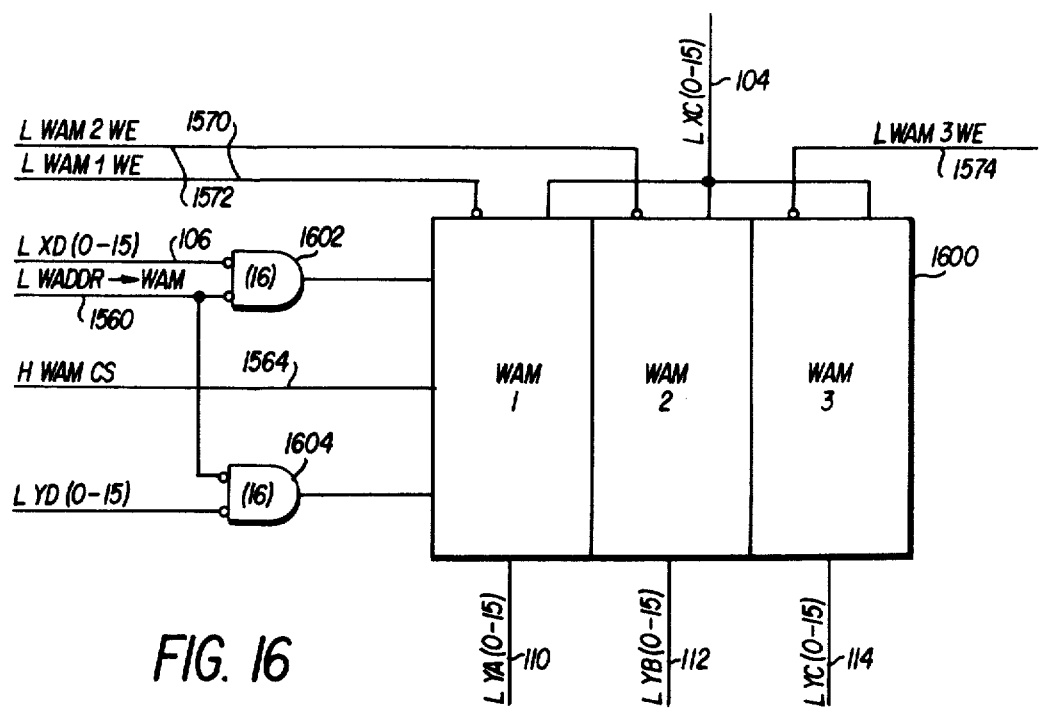
FIG. 16 shows the word addressed memory.

The Word Addressed Memory (WAM) is shown in FIG. 16 and the controls therefor are shown in the right-hand portion of FIG. 15. WAM comprises three identical units WAM 1, WAM 2, and WAM 3, each capable of storing 32 words of 16 bits each. Together, they form a storage unit capable of storing 32 subsegment descriptors each having 48 bits. The WAM memories are addressed by a 32 bit linear select word on the XD and YD buses. The bits of a word on the XD bus are applied to a set of 16 NANDS 1602 while the bits of a word on the YD bus are applied to a set of NANDS 1604. All of the NANDS 1602 and 1604 are enabled by the signal WADDR → WAM. The outputs from NANDS 1602 are applied to WAM 1, WAM 2, and WAM 3 to select one of the addresses 0-15 in these units. The outputs of NANDS 1604 are also applied to WAM 1, WAM 2, and WAM 3 for the purpose of selecting from one of the addresses 16-31. Linear addressing is employed, hence only one output lead from any of the NANDS 1602 and 1604 is at a high level at any one time.

The signal WAM CS is applied to WAM 1, WAM 2, and WAM 3 for the purpose of enabling these units for reading or writing. When a word is read out of WAM 1, it is placed on the YA bus. In like manner, words read out of WAM 2 are placed on the YB bus, and words read out of WAM 3 are placed on the YC bus. Data is entered into WAM 1, WAM 2, or WAM 3 from the XC bus. Since the XC bus carries only 16 bits, it is necessary to execute three instructions in order to write a 48 bit subsegment descriptor into WAM 1, WAM 2, and WAM 3. During a writing operation, the signal WAM 1 WRITE ENABLE must be at the low level in order to write into WAM 1. In like manner, the signal WAM 2 WRITE ENABLE must be at the low level to write into WAM 2, and the signal WAM 3 WRITE ENABLE must be at the low level to write into WAM 3.

As shown in Table II, a write operation for WAM 1, WAM 2, or WAM 3 takes place during a Format 3 instruction if the S2 field has the octal value 4-6. A NAND 1550 receives the signal $S2_{4-7}$ and if the signal $V0_J$ is not present, NAND 1550 produces an output signal that is inverted at 1552 and applied to NANDS 1554 and 1556. NAND 1556 is further enabled by the signal FMT3 and its output passes through a NOR 1558 to become the signal WADDR → WAM. This signal is applied to FIG. 16 to enable the NANDS 1602 and 1604 and address the WAM. The output of NOR 1558 is inverted at 1562 to become the signal WAM CS. This signal is applied to FIG. 16 where it enables the WAM memories for reading or writing.

The output of NAND 1556 is applied to one input of a NAND 1566 and this NAND is further enabled by the clock signal $V0_E$. The output of NAND 1566 enables a decoder 1568. Bits 0 and 1 of the S2 field are applied to the A0 and A1 inputs, respectively, of decoder 1568. Decoder 1568 produces a low level output at one of four output terminals depending upon the combination of signals applied to its two inputs. If both inputs are at the high level, the the decoder produces a low level signal at an output that is not utilized. Otherwise, the decoder produces a low level signal on one of the leads 1570, 1572, or 1574 and these signals are applied to FIG. 16 to enable writing into WAM 1, WAM 2, or WAM 3.

Format 2 instructions with the S2 field having a value between 04 and 06 cause a read operation to be performed utilizing WAM 1, WAM 2, or WAM 3. NAND 1554 is enabled by the signal FMT2 and by the output of NAND 1552. The output of NAND 1554 passes through NOR 1558 to generate the signal WADDR → WAM on lead 1560 and the signal WAM CS on lead 1564. These two signals in combination with the addressing signals from NANDS 1602 and 1604 cause the reading out of one word location in each of WAMS 1, 2, and 3. Data read out of WAM 1 is applied to the YA Bus while the data read out of WAM 2 is applied to the YB Bus, and data read out of WAM 3 is applied to the YC Bus.

Task Address Table

The Task Address Table (TAT) is a 256 word by 24 bit memory whose main purpose is to hold address pointers to the task subsegment descriptors. However, the upper 32 addresses of the TAT are utilized as hit counters for the performance monitoring function. The TAT comprises two units, TAT 1 and TAT 2 with TAT 1 being capable of storing 16 bits at each addressable location and TAT 2 being capable of storing 8 bits at each addressable location.

The XC Bus 104 is connected to the input of TAT 1. In addition, the eight low order bits on the XC Bus are applied to the data inputs of TAT 2. The eight bit output words read out of TAT 2 are applied to eight NANDS 1804 which have their outputs connected to the YC Bus 114. The 16 bit words read out of TAT 1 are applied to 16 NANDS 1806 which have their outputs connected to the YA Bus 110. NANDS 1804 and 1806 are enabled by the signal TAT → YA, YC.

TAT 1 and TAT 2 are both addressed by output signals from eight inverters 1808. These inverters are connected to the eight outputs of two quad muxs 1810 and 1812. Eight bit words from the CIDAT 2 Bus are applied to the 0 inputs of both muxs 1810 and 1812. Thus, as long as the muxs do not receive a high level select signal, a word on the CIDAT 2 Bus is utilized to address TAT 1 and TAT 2.

The outputs from the four low order stages of the hit register are applied to the "one" inputs of mux 1812 and the output of Hit Register stage 4 is applied to the A1 input of mux 1810. The B1, C1 and D1 inputs of mux 1810 are connected to +V. This ensures that when muxs 1810 and 1812 receive a high levle select signal, one of the 32 high order addresses in TAT 1 and TAT 2 is selected, the particular address depending upon the value contained in the Hit Register.

TAT 1 and TAT 2 are written into individually, hence they have separate write enable inputs. The signal TAT → YA, YC is inverted at 1814 and enables one input of a NAND 1816. The other input of NAND 1816 is the signal FMT1. The output of NAND 1816 is applied to the select inputs of muxs 1810 and 1812 in order to select the hit counter in the upper addresses of TAT 1 and TAT 2 as specified by the contents of the Hit Register.

The output of NAND 1816 enables one input of a NAND 1818. This NAND is further enabled by the clock signal $V0_E$ and the output from the NAND enables decoder 1820. The decoder receives bits 0 and 1 of the S2 field of an instruction at its A0 and A1 inputs. If both S2 1 and S2 0 are ones, decoder 1820 produces an output signal that passes through a NOR 1822 and an inverter 1824 to the write enable input of TAT 2. This enables the writing of an eight bit word into TAT 2 at the address specified by the outputs from inverters 1808. If bit 1 of the S2 field is a one, but bit 0 is a 0, decoder 1820 produces an output signal that passes through NOR 1826 and inverter 1828 to the write enable input of TAT 1. This enables the writing of a word on the XC Bus into TAT 1 at the address specified at the outputs from inverters 1808.

NOR 1826 receives the signal TAT 1 Write Enable and upon occurrence of this signal data may be written into TAT 1. NOR 1822 receives the signal TAT 2 write enable and upon occurrence of this signal, data may be written into TAT 2.

Figure 18:
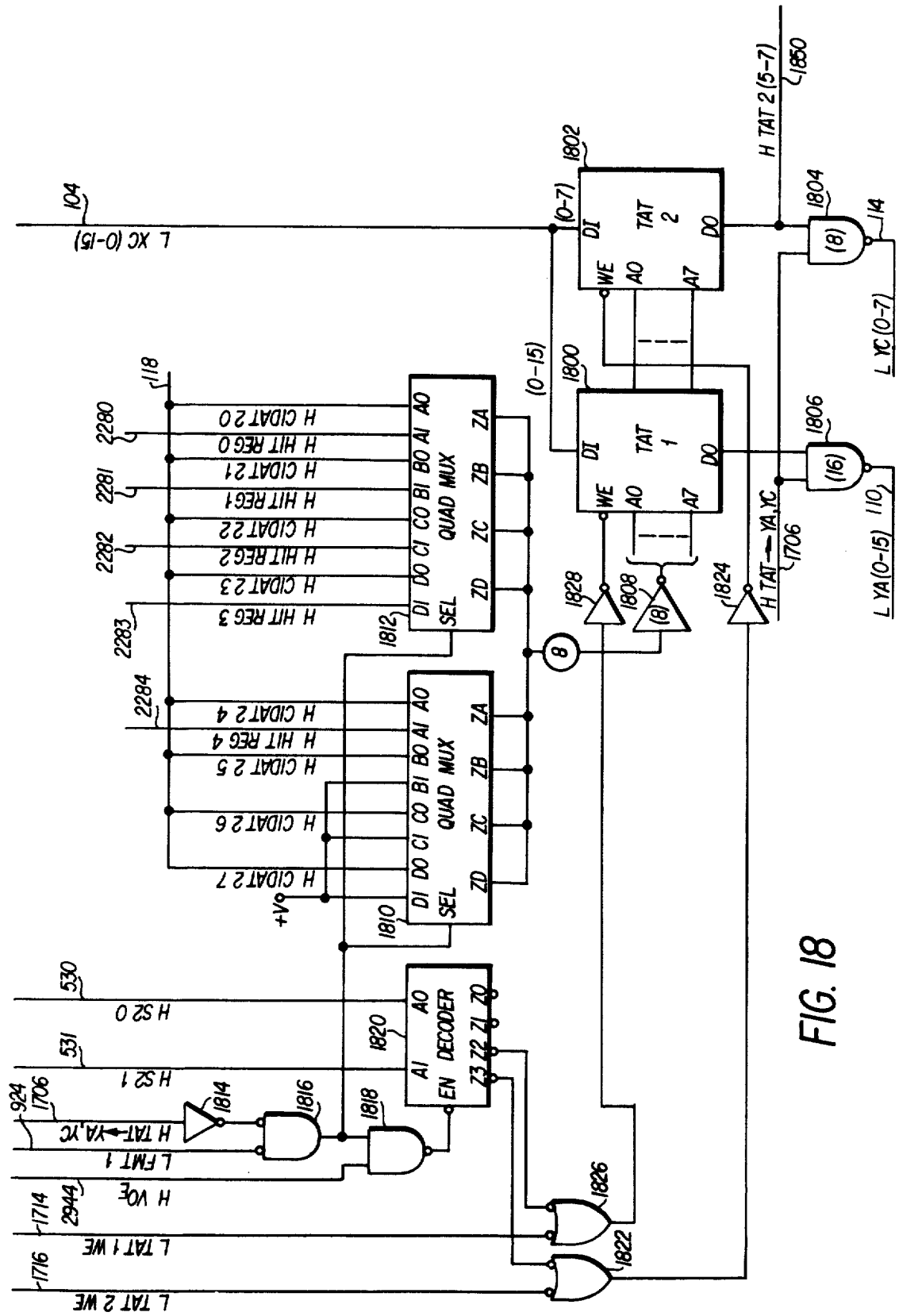
FIG. 18 shows the task address tables and their input multiplexers.
Figure 19:
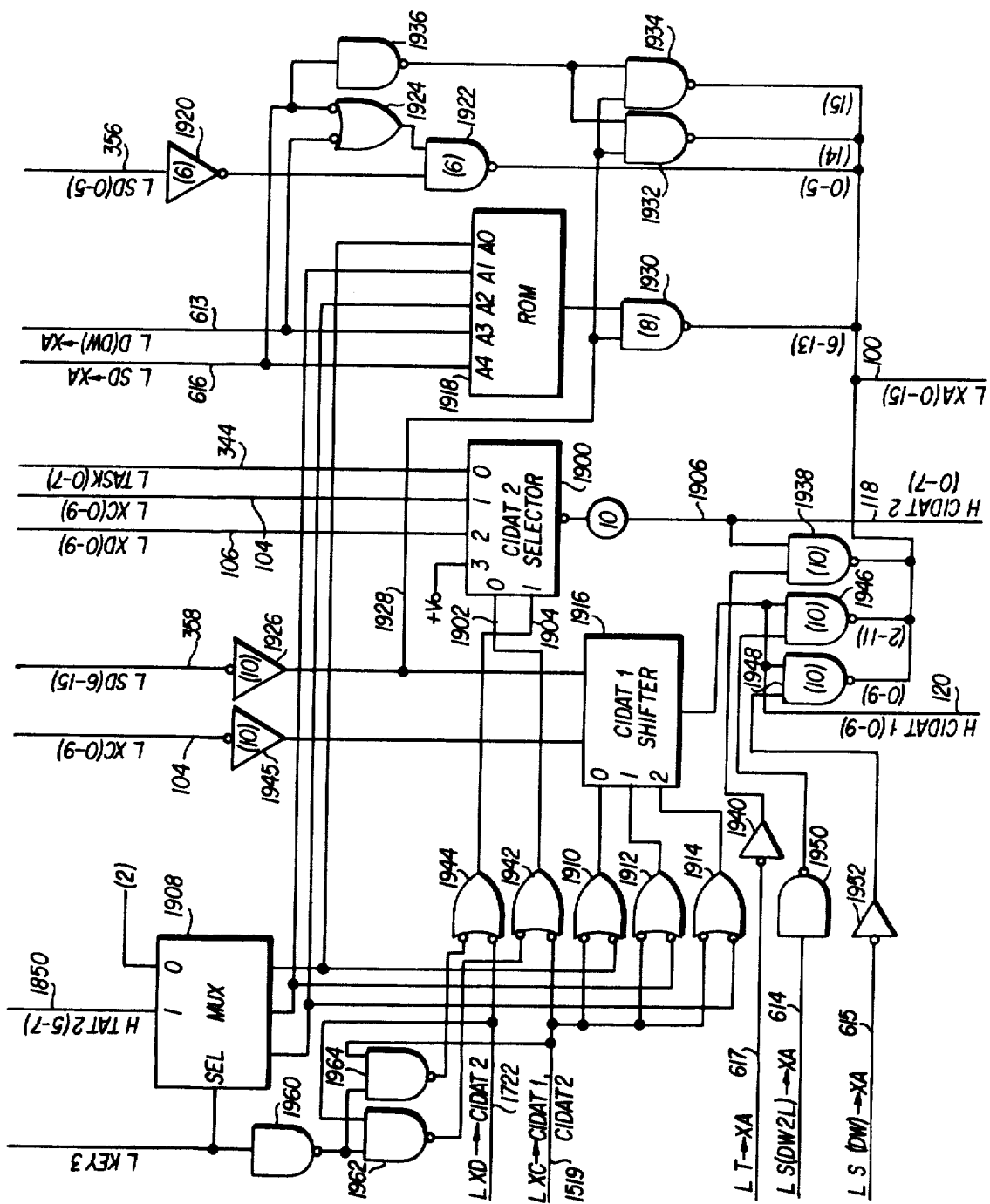
FIG. 19 shows the Cidat 1 shifter, the Cidat 2 selector, and the mask memory.

The circuits for controlling TAT 1 and TAT 2 are shown in FIG. 17. A decoder 1700 receives bits 2 and 3 of the S2 field of an instruction. This decoder is enabled by the signal FMT1,2,3. If both bits 2 and 3 of the S2 field are zeros, decoder 1700 produces a signal on lead 1702 that passes through a NAND 1704 to become the signal TAT → YA,YC. This signal is applied to FIG. 18 where it enables NAND 1816 and the output NANDS 1804 and 1806.

The signal on lead 1702 is applied to one input of a NAND 1708 and the other input to this NAND is the signal FMT3. The output of NAND 1708 is applied to NAND 1710 which receives the clock signal $VO_E$. The output of NAND 1710 enables a decoder 1712 for Format 3 instructions where bits 3 and 2 of the S2 field are both 0. As shown in Table II, these are the conditions for writing into TAT 1 or TAT 2. The decoder 1712 has its A1 input connected to ground, and its A0 input receives the low order bit of the S2 field of an instruction. If this bit is a 0, then decoder 1712 produces the signal TAT 1 Write Enable and if this bit is a one, the decoder produces the signal TAT 2 Write Enable. These signals are applied to NOR 1826 and NOR 1822.

The output lead 1702 from decoder 1700 is also connected to one input of a NAND 1718. This NAND is further enabled when bit 1 of the S2 field of an instruction is 0, the output of NAND 1718 is mixed at 1720 with the output of NOR 1724 to generate the signal XD → CIDAT 2. This signal is applied to the CIDAT 2 Selector circuits 1900 in order to gate the contents of the XD Bus through the selector since this is required on either Format 2 or Format 3 instructions where the S2 field has the octal value 00 or 01.

The circuits of FIG. 17 also produce some control signals which are not specifically related to control of the task address tables. A NOR 1724 receives the signals FMT2 and FMT3 and upon occurrence of either of these signals, it produces the signal FMT2,3. This signal is used at various places throughout the circuits to indicate that a Format 2 or a Format 3 instruction is being executed.

Decoder 1700 produces the signal $S2_{4-7}$ if bits 2 and 3 of the S2 field are 1 and 0, respectively, to indicate that the field has a value between four and seven. This signal is utilized in the WAM control circuits of FIG. 15.

Decoder 1700 produces the signal $S2_{10-13}$ if bits 2 and 3 of the S2 field of an instruction are 0 and 1, respectively, to indicate that the field has a value between 10 and 13. This signal is utilized in both the CAM control circuit of FIG. 15.

A decoder 1732 is enabled by the signal FMT1,2,3 and receives bits 3 and 2 of the S1 field of an instruction at its A1 and A0 inputs. If both of its inputs are at the low level, decoder 1732 produces the signal $S1_{0-3}$ which is applied to the Linear Select Decoder Circuit 2300 (See FIG. 22). If input A1 is low and A0 is high, decoder 1732 produces a signal that is inverted at 1736 to become the signal Accumulator → XC. This signal is applied to FIG. 11, where it gates the output of AC onto the XC bus. If input A1 is high and input A0 is low, decoder 1732 produces a signal $S1_{10-13}$. This signal is applied to the control circuits of FIG. 26.

If both inputs A1 and A0 are at the high level, decoder 1732 produces an output signal that passes through a NOR 1742 to become the signal RGSC SELECT 1. This signal is applied to FIG. 13A where it serves to select one of the four registers in the GSC stack. The signal RGSC SELECT 1 is also generated if bit 1 of the S1 field is a one. The signal S1 1 is passed through a NAND 1746 and the NOR 1742 to become the signal RGSC SELECT 1.

VIRTUAL ADDRESS RECEIVE LOGIC

As shown in FIG. 44, a virtual address supplied to the VAT by the CP comprises an eight-bit task field (T) and a 16-bit subsegment/deflection field SD. The task field is applied to the 0 inputs of a CAM Input Data (CIDAT 2) Selector 1900. This selector has four sets of inputs 0-3 with each set of inputs being capable of receiving 10 bit words. Since the task field contains only eight bits, the two high order positions of the 0 inputs to the selector are tied to +V. The selector 1900 receives bits 0-9 on the XC bus at inputs 1 and bits 0-9 from the XD bus at its inputs 2. The set of inputs designated 3 are all tied to +V. Depending upon the combination of signals applied to leads 1902 and 1904 by NORS 1942 and 1944, selector 1900 gates the signals at one set of its inputs onto a 10 bit bus 1906. When the VAT is stopped and awaiting another virtual address from the CP, both of the select inputs to selector 1900 are at the low level, hence the task field is gated onto bus 1906 and from there over the CIDAT 2 Bus to muxs 1810 and 1812 where it addresses TAT thereby reading out a TAT descriptor onto the YA and YC buses. The three high order bits of each address in TAT 2 store a three bit value representing the deflection width. These signals are applied to the inputs "1" of a mux 1908. A manual switch in the VAT is normally set so that the inputs "1" to mux 1908 are gated through to its outputs. The outputs of mux 1908 are applied as the three low order address bits to a read only memory 1918. Addressing input A3 receives the signal D(DW) → XA and the A4 input receives the signal SD → XA.

In accordance with one aspect of the present invention, the value DW read out of TAT 2 and through mux 1908 determines the relative widths of the subsegment field S and the deflection field D within the SD field of a virtual address. As shown in FIG. 44, the total widths of the two fields is always 16 bits. Table VIII shows the relative widths of the S and D fields for different values of DW.

TABLE VIII

| DW | Width of S in Bits | Width of D in bits |
|---|---|---|
| 00 | Illegal | Illegal |
| 01 | 4 | 12 |
| 02 | 5 | 11 |
| 03 | 6 | 10 |
| 04 | 7 | 9 |
| 05 | 8 | 8 |
| 06 | 9 | 7 |
| 07 | 10 | 6 |

As shown in Table VIII, the width of the D field can never be less than 6 bits. The D field always occupies the lowermost positions in the virtual address. Therefore, bits 0-5 of the SD field, which must always represent a portion of the deflection field, are applied through six inverters 1920 to six NANDS 1922. The second input of NAND 1922 is derived from a NOR 1924 which receives the signals SD → XA and D(DW) → XA. During execution of the first instruction of the VTOA sequence, the signal D(DW) → XA drops to the low level and through NOR 1924 causes NANDS 1922 to gate the bits from the lower six orders of the virtual address onto the XA bus.

As indicated by Table 8, the D field may be longer than six bits, as determined by the DW field read out of TAT 2. Therefore, after the ten high order bits of the SD field of the virtual address have been passed through a set of inverters 1926 bits 6-13 are applied over a bus 1928 to a set of NANDs 1930. These NANDS also receive the output of ROM 1918.

The purpose of NANDS 1930 and ROM 1918 is to mask or block off those bits of the SD field that are subsegment bits rather than deflection bits. ROM 1918 stores eight-bit words and is addressed by the DW field from TAT 2 as well as the signals SD → XA and D(DW) → XA. The hexadecimal values stored at each octal address in ROM 1918 are given in Table IX.

TABLE IX

| Octal Address | Hexadecimal Output |
|---|---|
| 00–17 | FF |
| 20 or 21 | 3F |
| 22 | 1F |
| 23 | 0F |
| 24 | 07 |
| 25 | 03 |
| 26 | 01 |
| 27–37 | 00 |

As an example of the masking of the SD field, consider the case where a task is being executed and the D field is to be 10 bits wide. From Table VIII it is seen that the DW field read from TAT 2 will have the value 03. During execution of the first instruction of the VTOA sequence, SD → XA is at the high level while D(DW) → XA is at the low level. Thus the input address to ROM 1918 is octal 23. From Table IX, it is seen that ROM 1918 produces the output value 00001111 (OF) when the address 10011 is applied to its input. The four low orders of the output of ROM 1918 will in this instance enable four of the NANDS 1930 that receive bits 6, 7, 8, and 9 of the SD field. This places bits 6-9 of the SD field on the XA bus as the four high orders of D. At the same time, the low level signal D(DW) → XA acts through NOR 1924 to enable NANDS 1922 to place the six low order bits of the SD field on the XA bus.

In some instances, it is desirable to be able to transfer the entire SD field received from the CP directly to the XA bus. In these instances, the signal SD → XA is at the low level. Through NOR 1924, NANDS 1922 are enabled to place bits 0-5 on the XA bus. From Table IX, it is seen that the output word from ROM 1918 is all ones if the signal SD → XA is at the low level. This enables all NANDS 1930 so that bits 6-13 of the SD field are placed on the XA bus. Bits 14 and 15 are applied to two further NANDS 1932 and 1934. These NANDS are enabled by the output of NAND 1936 which receives the signal SD → XA. When the signal SD → XA occurs, the high level output of NAND 1936 enables NANDS 1932 and 1934 to gate bits 14 and 15 of the SD field onto the XA bus.

The task field of a virtual address received from the CP may be placed on the XA bus. The outputs of selector 1900 are connected to a set of NANDS 1938. The signal T → XA is passed through an inverter 1940 to further enable NANDS 1938. The outputs of NANDS 1938 are connected directly to the XA bus.

When the SD field is received by the VAT, the S field must be right justified so that the low order bit of the S field may be placed on the low order of the bus which is utilized to search the CAM, or, more precisely, to search CAM 1 since the T field is used to search CAM 2. As previously explained, the low order bit of the S field may be in any one of several positions within the SD field depending upon the value of the DW field read out of TAT 2. Bits 6-15 of the SD field of a virtual address are applied to the shifter 1916 through a set of inverters 1926. The select inputs of the shifter are enabled by the outputs of NORS 1910, 1912, and 1914 depending upon the value of the DW field. If the DW field has the octal value 7, then all three outputs of mux 1908 will be at the high level and, since the signal XC → CIDAT 1, CIDAT 2 will also be at the high level, no select inputs to shifter 1916 are energized. Thus, under these conditions, bits 6-15 of the SD field are gated through the shifter onto the CIDAT 1 bus with bit 6 going onto the CIDAT bus bit 1 line and bit 15 going onto the CIDAT 1 bus bit 9 line.

The maximum legal shift of the S field is 6 bits. In this case, the outputs from mux 1908 pass through NORS 1912 and 1914 to energize the Select 2 and Select 1 inputs of shifter 1916. This causes the S field to be shifted to the right six positions as it passes through the shifter to the CIDAT 1 bus.

The signal XC → CIDAT 1, CIDAT 2 may be passed through NORS 1910, 1912, and 1914 to energize all three select inputs of the shifter 1916. In this case, bits 0-9 on the XC bus are inverted at 1945 and gated through the shifter to the CIDAT 1 bus without any shift.

The output of the shifter 1916 may be gated onto the XA bus 100 without shift, or with a further shift of two positions to the left. The outputs from the shifter are connected to a set of NANDS 1946 and a further set of NANDS 1948. The outputs of NANDS 1946 are connected to bit lines 2-11 of the XA bus while the outputs of NANDS 1948 are connected to bit lines 0-9. NANDS 1946 are enabled by the output of NAND 1950 when the NAND receives the signal S(DW2L) → XA. NANDS 1948 are enabled by the output of inverter 1952 when it receives the signal S(DW) → XA.

Arithmetic Logic Unit

Figure 20:
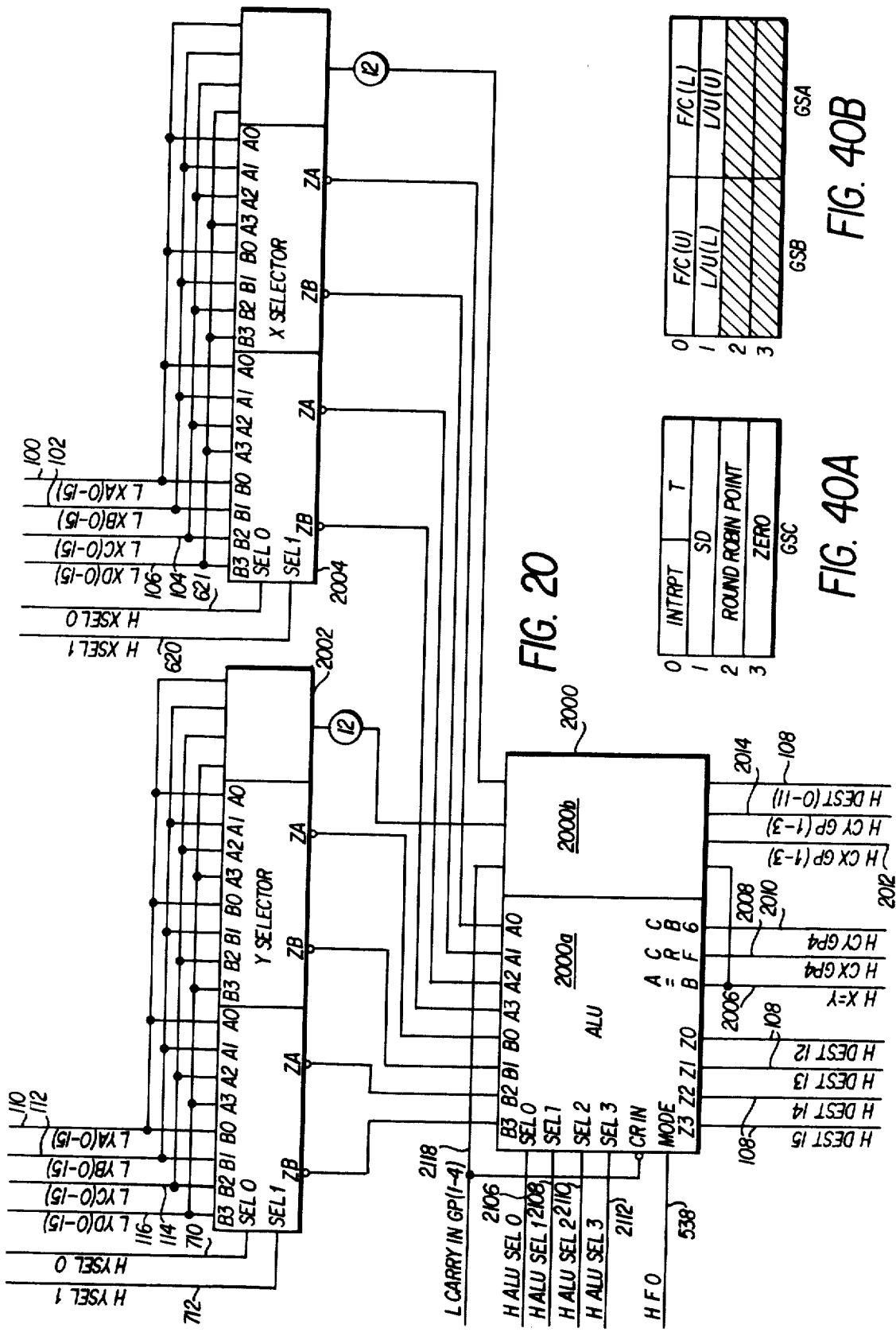
FIG. 20 shows the arithmetic logic unit and the X and Y selectors.

The arithmetic logic unit (ALU) 2000 is shown in FIG. 20 and the control circuits for the ALU are shown in FIG. 21. The ALU comprises four chips, one of which is designated 2000A. The other three chips are designated by the numeral 2000B. ALU is capable of performing mathematical addition and subtraction and all 16 Boolean functions of two variables. If the low order bit of the F field of an instruction is set, the resulting high level signal on lead 538 causes the ALU to perform a logical operation on its two input operands, the particular logic operation being performed being determined by the signals ALU SELECT 0 - ALU SELECT 3. On the other hand, if the signal on lead 538 is at the low level, then the ALU performs an arithmetic operation on its two input operands. This input operation being determined by the levels of the signals ALU SELECT 0 through ALU SELECT 3. The ALU 2000 has 16 B inputs which are connected to the 16 outputs of the Y Selector 2002 and 16 A inputs which are connected to the outputs of the X selector 2004. The result obtained by performing an ALU operation on two operands is gated onto the Destination Bus 108.

For fast carry operations, each ALU logic chip receives a carry in signal which is derived from the controls of FIG. 21. The signal Carry In GP 1 is applied to the first logic chip 2000A, with the signals Carry In GP(2-4) being applied to the three logic chips designated 2000B. Each logic chip may produce a signal X = Y if the four bits of one operand applied to the chip are equal to the four bits of the other operand. All of these signals are tied together at a lead 2006. Each logic chip also produces a group carry generate and a group carry propogate signal. These are designated CX GP1 and CY GP1 for the first logic chip.

The Y Selector comprises eight four bit multiplexers, only two of which are shown in detail in FIG. 20. The leads in the YA bus are connected to the A0 and B0 inputs of the muxs while the leads of the YB bus are connected to the A1 and B1 inputs, the leads in the YC bus are connected to the A2 and B2 inputs and the leads in the YB bus are connected to the A3 and B3 inputs. The signals applied to the inputs of the Y Selector are gated through the Y selector in accordance with the levels of the signals Y Select 1 and Y Select 0. If both of these signals are at the low level, the contents of the YA bus are gated through the Y selector to the ALU. If both signals are at the high level, then the contents of the YD bus are gated through to the ALU. If only Y Select 0 is at the high level, the contents of the YB bus are gated through the Y selector and if only the signal Y Select 1 is at the high level, then the contents of the YC bus are gated through the Y selector.

The X selector is identical to the Y selector. The X selector receives operands from the 16 bit buses XA, XB, XC, and XD. The gating of the contents of one of these buses through the X selector is governed by the signals X Select 0 and X Select 1.

The ALU control circuits comprise a quad mux 2100, an ALU Status Register 2102 and a carry look-ahead circuit 2104. Mux 2100 is connected to those stages of IR 502 which receives the ALU field of an instruction word. ALU 0-ALU 3 are connected to inputs A1-D1. In addition, ALU 2 is connected to the A0 and D0 inputs while ALU 3 is connected to the B0 and C0 inputs. The outputs from the mux 2100 are the signals ALU Select 0 -ALU Select 3 which are applied to the ALU 2000. If the signal F0 is at the high level, then there is a direct correspondence between the signals ALU0-ALU3 and the signals ALU Select 0 and ALU Select 3. However, if F0 is at the low level, the signals ALU Select 0--ALU Select 3 are determined only by bits 2 and 3 of the ALU field in the instruction word.

If instruction bit ALU 0 is set, it is an indication that there should be a forced carry. The signal on lead 522 is passed through an AND 2114 and a NOR 2116 to become the signal Carry In Group 1. The signal is passed over bus 2118 to the carry input of the low order chip of ALU 2000.

The ALU status register 2102 comprises four stages, only three of which are utilized. It stores the carry bit out of the ALU, a single precision ALU = 1 bit that is true if the last sampled ALU output contained all one bits, and a double precision ALU = 1 bit that is true if the last two sampled ALU outputs contain all one bits. The ALU Status Register is updated only if the signal Set ALU Status goes to the low level. This occurs when a format 1, 1K, 2, or 3 instruction is executed. As the signal Set ALU Status returns to the high level, it clocks the status signals into the three register stages. If the signal X = Y on lead 2006 is at the high level at the time status is clocked into the register, stage 2 of the register is set and the signal X = Y (ASR) is produced on lead 2116. A lead 2118 connects the lead 2116 back to one input of the NAND 2120. This NAND also receives the signal X = Y on lead 2006. Thus, if leads 2006 and 2116 are both high at the time status is clocked into the register, NAND 2120 resets stage 3, thus causing the signal DP X=Y (ASR) on lead 2122 to be at the high level. The output of NAND 2120 is the signal DP X = Y which is applied over lead 2124 to the branch control circuits subsequently described.

If there is a carry out of the ALU, the lead 2126 connected to the A0 input of the ALU status register is at the low level. When status is clocked into the register, this resets the low order stage of the register and the signal Carry Out on lead 2128 is at the high level.

Lead 2128 is connected to one input of AND 2130 which also receives bit 1 of the ALU field. If both inputs of AND 2130 are at the high level, it produces a high level signal that passes through NOR 2116 to become the signal Carry In Group 1.

The carry look-ahead circuit 2104 is provided to speed up the carry operation by reducing carry ripple time. The output of NOR 2116 is applied to the carry input of the carry look ahead circuit 2104, and through a NAND 2132 to one input of an AND 2134. If the output Y of the circuit 2104 is at the high level when a low level signal is generated by NOR 2116, NAND 2134 produces a signal that passes through NOR 2138 to become the signal COUT. If both the X and Y outputs of circuit 2104 are at the high level, it indicates that the two operands applied to ALU are equal. The X and Y outputs are connected to an AND 2136 having its output connected to NOR 2138.

Associative Miss Detector and Encoder

Figure 22:
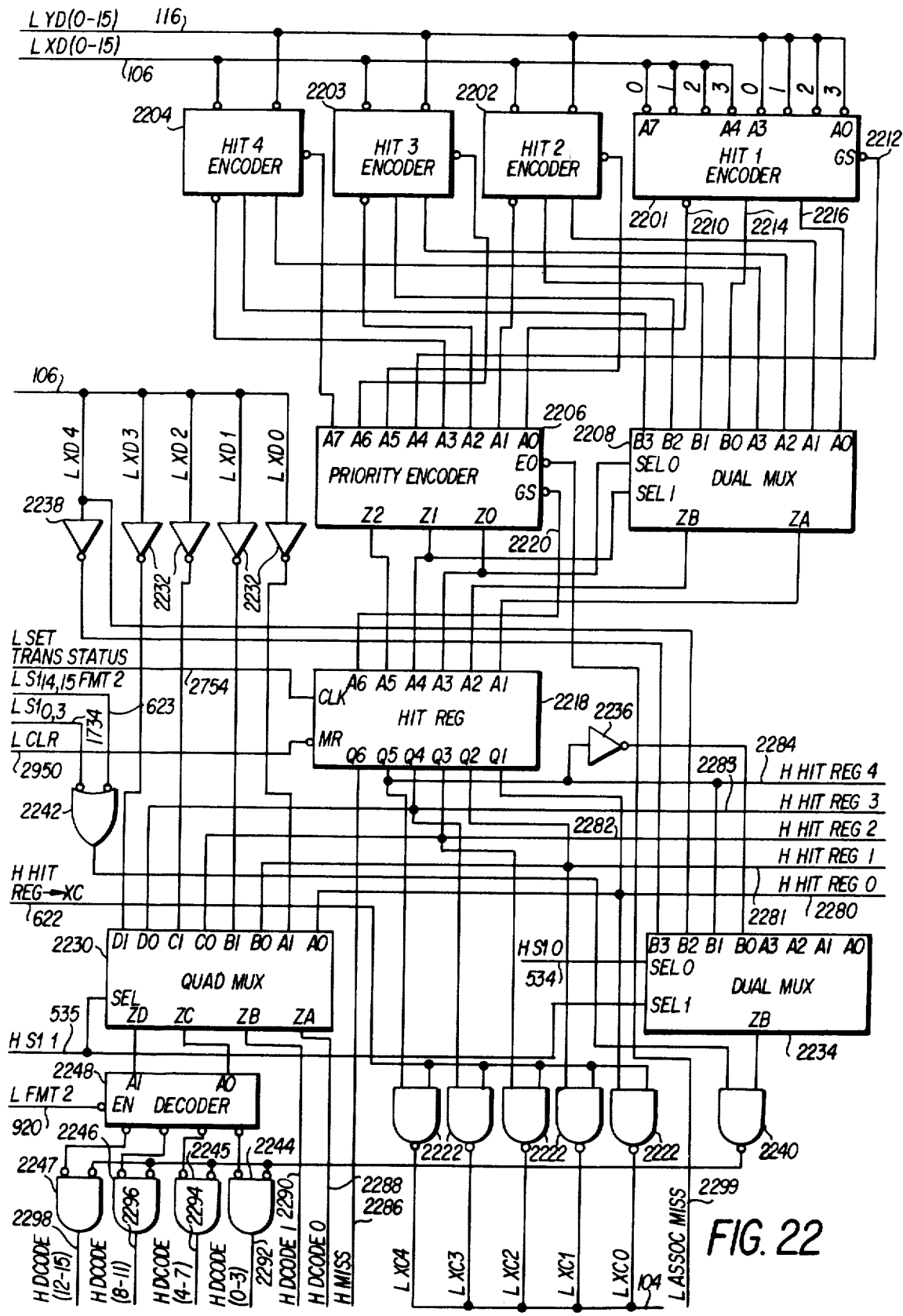

FIG. 22 shows the associative miss detector and encoder circuit 2200 which comprise four hit encoders 2201-2204, a priority encoder 2206, and a dual mux 2208. Each of the encoders 2201-2204 has eight inputs. Four of these inputs receive signals from the YD bus and the other four inputs receive signals from the XD bus. All of the encoders are alike, and only the details of encoder 2201 are shown. It will be understood that the higher order bits on the XD and YD buses are connected to the encoders 2202-2204 in the same manner as the low order bits are connected to encoder 2201.

Considering encoder 2201 as an example, it receives the four low order bits from the XD bus and the four low order bits from the YD bus. It has an output lead 2210 which drops to the low level if any of the XD inputs is at the low level. Encoder 2201 has a general select output lead 2212 which drops to the low level if any input lead to the encoder drops to the low level. Encoder 2201 has two further outputs 2214 and 2216, and the signals appearing on these outputs represent a binary encoding of the high value bits appearing on the XD or the YD bus. It should be noted that during the VTOA routine, signals on the XD and YD bus represent a linear select address and only one of the bits should be a one.

Output leads 2214 and 2216 are connected to the B0 and A0 inputs of dual mux 2208 and the corresponding outputs from encoders 2202, 2203, and 2204 are connected to the A1-B1 A2-B2, and A3-B3 inputs, respectively. Output lead 2210 from encoder 2201 is connected to the A7 input of priority encoder 2206 with the corresponding output leads of encoders 2202-2204 being connected to the A6-A4 inputs. Output lead 2212 of encoder 2201 is connected to the A3 input of priority encoder 2206 with the corresponding outputs of encoders 2201-2204 being connected to the A2-A0 inputs.

Priority encoder 2206 has the characteristic that it produces a three bit binary output code representing the highest order input which is at the low level. For example, if input A3 is at the low level, then outputs Z2-Z0 will be at the high, low and low levels. On the other hand, if input A7 is at the low level, then all three outputs Z2-Z0 will be at the low level. The outputs of priority encoder 2206 are applied to the A5-A3 inputs of Hit Register 2218. The Z1 and Z0 outputs of the priority encoder are also applied to the select inputs of dual mux 2208 to select one of the four sets of inputs. The two outputs from dual mux 2208 are connected to the A1 and A2 inputs of the Hit Register. Thus, the input to the hit register is a five bit binary code representing the lowest order of the 32 bit address on the XD and YD buses that contains a one bit.

During an associative search of CAM, if no match is found, then all bits on the XD and XY buses will be at the high level. In this case, the priority encoder 2206 produces a low level signal on lead 2299 to indicate that an associative miss has occurred. Output lead 2220 from the priority encoder is normally at the high level and remains at this level if at least one of the inputs to the priority encoder does not drop to the low level. Failure of the lead 2220 to drop to the low level is indicative of a miss. Lead 2220 is connected to the A6 input of the Hit Register 2218. The outputs from the priority encoder are gated into the Hit Register by the signal Set Translation Status on lead 2754. The output of the Hit Register is a five bit binary encoding of the linear address used to address CAM 1 and CAM 2. The output of the Hit Register is applied by way of leads 2280-2284 to the addressing circuits of TAT so that the hit counter in TAT corresponding to the address "hit" in the search of CAM may be updated for performance monitoring purposes.

In some instances, the output of the Hit Register may be gated onto the XC bus. Register stages 1-5 are applied to a set of five NANDS 2222 and these NANDS are enabled by the signal Hit Register → XC to gate the contents of the five low order stages of the Hit Register onto the XC bus.

Binary to Linear Select Decoder

Figure 23:
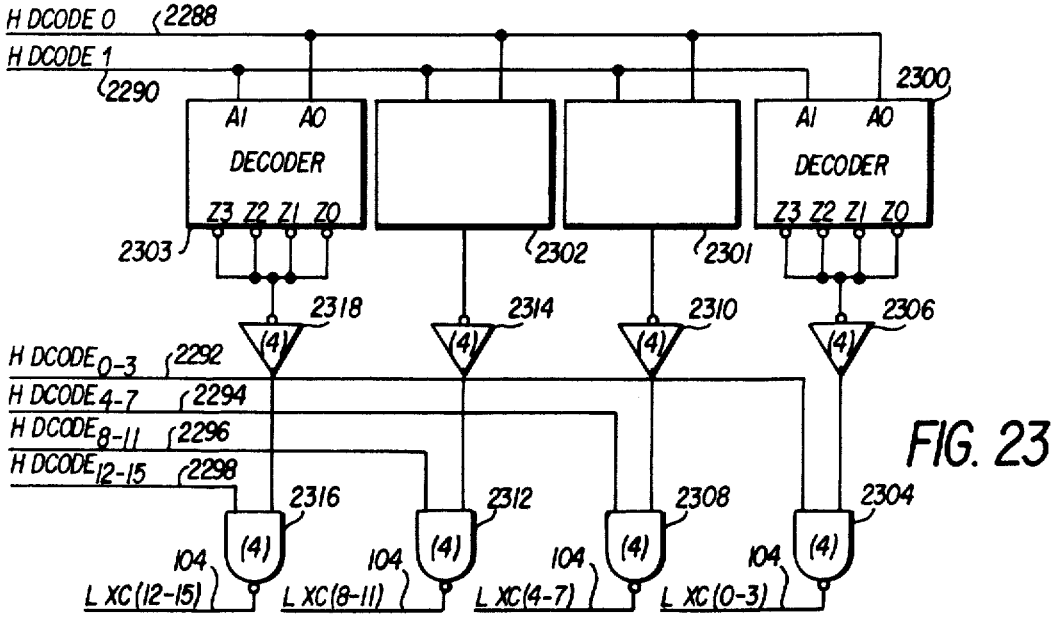
FIGS. 22 and 23 show the binary to linear select address translator, hit encoder, and hit register.

FIG. 22 shows a portion of the Binary To Linear Select Decoder circuits 2300 with the remainder of these circuits being shown in FIG. 23. This decoder converts a five bit binary number into a 32 bit linear select address word. The decoder performs this conversion in two passes, converting one five bit word to the upper 16 bits of an address and then converting to the lower 16 bits. Inputs to the decoder are derived from the Hit Register or from the XD Bus 106. In FIG. 22, the four low order outputs of the Hit Register are connected to the A0-D0 inputs of a quad mux 2230. The four low order bits of the XD bus are passed through a set of inverters 2232 to the A1-D1 inputs of mux 2230. The output of Hit Register stage 5 is connected to the B1 input of a dual mux 2234 and through an inverter 2236 to the B0 input. Bit position 4 of the XD bus is connected to the B2 input of mux 2234 and is passed through an inverter 2238 to the B3 input of mux 2234.

Bit 1 of the S1 field is applied to the Select input of mux 2230 and the Select 1 input of mux 2234. If this bit is a 0, then the hit register is the selected input to the decoder. If the bit is a one, then the XD bus is selected as the input to the decoder. Bit S1 0 is applied to the Select 0 input of mux 2234. When the decoder is operating to convert the four low order bits of the binary number to a linear address, bit S1 0 is at the low level. During the second half of the conversion operation, bit S1 0 is at the high level.

The output of dual mux 2234 is applied to one input of a NAND 2240. The other input of this NAND is driven by the output of the NOR 2242 which produces an enabling signal upon occurrence of the signals $S1_{0-3}$ or $S1_{14,15}$·FMT2. The output of NAND 2240 enables one input of four NANDS 2244-2247. These NANDS receive the four outputs from a decoder 2248 which is driven by the ZC and ZD outputs of mux 2230. The outputs ZA and ZB of mux 2230 are the signals DCODE 0 and DCODE 1. These signals, as well as the outputs of NANDS 2244-2247 are applied to FIG. 23. The signals DCODE 0 and DCODE 1 are applied in parallel to the two inputs of four decoders 2300-2303. The outputs from decoder 2300 drive four NANDS 2304 through four inverters 2306. In like manner, the outputs of decoder 2301 drive four NANDS 2308 through four inverters 2310, the outputs of decoder 2302 drive NANDS 2312 through inverters 2314, and the outputs of decoder 2303 drive NANDS 2316 through inverters 2318.

To illustrate the operation of the Binary To Linear Select Decoder, assume that the Hit Register contains the binary value 11001 = 25 and this value is to be converted to a binary linear select address. Bit S1 1 of the instruction is 0 hence the four low order bits from the Hit Register pass through mux 2230 to the decoder 2248 and the leads 2290 and 2288. When translating the lower half of the address, bit S1 0 of the instruction is at the low level, hence bit 5 from the hit register is inverted at 2236 and the low level signal passes through dual mux 2234 to block NAND 2240. This in turn blocks NANDS 2244-2247. With the outputs of NANDS 2244-2247 all at the low level, all of the NANDS 2304, 2308, 2312, and 2316 are blocked so that a 16-bit word, all 0's, is placed on the XC bus. When the next instruction is executed to generate the upper half of the binary linear select address, bit S1 0 is a 1. This selects the B1 input of mux 2234 so that bit 5 from the Hit Register passes through the mux and NAND 2240, now enabled, to enable all of the NANDS 2244-2247. The four low orders of the binary value are gated through mux 2230, thus causing outputs ZA and ZD to be at the high level while outputs ZB and ZC are at the low level. Outputs ZC and ZD are decoded by decoder 2248 to produce an output to enable NAND 2246. Thus, high level signals on leads 2288 and 2296 are applied to FIG. 23.

In FIG. 23, the high level signal DCODE 0 in combination with low level signal DCODE 1 causes decoder 2302 to produce a low level output signal at its Z1 output. This signal is inverted by one of the inverters 2314 and enables one input of the next to the low order NAND in the group of four NANDS 2312. The high level signal on lead 2296 enables all four of NANDS 2312 but since only the next to the low order NAND (i.e., position 9) is enabled by an output from an inverter 2314, it alone produces a low level output signal. Since this is the upper sixteen bits of the 32 word address, and since bit 9 is the only one which is active, this corresponds to the linear select address 25.

Address Translation and Protection Checking

When a virtual address causes the read out of a subsegment descriptor from the WAM, several checks are made. The bounds field read from WAM 2 (See FIG. 46) is placed on the YB bus and the deflection field D of the virtual address is placed on the XA bus. These two values are compared by comparator 2402 which produces an error signal if the value of the deflection field exceeds the value specified in the bound field. The output of comparator 2402 is passed through an inverter 2404 and applied to the A1 input of a four position Address Translation Status Register 2406. The output of inverter 2404 is passed through a NOR 2408 to become the signal Address Translation Error. The output of NOR 2408 is also applied to the A3 input of the register 2406.

When the subsegment descriptor is read out of WAM, the absolute base address from WAM 1 is added to the deflection field to obtain the absolute memory address. If this addition causes an overflow in ALU 2000, it is an indication that an attempt is being made to access across a memory bank boundary. To indicate this error, the signal C OUT from the ALU is applied to the A2 input of register 2406 and through NOR 2408 to the A3 input.

If the circuits of FIG. 22 detect an associative miss, the signal on lead 2299 is at the low level and passes through NOR 2208 to set the high order stage of register 2406 and generate the address translation error signal.

Mux 2410 is provided for checking the read/write access rights for memory references by comparing the protection bits from the subsegment descriptors with the protection discretes from the CP. When the subsegment descriptor is read out of WAM, the protection bits are read out of WAM 3 and placed on Bus YC, bits 8-12. If a given protection bit is set, it allows a corresponding operation as follows:

| Bit Set | Operation Allowed |
|---------|-------------------|
| 8 | CP Instruction Read |
| 9 | CP Data Read |
| 10 | CP Write |
| 11 | I/O Read |
| 12 | I/O Write |

The three protection discretes from the CP are the signals PV CP/IO, PV INST/DATA, and WT/RD. The signal PV CP/IO is at the low level for CP operations and at the high level for I/O operations. This signal is passed through an inverter 2412 and applied to the Select 2 input of mux 2410. The signal PV INST/DATA is at the low level for instruction operations and at the high level for data operations. It is passed through an inverter 2414 and applied to the Select 1 input of mux 2410. The signal WT/RD is at the high level for write operations and at the low level for read operations. It is applied to the Select 0 input of mux 2410.

Consider as an example the case where a subsegment descriptor is read out and bit 8 is set to allow a CP instruction read. Bit 8 causes a low level signal at the A6 input of mux 2410 while all of the other inputs remain at the high level. If any input other than input A6 is selected, the mux will produce a low level output signal that will pass through NOR 2408 to generate an address translation error. Input A6 of the mux is selected only if the signal PV CP/IO is at the low level to indicate a CP operation, the signal PV INST/DATA is at the low level to indicate an instruction operation and the signal WT/RD is at the low level to indicate that a read operation is to take place.

Regardless of the type of translation error generated, an indication of this error is stored in the register 2406 when the signal Set Translation Status occurs. Outputs $\overline{Q0}$ and $\overline{Q2}$ of the register are connected to two NANDS 2416 and 2418. Outputs Q1 and Q2 are connected to a NOR 2420 having its output connected to two NANDS 2422 and 2424. NAND 2424 is further enabled by the output of NAND 2416. NANDS 2416, 2418, and 2422 are all enabled upon occurrence of the signal Interrupt Code → YC. The output of NAND 2424 is connected to three further NANDS 2426, 2428, and 2430. NAND 2426 receives the signal PV CP/IO while NAND 2428 receives the signal PV INST/DATA and NAND 2430 receives the signal WT/RD. The outputs of NANDS 2418, 2422, 2426, 2428, and 2430 are connected to bits 8-11 of the YC bus. Table X shows the various octal codes placed on YC8-11 for each of the various protection errors. These codes are entered into AC 1100 by error subroutines when corresponding errors occur, as subsequently explained.

| CODE | PROTECTION ERROR TYPE |
|------|----------------------|
| 0 | IO Data Read Violation |
| 1 | IO Data Write Violation |
| 2 | IO Instruction Read Violation |
| 3 | IO Instruction Write Violation |
| 4 | CP Data Read Violation |
| 5 | Cp Data Write Violation |
| 6 | CP Instruction Read Violation |
| 7 | CP Instruction Write Violation |
| 10 | Bounds Violation |
| 11 | Overflow Violation |

Branch Control

Figure 25:
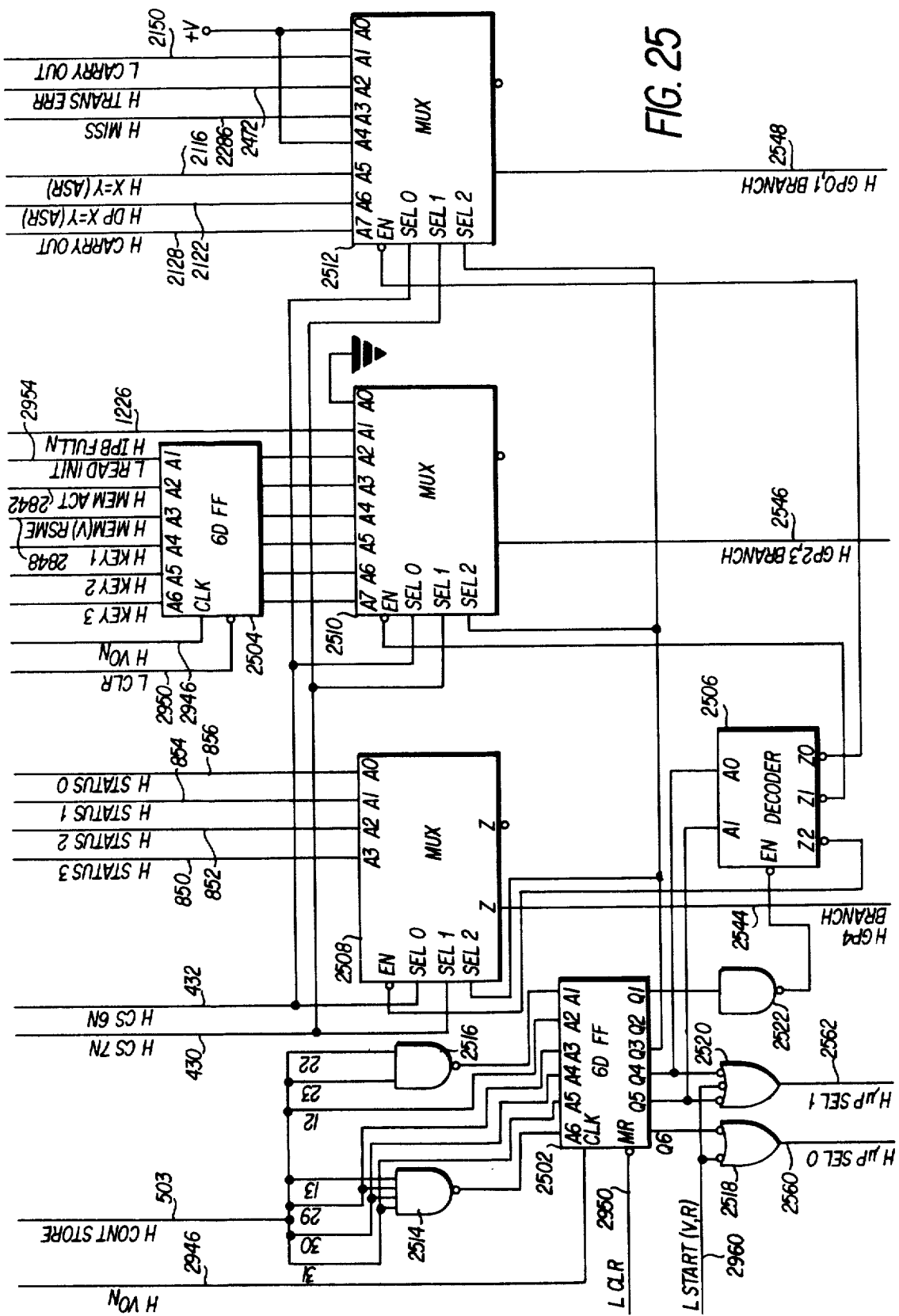
FIG. 25 shows the branch control circuits.

As illustrated in FIG. 25, the branch control circuits include a first set of six D-type flip-flops 2502, a second set of D-type flip-flops 2504, a decoder 2506, and three muxes 2508, 2510, and 2512. These circuits implement the various branch conditions set forth in Table IV. Bits 29, 30, and 31 of an instruction read out of the Control Store are all applied to a NAND 2514 and are individually applied to the A3, A4, and A5 inputs of flip-flops 2502. NANDS 2514 also receives bit 13 of an instruction and the output of the NAND is connected to the A6 input of the flip-flops. Bits 22 and 23 of an instruction are applied to the inputs of a NAND 2516 and the output of this NAND is connected to the A1 input of flip-flops 2502. The A2 input receives bit 12 of the instruction word, but the output of this flip-flop is not utilized in the present invention. The signals applied to flip flops 2502 are gated in to set the flip-flops by the clock signal $V0_n$.

When bits 13 and 29-31 of an instruction are all ones, it is an indication of a jump instruction. NAND 2514 applies a low level signal to the A6 input of flip-flops 2502 while bits 30 and 31 apply high level signals to inputs A4 and A5. This causes the Q6 output to be at the low level while Q4 and Q5 are at the high level. The Q6 output is connected to a NOR 2518 while the outputs Q4 and Q5 are connected to a NOR 2520. The outputs of NORS 2518 and 2520 are applied to the select inputs of the muxs on the input of the μP counter for the purpose of selecting the jump address as an input to the counter.

If bits 22 and 23 of an instruction are both ones, it is an indication of a format 1K instruction where no branch can take place. If both bits are ones, NAND 2516 produces a low level output signal that is clocked into the A1 input of flip-flops 2502. The resulting low level output Q1 is inverted at 2522 to disable decoder 2506. With decoder 2506 disabled, all of its outputs are at the high level, and these outputs are applied to the enabling inputs of muxs 2508, 2510, and 2512 to disable them and prevent any group branch signals on the leads 2544, 2546, and 2548. For branch operations, one of the bits 22 and 23 of an instruction will be at the low level, and as a result, decoder 2506 will be enabled, and one of its outputs will enable one of the muxes 2508, 2510, and 2512. The particular mux which is enabled is determined by bits 31 and 30 of the instruction. These bits are applied to the A4 and A5 inputs of flip-flops 2502 and if either one of them is a one, it causes the corresponding output Q4 or Q5 to be at the high level. These outputs are connected to the A0 and A1 inputs of decoder 2506.

Decoder 2506 decodes the signals applied to its A0 and A1 inputs and produces a low level output signal at one of three outputs Z0, Z1, or Z2. IF both inputs A0 and A1 are at the low level, a low level signal from the Z0 output enables mux 2512 to test for group 0 and 1 branch conditions. If A0 is high but A1 is low, then a low level signal at output Z1 enables mux 2510 to test for group 2 or 3 branch conditions. If A1 is high and A0 is low, then a low level signal at the Z2 output enables mux 2508 to test for group 4 branch conditions.

It should be noted that the input leads to inputs A0-A3 of mux 2512 carry signals representing the four conditions for a group 0 branch while the input leads to inputs A4-A7 carry the signals representing the branch conditions for group 1 branches. In like manner, inputs A0-A3 of mux 2510 receive signals representing group 2 branch conditions while inputs A4-A7 receive signals representing branch 3 conditions. Mux 2508 receives signals as its inputs A0-A3 representing group 4 branch conditions and inputs A4-A7 of mux 2508 are not utilized. Bit 29 of an instruction word determines whether one of groups 0, 2 and 4, or one of groups 1 and 3 is to be tested. Bit 29 is applied to the A3 input of flip-flops 2502 and the Q3 output is connected to the select 2 input of muxs 2508, 2510, and 2512. If bit 29 is a 0, then the Q3 output will be at the low level, thereby selecting the A0-A4 inputs of each of the muxs. If the output Q3 from flip flops 2502 is at the high level, then it selects the A4-A7 inputs of the muxes.

The two bits of the M2.2 field of an instruction make the final determination as to which branch condition is to be tested. The signals CS 7N and CS 6N on leads 430 and 432 represent the bits of the M2.2 field and are applied to the select 1 and select 0 inputs of the muxs 2508, 2510, and 2512. The combination of signals on leads 430 and 432 selects one of the four inputs A0-A3 or one of the inputs A4-A7, depending upon whether the select 2 input of the mux is at the high level or at the low level. Of course, the mux must be enabled before any of its inputs may be selected for gating through to its output. Thus, any one of the twenty input signals to muxs 2508, 2510, and 2512 may be tested and if the condition is true, then a signal appears on one of the leads 2544, 2546, or 2548. The Key 1-Key 3 inputs to flip-flops 2504 are manual switch inputs not utilized in the VTOA routine.

The branch signals on leads 2544, 2546, and 2548 are applied as inputs to ANDS 2600, 2602, and 2604. These ANDS are enabled by the output of a NAND 2606 which receives the signals FMT1 and V0$_J$.

Figure 30:
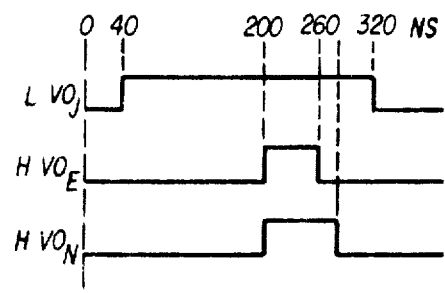
FIG. 30 is a diagram illustrating the relative timing of the pulses produced by the clock.

In FIG. 25, it will be noted that the flip-flops 2502 are clocked by the clock signal V0$_N$. Reference to FIG. 30 shows that V0$_N$ occurs later in a clock cycle than the signal V0$_J$ which enables NAND 2606. Therefore, branch conditions are tested at the end of one clock cycle, and if the condition tested for is true, then the branch actually takes place during the early portion of the next clock cycle. The outputs of NANDS 2600, 2602, and 2604 are applied to inputs of a NOR 2608 which generates the signal Load $\mu$P at time V0$_J$ if a branch is to take place.

FIG. 26 also shows circuits for loading the $\mu$P counter for jump (Format 4) instructions, CP initiated VAT-CP communiation requests, and memory resume errors. The signal FMT4 is passed through an inverter 2610 and a NOR 2612 to one input of an AND 2614. The clock signal V0$_J$ is passed through an inverter 2616 to enable a second input of AND 2614. Thus, on Format 4 instructions AND 2614 produces an output signal that passes through NOR 2608 to load the jump address into the $\mu$P counter.

For either memory resume errors or CP initiated VAT-CP communications, the signal Start(VR) will be at the low level. This signal is passed through NOR 2612 to enable AND 2614 so that upon occurrence of V0$_J$ AND 2614 produces an output signal that passes through NOR 2608 to enable the loading of the $\mu$P counter.

Clock and Memory Control Circuits

Figure 27:
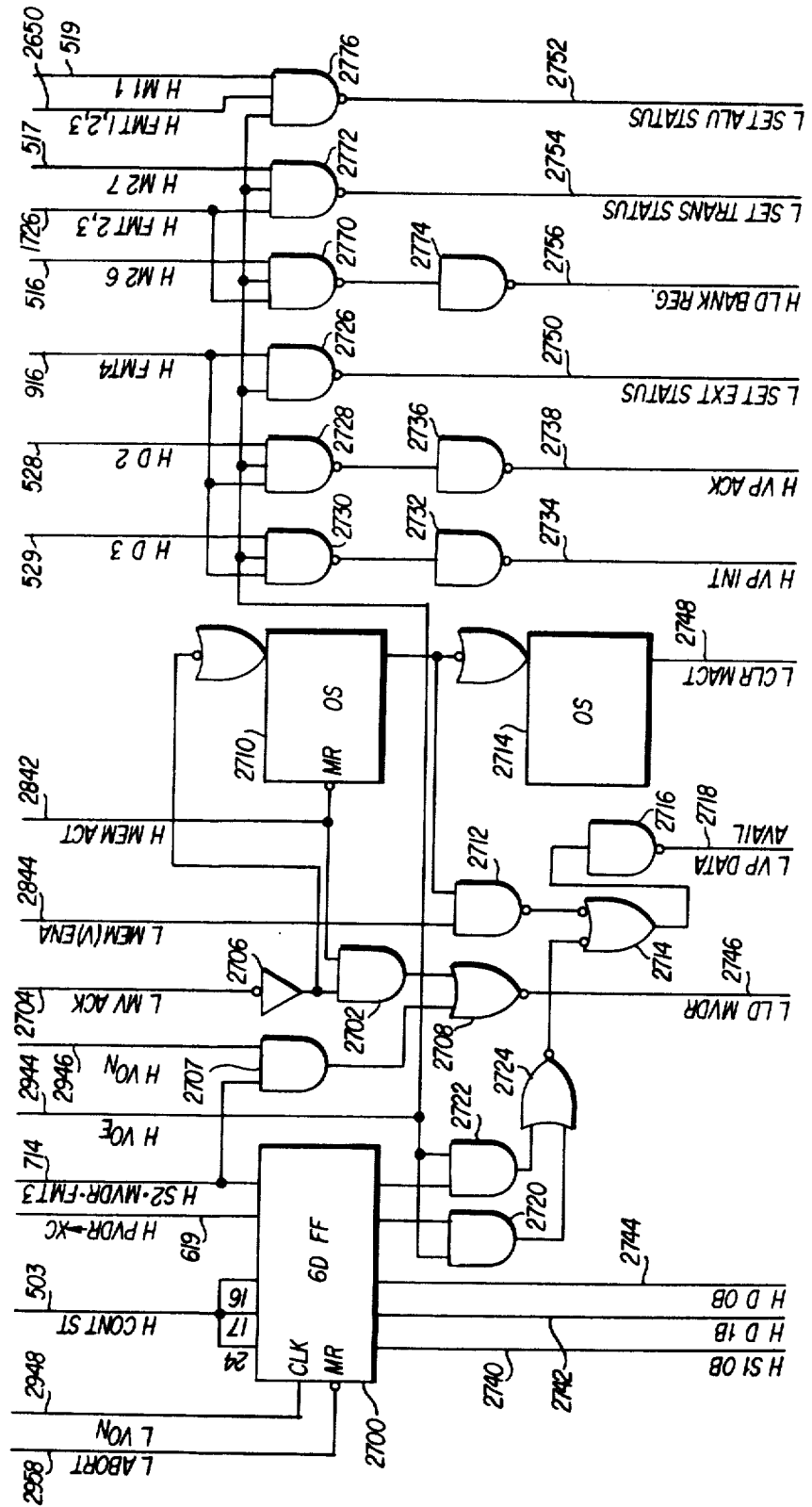
Figure 28:
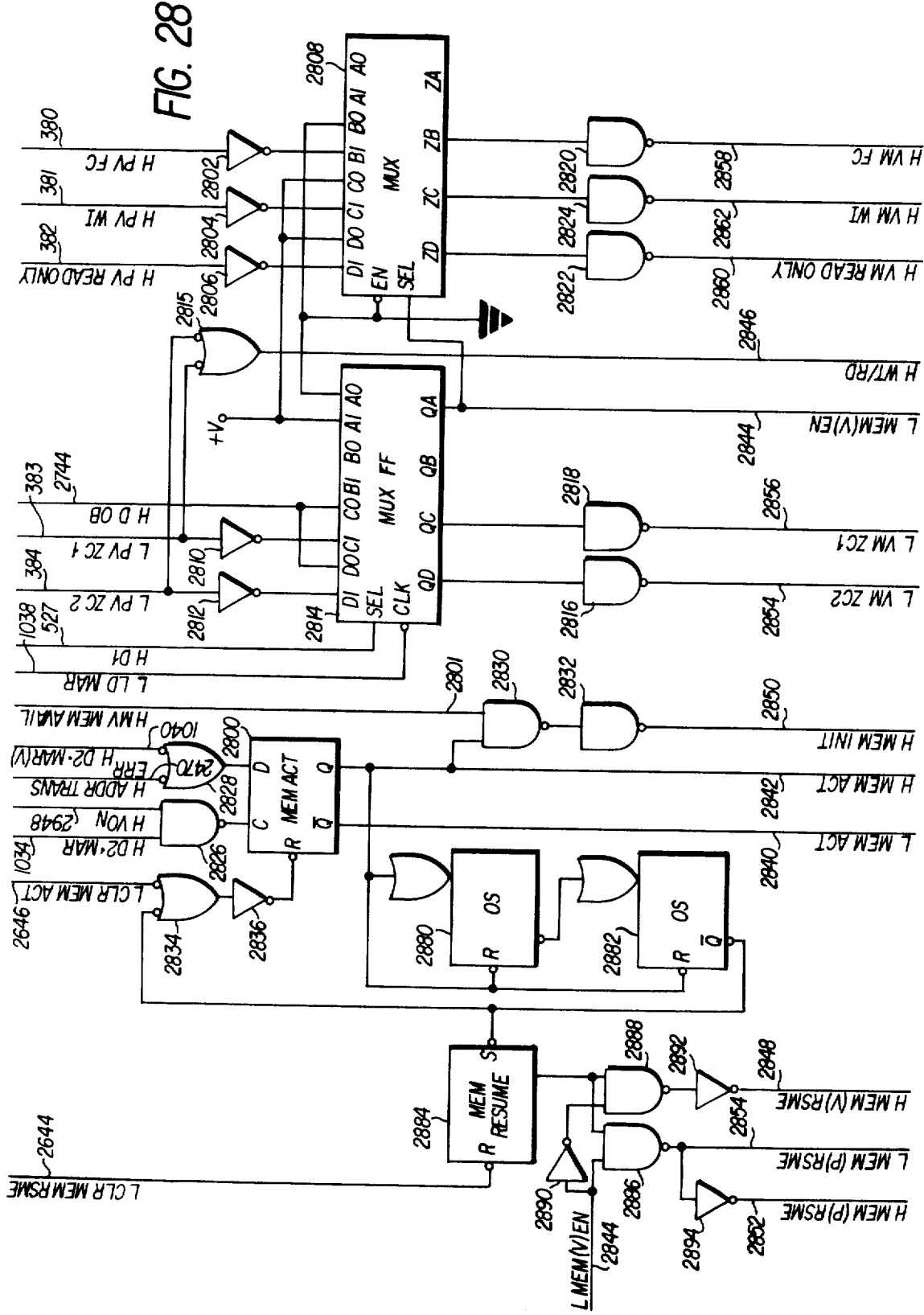

FIGS. 27 and 28 show the circuits for controlling the memory 150 and controlling the transfer of data between the memory and the CP 152. These circuits are closely related with the clock control circuits shown in FIG. 29, hence FIGS. 27-29 are considered as a group.

Figure 29:
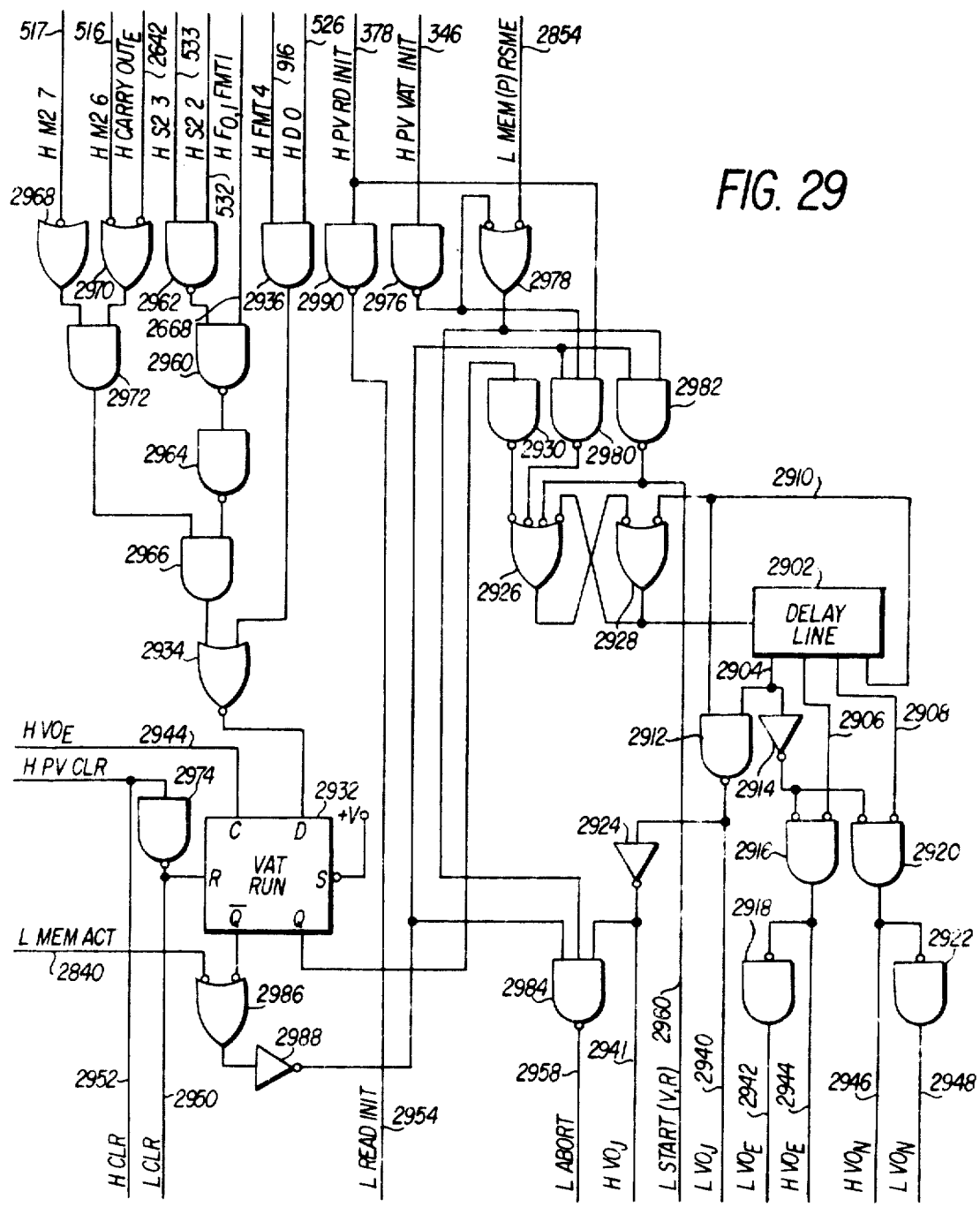
FIG. 29 shows the virtual address translator clock and its associated controls.

Referring first to FIG. 29, the VAT clock comprises a 160 nanosecond delay line 2902 having a first tap 2904 at the 40 nanosecond point, a tap 2906 at the 100 nanosecond point, a tap 2908 at the 120 nanosecond point, and a tap 2910 at the 160 nanosecond point. Tap 2904 is connected to one input of a NAND 2912 and through an inverter 2914 to one input of a NAND 2916. NAND 2916 has a second input connected to tap 2906 and the output of NAND 2916 is the signal V0$_E$. This signal is inverted at the 2918 to give the complement signal V0$_{\overline{E}}$. The output of inverter 2914 is applied to one input of the NAND 2920 which is also connected to the tap 2908. The output of NAND 2920 is the signal V0$_N$. This signal is inverted at 2922 to give the complement signal V0$_{\overline{N}}$. Tap 2910 is connected to a second input of NAND 2912 and the output of this NAND is the signal V0$_J$. This signal is inverted at 2924 to give the complement signal V0$_{\overline{J}}$.

Two NANDS 2926 and 2928 are cross coupled to form a flip-flop which controls the clock. The output of NOR 2928 is connected to the input of the delay line 2902 and the tap 2910 from the delay line is connected back to an input of NOR 2928.

The clock is normally in a stopped state with all inputs to NOR 2926 being at the high level. In the stopped condition, the output of NOR 2928 applies a high level signal to the delay line and the tap 2910 is at the high level. The clock is started only in response to a signal from the CP. When it is started it runs until the VAT executes an instruction which causes the clock to stop. All sequences of instructions end with an instruction which stops the VAT. When stopped, it can only be initiated again by a signal from the CP.

The clock has an effective cycle of 320 nanoseconds. When a low level signal is applied to NOR 2926 to start the clock, the output of NOR 2928 drops to the low level. This low level signal is propagated down the delay line 2902 and after 160 nanoseconds emerges on tap 1910. The low level signal on tap 2910 drives the output of NOR 2928 to the high level and the high level signal is propagated down delay line 2902. After another 160 nanoseconds, the tap 2910 rises to the high level. This completes one cycle of the clock and it stops unless the output of NOR 2926 is at the high level.

A VAT Run flip-flop 2932 receives the output of a NOR 2934 and has a Q output connected to NAND 2930. At time V0$_E$ of the first cycle of the clock, the output of NOR 2934 is utilized to set flip-flop 2932 if the instruction being executed is not a stop VAT instruction. The high level output from flip-flop 2932 passes through NAND 2930 and enables NOR 2926 to enable the clock to run for another cycle. The clock keeps running until an instruction occurs which drives the output of NOR 2934 to the low level. At time V0$_E$ of this instruction cycle, the low level output of NOR 2934 resets flip-flop 2932. This will stop the clock at the end of the cycle since all inputs to NOR 2926 will be at the high level.

The VAT is stopped by Format 4 instructions if bit 0 of the D field is set. The signals D0 and FMT4 are applied to an AND 2936 and the output of the AND is connected to NOR 2934 to drive its output to the low level if the VAT clock is to be stopped.

The signal F$_{0,1}$ FMT1 is at the high level for instructions having either Format 1 or 1K. This signal is applied to one input of the NAND 2960. A NAND 2962 receives the signals S2 2 and S2 3 and has its output connected to a second input of NAND 2960. Both inputs to NAND 2962 will be high during execution of a Format 1K instruction and the output of the NAND inhibits NAND 2960. However, for Format 1 instructions, both inputs to NAND 2960 will be enabled, and the NAND produce an output that is inverted at 2964 to enable one input of an AND 2966. The second input of AND 2966 is enabled by the output of an AND 2972 which derives its inputs from two NORS 2968 and 2970. The VAT should execute an unconditional branch and stop on a Format 1 instruction if both bits of the M2.2 field are 0. The signals M2 7 and M2 6 on leads 517 and 516 are derived from the instruction register and correspond to the bits of the M2.2 field. If both of these bits are 0s, they drive the outputs of NORS 2968 and 2970 to the high level, thereby enabling AND 2972 which in turn enables AND 2966. If AND 2966 is enabled by the output of NAND 2960, then it produces a signal which passes through NOR 2934 to reset the VAT run flip flop 2932 upon occurrence of the V0$_E$ clock signal.

The VAT may also test for a branch condition and stop if there is no carry from the ALU. This branch instruction requires that the high order bit of the M2.2 field be a zero, and the low order bit a one. Under these conditions, the signal M2 7 causes NOR 2968 to produce a high level output signal to enable one input of AND 2972. If the branch condition is satisfied, that is, if there is no carry out of the ALU, the signal Carry Out$_E$ is at the low level, thus causing NOR 2970 to further enable AND 2972. The output of AND 2972 then passes through AND 2966 and NOR 2934 to set flip flop 2932 at time V0$_E$.

The VAT clock may also be stopped by depressing a master clear switch on the CP. This causes the signal PV CLR to rise to the high level. The signal is inverted at 2974 and resets the VAT run flip-flop 2932. The signal CLR on lead 2952 and its complement on lead 2950 are distributed throughout the VAT for the purpose of master clearing various flip-flops and registers.

The CP initiates operation of the VAT in two different ways, depending upon whether the CP wishes to communicate directly with the VAT or merely wishes to initiate operation of the VAT for the purpose of communicating with the memory. If the CP wishes to communicate with the VAT, it issues the signal PV VAT INITIATE on lead 346. The signal is inverted at 2976 and applied to a NOR 2978 and a NAND 2980. The low level output from NAND 2976 blocks NAND 2980 but passes through NOR 2978 to enable one input of NAND 2982. The other input to NAND 2982 will be enabled at this time if the VAT is stopped and/or is not awaiting a reply signal from memory 150, NAND 2982 produces a low level output signal that is applied to NOR 2926 to start the clock. The output of NAND 2982 is the signal Start(VR) which is applied to NORS 2518 and 2520 to generate the signals $\mu$P SELECT 0 and $\mu$P SELECT 1. These signals are applied to FIG. 4 where they select the A3 and B3 inputs of muxs 411-415. When the CP generates the signal PV VAT INITIATE, it also generates a four bit code specifying the type of sequence to be executed by the VAT. This four bit code is applied through NANDS 420-423 to enter into the $\mu$P counter the address of the first instruction of the sequence to be executed. The signal Start(VR) is applied to FIG. 26 where it passes through NOR 2612, NAND 2614, and NOR 2608 to generate the signal Load $\mu$P which actually gates the address into the $\mu$P counter. This address is then utilized to address the Control Store to read out to the instruction register the first instruction of the sequence called for by the CP. Meanwhile, it is necessary to abort the functions which would otherwise be performed during this first cycle by the instruction already contained in the instruction register. The output of NOR 2978 enables one input of NAND 2984. With the VAT not running or waiting for data from the memory, the VAT Run flip-flop 2932 as well as the Memory Active flip-flop 2800 will both be reset so that both inputs to NOR 2986 are at the high level. The low level output of NOR 2986 is inverted at 2988 and enables a second input of NAND 2984. At time V0$_J$, the output of inverter 2924 passes through NAND 2984 to become the Abort signal. In FIG. 27, the Abort signal resets the flip-flops 2700. In FIG. 9 it resets the flip-flops 912, and in FIG. 26 it resets the flip-flop 2618. This effectively blocks all action by the instruction which was contained in the instruction register at the time the CP generated the signal PV VAT INITIATE.

The above description assumed that the VAT was not running or waiting for data from the memory at the time the signal PV VAT INITIATE was generated by the CP. If the VAT is running, of if it is waiting for data from the memory, then one of the inputs to NOR 2986 is at the low level, and the resulting low level output from inverter 2988 blocks NANDS 2980, 2982 and 2984. By blocking NAND 2982, the signal PV VAT INITIATE cannot interfere with the VAT clock, nor can it generate the signal START(V,R) which would load the starting address from the CP into the $\mu$P counter. By blocking NAND 2984, generation of the ABORT signal is prevented. Thus, the VAT continues the sequence of instructions it is executing, and the signal PV VAT INITIATE causes no action in the VAT. If the signal PV VAT INITIATE is still present when the VAT stops and receives the last data from the memory, then it may initiate the sequence of operations described above.

When the CP wishes to initiate operation of the VAT for the purpose of communicating with the memory, it issues the signal PV READ INITIATE on lead 378.

Assuming that the VAT run flip-flop 2932 and the memory active flip flop 2800 are both reset, this signal passes through NAND 2980 to start the VAT clock. The signal PV READ INITIATE is inverted at 2990 to become the signal READ INITIATE on lead 2954. This signal is applied to the PVDR register 302 to clock into the register any data supplied thereto by the CP. For a memory write operation, the signal PV READ INITIATE gates into PVDR the word to be written into the memory. For a read operation, the signal READ INITIATE clears the PVDR register by setting it to all zeros.

The signal PV READ INITIATE on lead 378 is a signal which starts the VAT for executing the VTOA sequence. As previously explained, the first instruction of this sequence is already present in the instruction register, having been loaded therein during the last instruction of the last routine executed by the VAT. Thus, it is not necessary to load the $\mu P$ counter with a specific value when the signal PV READ INITIATE occurs. Once the signal starts the VAT clock, it continues to run and a sequence of instructions is executed until the instruction register is loaded with a stop VAT instruction. This instruction resets the VAT Run flip-flop 2932 and causes the first instruction of the VTOA sequence to again be loaded into the instruction register.

FIG. 28 shows the VAT circuits for initiating and controlling operation of the memory. The actual control signals for the memory may be supplied to the VAT from the CP or they may be generated within the VAT itself. The CP selectively provides the signals PV FULL CYCLE, PV WRITE INITIATE, and PV READ ONLY on leads 380-382 if the memory is to be controlled to perform a full cycle, a write cycle, or a read cycle. These signals are inverted by inverters 2802, 2804, and 2806 and applied to the B1, C1 and D1 inputs of a mux 2808. The CP also provides the zone control signals PV ZC1 and PV ZC2 on leads 383 and 384 depending upon whether the memory is to write into the upper half, the lower half, or both halves of the addressed location. These signals are inverted by inverters 2810 and 2812 and applied to the C1 and D1 inputs of a mux 2814. The signals PV ZC 1 and PV ZC 2 are applied to a NOR 2850 to generate the high level signal WT/RD if either zone control signal is at the low level. The signal WT/RD is at the high level only for a write operation, and this signal is applied to FIG. 24, where a privilege check is made.

The Memory 150 may be activated only by the VAT and then only when the VAT executes an instruction which loads MAR 1340. When the memory is activated, it may be controlled by the signals just described or it may be controlled by signals generated within the VAT itself. The D field of the instruction determines whether the signals from the CP or signals generated witnhin the VAT are to control the type of memory cycle initiated.

If the D field has the octal value 14, then the memory operation performed is determined by fixed signals within the VAT. In FIG. 10, it is seen that if the D field has an octal value of 14 or greater, the signal LOAD MAR is produced. This signal is applied to the clocking input of mux 2814. If the D field has a value of 14 or 15, the signal D1 is at the low level to select the A0-D0 inputs. If the D field has the value 14, the signal D 0B is at the low level and is gated through mux 2814 and inverters 2816 and 2818 to drive the leads 2854 and 2856 to the high level, which is the condition they must be in for a memory read operation.

The A0 input of mux 2814 is tied to ground, hence when the Load MAR signal occurs, the QA output drops to the low level, and this signal is applied to the select input of mux 2808 to select the A0-D0 inputs. The B0 input of mux 2808 is tied to ground, hence the low level output from the mux is inverted at 2820 to produce the signal VAT MEMORY FULL CYCLE on lead 2858. The C0 and D0 of mux 2808 are tied to $+V$, hence when the select input of the mux is at the low level inverters 2822 and 2824 drive the output leads 2860 and 2862 to the low level. The combination of high level signals on leads 2854, 2856, and 2858 cause the memory to execute a full cycle read when the memory is initiated. It should be noted that the outputs from muxs 2808 and 2814 merely control the memory and do not initiate the operation. The initiating circuits are described subsequently.

If the instruction executed has a D field with the value 15, the operation of the circuits is the same except that the signal D 0B is at the high level, thus causing NANDS 2816 and 2818 to produce low level signals on leads 2854 and 2856. These latter signals in combination with the high level signal on lead 2858 control the memory to execute a full cycle write operation.

If the D field of the instruction has the value 16 or 17, then the memory is controlled by the memory control signals applied to muxs 2808 and 2814 by the CP. Where D has either of the values 16 or 17, the signal D1 on lead 527 is at the high level to select the A1-D1 inputs of mux 2814. This gates the zone control signals on leads 383 and 384 through the mux to determine the levels of the signals on leads 2854 and 2856. In addition, the A1 input of mux 2814 is tied to $+V$ hence the output QA from the mux is at the high level to energize the select input of mux 2808. This selects the A1-D1 input of this mux to gate the control signals from the CP on leads 380-382 through the mux to leads 2858, 2860, and 2862 to control the memory operation.

It should be noted that the operations performed by instructions which load the MAR register and have a D field value of 16 or 17, are exactly the same. However, where the D field has a value of 17, initiation of the memory cycle is conditioned upon the absence of an address translation error. This will become evident when the memory initiation circuits are described.

The circuits of FIG. 28 thus far described merely illustrate the basic principle that the memory control signals from the CP to the memory 150 should be controlled so that they can reach the memory only if MAR 1340 in the VAT is loaded with an address. Obviously, the type and number of signals supplied by the CP will vary depending upon the logical construction of both the CP and the memory.

The memory cycle is initiated by setting the Memory Active flip-flop 2800. The state of the flip flop can be changed only during a format 1, 2 or 3 instruction where the D field has a value of 14 or more. Under these conditions, the signal D2.MAR is at the high level to enable one input of a NAND 2826. The NAND is further conditioned by the clock signal $V0_N$ and produces a low level output to set or reset the flip flop depending upon the level of the signal applied to the D input. A NOR 2828 receives the signals ADDRESS TRANSLATION ERROR and D2.MAR(V). Where the D field has a value of 14, 15, or 16, the signal D2.MAR(V) is at the low level, and the NOR produces a high level output signal to set flip-flop 2800 at time $V0_N$. However, where the D field has the value 17, the signal D2.MAR(V) is at the high level, and the flip-flop is set only if there is no translation error.

The output of flip-flop 2800 is applied to one input of a NAND 2830. This NAND receives the signal MV MEMORY AVAILABLE from the Memory 150 when the memory is available for accessing by the VAT. The output of NAND 2830 is inverted at 2832 to become the signal MEMORY INITIATE. This signal is applied to the memory and initiates a memory cycle, the particular type of memory cycle being determined by the output signals from muxs 2808 and 2814. While the Memory Active flip-flop 2800 is set, it produces a high level signal on lead 2842 and a low level signal on lead 2840. The signal on lead 2840 is applied to the clock circuits of FIG. 29 where it acts through NOR 2986 and inverter 2988 to block any further signals which might otherwise attempt to start the clock (now running) or generate an ABORT signal. The high level signal on lead 2842 is applied to the select input of the MVDR Register 304 to select as the inputs to the register the data output, if any, from the memory. This enables the memory to load the MVDR register if the instruction is a read instruction. The signal on lead 2842 is also applied to the branch control circuits of FIG. 25 where it sets one of the flip-flops 2504. Finally, the signal on lead 2842 is applied to FIG. 27 where it enables one input of an AND 2702. As soon as the memory completes the cycle it has been controlled to perform, it returns a MEMORY VAT ACKNOWLEDGE signal on lead 2704 that is inverted at 2706 and applied to AND 2702. With the other input already enabled by the output of the Memory Active flip-flop, AND 2702 produces a signal that passes through NOR 2708 to generate the signal LOAD MVDR. This signal is applied to the clocking input of MVDR 304 and gates into the register any output data from the memory. Of course if the memory has been initiated to perform a write operation, then all of the leads in the bus 376 will be at the high level, and a zero value will be entered into the MVDR register.

The output of inverter 2706 is applied to the input of a one-shot multivibrator 2710 which has its output connected to a NAND 2712 and a further one-shot multivibrator 2714. If the memory cycle was initiated and controlled from the CP, the signal MEM(V) ENABLE on lead 2844 is at the high level. When multivibrator 2710 produces a high level output signal, it passes through NAND 2712, a NOR 2714 and an inverter 2716 to generate the signal VP DATA AVAILABLE. This signal is set back to the CP to inform it that the memory cycle is completed and any data read from the memory is available in the MVDR register ready for sampling by the CP. The VP DATA AVAILABLE signal causes the CP to resume operation since it has been waiting for the memory to complete its cycle.

After a short inverval of time, multivibrator 2710 returns to its initial state and the resulting low level output signal triggers multivibrator 2714 and it produces the signal CLEAR MEMORY ACTIVE. This signal passes through NOR 2670, NOR 2834, and inverter 2836 to reset the Memory Active flip-flop 2800. This completes the operation of the memory control circuits for one memory access.

Once the Memory Active flip-flop 2800 is set to initiate a memory cycle, the memory must respond with a MEMORY ACKNOWLEDGE signal within a predetermined interval or an error condition is assumed. The output of the Memory Active flip-flop 2800 is connected to the input of a multivibrator 2880 which in turn has its output connected to another multivibrator 2882. Multivibrator 2880 is triggered as soon as the Memory Active flip-flop is set and after a predetermined interval of time, it triggers multivibrator 2882 provided the Memory Active flip-flop has not been reset. When multivibrator 2882 is triggered, it produces an output signal to set the Memory Resume flip-flop 2884. In addition, the output of multivibrator 2882 passes through NOR 2834 and inverter 2836 to reset the Memory Active flip-flop.

When the Memory Resume flip-flop 2884 is set, it enables two NANDS 2886 and 2888. NAND 2886 receives the signal MEMORY (V) ENABLE. The signal is also inverted at 2890 to enable NAND 2888. If the Memory Resume flip-flop is set during a memory cycle initiated by the VAT, then NAND 2888 produces a signal that is inverted at 2892 to become the high level signal MEMORY (V) RESUME. This signal is applied to the branch control circuits where it sets one of the flip-flops 2504. On the other hand, if the Memory Resume flip-flop is set during a memory cycle initiated from the CP, NAND 2886 produces the low level signal MEMORY (P) RESUME and, through inverter 2894 the high level signal MEMORY (P) RESUME. The signal on lead 2852 is applied to mux 413 so as to enter the octal address 40 into the μP counter. The signal on lead 2854 is applied to FIG. 29 where it passes through NOR 2978 to generate the ABORT signal and, through NAND 2982 to generate the signal START (VR). This latter signal is the one which generates the μP SELECT 0 and μP SELECT 1 as well as a LOAD μP signal to gate the address into the μP counter. The VAT then executes a short routine which first loads the task name and a constant into the accumulator register to form an abnormal status word, then sends an interrupt signal back to the CP, and stops the VAT.

The Memory Resume flip-flop 2884 is reset only by a master clear from the master clear switch on the CP or by the VAT executing a Format 4 instruction with bit D1 being set. In FIG. 26, the CLEAR signal is applied to one input of NOR 2672. The signals FMT4 and D 1 are applied to the inputs of a NAND 2674 which has its output connected to a NAND 2676. NAND 2676 is further enabled by the output of inverter 2660 when the clock signal VO$_N$ occurs. The output of NAND 2676 is also applied to NOR 2672 and the output of the NOR is connected directly to the reset input of the Memory Resume flip-flop 2884.

For communications between the VAT and the CP, it is necessary to send an acknowledgement to the VAT that data has been received therefrom, or send a signal to the CP telling it that the VAT has data ready for it. The signal VP DATA AVAILABLE on lead 2718 serves both of these purposes. Two of the flip flops 2700 receive the signals PVDR → XC and S2.MVDR.FMT3. The outputs from these flip-flops control two ANDS 2720 and 2722 which are clocked by the signal VO$_E$. The outputs from both NANDS are connected to a NOR 2724 so that if either of the flip-flops in chip 2700 is set, NOR 2724 produces a low level output signal that passes through NOR 2714 and inverter 2716 to generate the signal VP DATA AVAILABLE.

During the execution of Format 4 instructions, the instruction may call for an interrupt or acknowledge signal to be sent to the CP. The signal FMT4 is applied to one input of NANDS 2726, 2728, and 2730. NAND 2728 also receives the signal D 3 while NAND 2730 receives the signal D 1B. The clock signal $V0_E$ is applied to all three NANDS. The output of NAND 2730 is inverted at 2732 to become the signal VP INTERRUPT which is sent back to the CP to interrupt its operation.

The output of NAND 2728 is inverted at 2736 to become the signal VP ACKNOWLEDGE. This signal is sent to the CP to acknowledge that a desired operation has been completed.

The output of NAND 2726 is the signal SET EXTERNAL STATUS which is applied to the Status Register 816 to set the various stages of the Status Register in accordance with the bits in the S1 and S2 field of a Format 4 instruction.

VTOA Routine

Before considering the virtual to absolute address translation routine (VTOA), reference should be made to FIGS. 40A and 40B, which show the assignment of certain registers in GSA, GSB, and GSC. Prior to initiation of the VTOA routine, GSC 0 and GSC1 should contain zeros. These registers are reserved for the storage of two abnormal status words it an abnormal status condition should develop during the VTOA routine. If an abnormal status condition does develop, GSC 0 is loaded with the task name T from the virtual address and a constant value which defines the type of abnormal condition which has occurred. GSC 1 is loaded with the SD field of the virtual address.

GSC 2 is reserved for the round robbin pointer. This is a count which, generally speaking, indicates the next CAM/WAM cell to be flushed if, during the VTOA routine, a search of CAM indicates that the subsegment descriptor is not present in CAM/WAM and must be brought into CAM/WAM from the memory. The round robbin pointer defines the address in which the new subsegment descriptor is entered if there are no vacant cells and if the cell defined by the round robbin pointer is not locked. This will become clear from the subsequent description.

GSC 3 is initially loaded with a 0 value.

GSA 0 and GSB 0 together store a 32 bit Full/Clear word with each bit being associated with one cell of CAM/WAM. When a CAM/WAM cell contains a valid subsequent descriptor, the corresponding bit in the Full/Clear word is a one to indicate this condition. If a CAM/WAM cell is empty, then its corresponding bit in GSA/B 0 is a zero. When a new subsegment descriptor is brought in from the memory, GSA/B 0 is checked to see if there is an empty cell to receive the descriptor. If there is, the descriptor is loaded into one of the empty cells and the bit of the Full/Clear word corresponding to the cell is set. On the other hand, if all of the CAM/WAM cells are full, then the new descriptor is loaded into an address determined by the round robbin pointer in GSC 2.

The loading of the new subsegment descriptor from memory under the control of the round robbin pointer is conditioned upon a Lock/Unlock word stored in GSA/B 1. The Lock/Unlock word is a 32 bit word with each bit being associated with one of the CAM/WAM cells. When the CP-VAT system is in operation, there are certain subsegments that must always remain resident in real memory (i.e., interrupt routine, some I/O handlers, and a skeleton operating system). Furthermore, some of these subsegments require that their subsegment descriptors be always resident in CAM/WAM as well (i.e., interrput routines). To meet this requirement the Lock/Unlock word is provided. When a Lock/Unlock bit in the word is set, it is an indication that the associated CAM/WAM cell contains a descriptor that is locked and cannot be removed from the CAM/WAM. When a lock/unlock bit is 0, its associated CAM/WAM cell contains a descriptor which may be replaced under control of the round robbin pointer.

It is thus seen that the Full/Clear word, the Lock/Unlock word, and the Round Robbin Pointer all enter into a determination of which CAM/WAM cell is loaded with a new subsegment descriptor obtained from the memory 150. If there is an empty cell in CAM/WAM as indicated by the Full/Clear word, then the descriptor is stored in that cell. If there are no empty cells, then the Round Robbin Pointer successively addresses the cells until it finds one that is not locked by the Lock/Unlock word. The new descriptor is then loaded into this unlocked cell, and the round robbin pointer incremented and returned to GSC 2 for use when another subsegment descriptor is read from memory. The net result of this operation is to replace the subsegment descriptor which has been held in CAM/WAM for the longest period of time, provided the cell is not locked. Any time an empty cell in CAM/WAM is filled with a subsegment descriptor, the Full/Clear word is updated during the VTOA routine which loads the new descriptor into CAM/WAM.

The VTOA routine is illustrated by the flow chart of FIG. 31. As shown in the microcode listing at the end of this specification, the microinstructions for executing this routine are stored in Control Store 500 at octal addresses 300-304.

As previously described, the instruction from location 300 is contained in the VAT instruction register, and the VAT clock is stopped at the end of any VAT operation. The VAT is thus ready to execute instruction 300 when the clock control circuits receive the signal PV READ INITIATE on lead 378 from the CP to start the VAT clock.

As shown in the microcode listing, the instruction stored at location 300 is a Format 2 instruction (F = 12) where the S1, S2, D, ALU, M1, M2.2 and M2.1 fields have the values 04, 04, 17, 04, 10, 3, and 00, respectively. As shown by the nemonics of the microcode listing, instruction 300 is an MRA instruction wherein field S1 designates the virtual address D field as one operand, and field S2 designates WAM 1 (W1) as the source of the second operand. The value of the M1 field specifies a D2 destination and, in combination with the D field of the instruction specifies the Memory Address Register (ARV) as the destination. The ALU field of the instruction specifies (AD) that the operand on the X bus is to be added to the operand on the Y bus. The M2.2 field specifies (ASB) that the address translation status should be set, and the bank register loaded. M2.1 specifies (SO) that the task T and subsegment S are to be placed on the CIDAT 1 and CIDAT 2 buses, a low level signal applied to CAM over the Mask 1 and Mask 2 buses 1409 and 1414 to search all bits, and word 0, i.e., the Full/Clear word, in GSA/B is to be placed on the GSA/B bus 122/124. These conditions cause an associative search of the CAM and a comparison of any match word from the CAM with the Full/Clear word stored in GSA/B 0. The logical product of the two words is utilized to address WAM and read the second operand from WAM 1 onto the YA bus. Since this first instruction loads MAR 1340 and bank register 1342, the VAT sends a MEMORY INITIATE signal over lead 2850 to the Memory 150 to access the desired absolute address. At the end of the memory cycle, the memory returns the signal MV ACKNOWLEDGE on lead 2704, thus causing the VAT to relay the VP DATA AVAILABLE on lead 2718 to the CP. This tells the CP that the memory operation is completed and, if it was a read operation, the data is available in the MVDR register 304 for sampling. This of course assumes that no address translation error was detected to set the Address Translation Status register 2406 and generate a translation error signal on lead 2472.

While the instruction from address 300 is being executed, the μP counter is incremented, and on the next clock cycle this instruction is read out of the Control Store 500 and entered into the instruction register 502. The instruction from location 301 is an ROA instruction which requires that the contents of GSC 3 (it contains a 0 value) be placed on the XC bus and the value read from TAT 1 placed on the YA bus. The Hit Register 2218 contains a binary value representing the address of the subsegment descriptor which was read out of WAM during instruction 300. This binary value is utilized to address TAT 1 and read out the hit count value corresponding to that address.

The ALU field (ADF) specifies that the contents of the X bus and the Y bus are to be added with a forced carry. Thus, the output of ALU is the hit count read from TAT 1 plus one. ACN in combination with D1S specifies that the output of the ALU should be entered into the accumulator. In addition, D1S specifies that the ALU Status Register 2102 should be clocked to enter ALU status therein.

The value 2 in the M2.2 field in combination with the 00 in the F field of instruction 301 specifies a test of the address translation error status and a branch if status indicates that an error occurred during execution of instruction 300. M2.1 contains the value 05, hence if address translation error status is set, a branch is made to instruction 305.

However, assuming no address translation error occurred during the execution of instruction 300, the branch is not made and on the next cycle instruction 302 is read from Control Store 500 and entered into IR 502. This is an ROL instruction which requires that the contents of AC (now the incremented hit count) be written into TAT 1. D2 and NOD specify no destination while X specifies that the ALU output is the value applied to it over the X bus. The incremented hit count in AC is applied over the XC bus to TAT 1 and is written back therein at the address specified by the output of the Hit Register 2218.

Instruction 302 tests ALU status to see if the low order stage of the Status Register 2102 was set during execution of instruction 301. If the status register was set, it indicates that the hit count did not overflow when it was incremented during execution of instruction 301. By overflow, it is meant that the incremented count became greater than could be stored at a single address in TAT 1.

If there was no hit count overflow, then instructon 302 initiates a branch operation SNC and stops the VAT. The branch is made to address 300 since the M2.1 field of instruction 302 contains the value 00 and this is concatenated with the three high order (binary) bits of the instruction being executed. Thus, the VAT is stopped with instruction 300 loaded into the instruction register ready to begin another VTOA routine.

If, during the execution of instruction 302, the test of ALU status indicates that there was a performance count overflow, then the branch operation does not take place and the VAT continues to run. It executes instruction 303 which is an R2L instruction that transfers the contents of the Hit Register 2218 over the XC bus and through the ALU 2000 to the IPB Data Register 1204. An IPB Interrupt signal is generated provided the circuits of FIG. 12 are not receiving an IPB FULL signal from PMP 153. If PMP is generating a signal indicating that its register stacks for receiving data from the VAT are full, instruction 303 branches back on itself and instruction 303 is executed again. This continues until PMP indicates that it can accept the output of the Hit Register which defines the address of a subsegment descriptor which has been hit a sufficient number of times to cause it to be incremented beyond the count which can be stored in TAT 1. When this occurs, the repeated execution of instruction 303 is terminated, and the VAT advances to instruction 304. This is an unconditional branch instruction ROL which causes the VAT to branch to instruction 300 and stop.

It is believed that the above description relating to the microcode listings is sufficient to enable one of ordinary skill in the art to interpret them and determine the register-to-register transfers and other actions that take place during each instruction. Therefore, the description of the flow chart of FIG. 31 will continue without reference to the microcode listing. The address of the instruction at each step of the flow chart is given for each step of the flow chart to provide easy reference for the reader into the microcode listings.

If, during execution of instruction 301, a test of the address translation status register indicates that an address translation error occurred, a branch is made to instruction 305. This instruction tests to see if the address translation error resulted from an associative miss. Assuming for the moment that the error did not result from an associative miss, instruction 305 causes the protection error code from the Address Translator Status Register 2406, and the task name T to be entered into the accumulator 1100.

Instruction 306 is a branch instruction which branches back on itself if the Memory Active flip-flop 2800 is still set. Instruction 306 is repeatedly executed until the memory cycle initiated by instruction 300 is completed, and the Memory Active flip-flop reset. At this time the VAT advances to instruction 307 where it checks to see if this is a CP display memory reference. This condition is indicated by bit 1 of Status Register 816 being in the set state. If the tested condition is present, the VAT branches to instruction 357 which is part of the display reference routine. A description of this routine is not necessary for an understanding of the present invention.

Assuming instruction 307 finds bit 1 of the Status Register reset, the μP counter is incremented and the VAT executes instruction 310 which tests bit 0 of the status Register 816. If this bit is set, it indicates that the VAT is in abnormal condition status so the VAT branches to instruction 313. However, if bit 0 of the Status Register is not set, then the CP advances to instruction 311 and then instruction 312. During instruction 311, abnormal condition status word 1 is transferred from the accumulator to GSC 0 (See FIG. 40A). During instruction 312, status word 2, which is the SD field, is sent to GSC 1.

The VAT then executes instruction 313 to set bit 0 of the Status Register to indicate an abnormal condition. Instruction 313 is a jump instruction which generates a VAT interrupt signal that is sent to the CP to inform it that the VAT holds data identifying an abnormal status.

Instruction 313 jumps to instruction 314 to load a 0 value into GSC 3 and into the MVDR register 304. The instruction also sends a DATA AVAILABLE signal to the CP over lead 2718.

The VAT then advances to instruction 315 which is a jump instruction with no arithmetic or logical operation specified. This instruction is executed while waiting for the data to get to the CP. Execution of the instruction 315 causes a jump to instruction location 42. The instruction at location 42 is another jump instruction which clears the Memory Resume flip-flop, stops the VAT clock and jumps to instruction location 300. The VAT is now stopped, and is ready to begin execution of the VTOA routine again when the routine is initiated by a signal from the CP.

Figure 32:
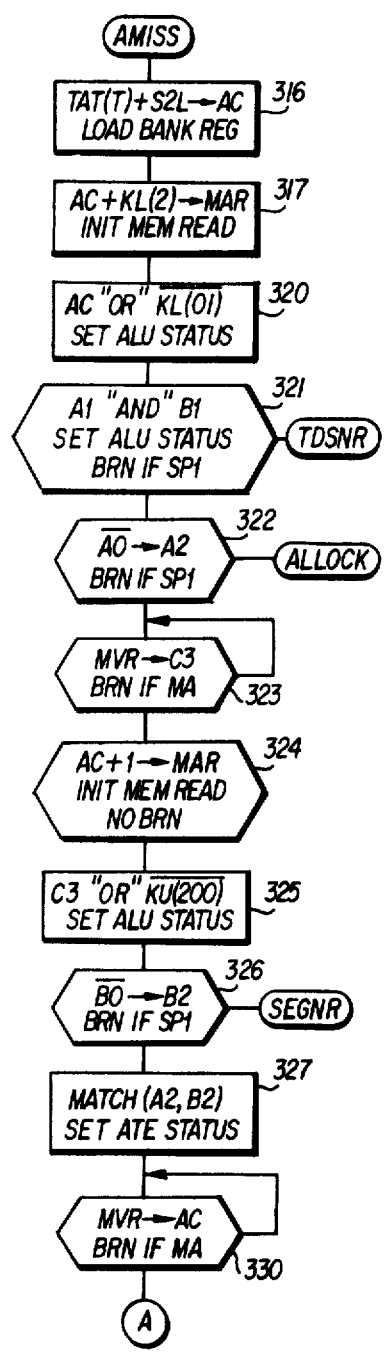

If, during execution of instruction 305, it is determined that an associative miss was the cause of the address translation error, it means that the subsegment descriptor must be loaded into CAM/WAM in order to complete the VTOA routine. Execution of the instruction at location 305 causes a branch to instruction location 316 (FIG. 32). The instruction at this location reads the TAT descriptor from the TAT location specified by the task name. The DW field of the TAT descriptor controls Masking circuit 1918 and the ICDAT 1 Shifter 1916 to read out the S field of the virtual address from the CIDAT 1 Shifter. This S field is then gated onto the XA bus with a shift of two places to the left and applied to ALU 2000. The absolute base address from the TAT descriptor is applied over the YA bus to the ALU where it is added to the shifted S field. The output of the ALU is stored in the accumulator register 1100. This places in the accumulator register the address of word 0 of the three words to be read from memory to form the new subsegment descriptor.

The VAT advances to instruction 317 and during this instruction the constant value 2 from the instruction word is added to the contents of the accumulator register as they pass through the ALU to MAR 1340. At this point, Bank Register 1342 and MAR 1340 hold the address of word 2 of the three words to be read from memory. When MAR is loaded, a signal is sent to Memory 150 to initiate a memory operation to read word 2 from the memory.

While the VAT is waiting for word 2 to come from the memory, it makes two check operations. Instruction 320 has the constant value 1 in its M2 field and this value is applied to the arithmetic logic unit along with the contents of AC 1100. If the low order bit from the accumulator is not 0, it is an indication that the Task descriptor segment is not resident in memory. Note in FIG. 45 that the residency bit is actually the low order bit of the absolute address in the TAT descriptor, and one of the constraints on the system is that this bit must be a 0. If it is not, bit 2 of ALU Status Register 2102 is set and the VAT continues to instruction 321.

Instruction 321 is a branch instruction which tests ALU status and if bit 2 was set during instruction 320, a branch is made to the instruction at address 351.

In FIG. 38, the instruction 351 forms abnormal condition status word 0 by transferring the task and the constant value 12 through ALU 2000 to AC 1100. The VAT then executes instruction 352 which is a jump instruction to instruction 306. This takes the VAT back into the sequence illustrated in FIG. 31.

Instruction 321 also gates the Lock/Unlock word from GSA/B 1 to ALU 2000, and if all CAM/WAM entries are locked, the ALU produces a signal to set stage 2 of the ALU Status Register. If all bits of GSA/B 1 are ones, it means that all addresses in the CAM/WAM are locked so that no subsegment descriptors contained therein may be removed. If this is true, then of course there is no location available to store word 2 of the descriptor which has been requested from memory.

Figure 37:
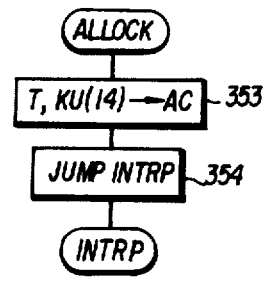

The VAT then executes instruction 322 where it transfers the lower half of the Full/Clear word from GSA 0 to ALU, complements it, stores the result in GSA 2, and tests to see if ALU status was set during instruction 321. If it was set, a branch is made to the instruction at address 353. In FIG. 37, instruction 353 forms the abnormal condition status word 0 by passing the T field and the constant value 14 through the ALU to AC. The VAT then executes instruction 354 which is a jump instruction back to instruction 306 in the sequence shown in FIG. 31.

The VAT then executes instruction 323 which is a branch instruction. If word 2 from the memory, requested during instruction 317, is not yet available, the Memory Active flip-flop is still set so instruction 323 branches back on itself until word 2 is available from the memory and the flip-flop is reset. Instruction 323 then transfers word 2 from the MVDR register 304 to GSC 3.

Instruction 324 computes the address of word 1 of the subsegment descriptor and enters it into MAR. AC 1100 still holds the address placed therein during execution of instruction 316 and this value is read through the ALU with a forced carry to add 1 to it. The result is entered into MAR and the VAT sends out a signal to initiate another memory read operation to read word 1 of the new subsegment descriptor from Memory 150.

While the VAT is waiting for word 1 to be returned from the memory, it executes instruction 325 to set stage 2 of ALU status if the subsegment is not resident in memory. Word 2, which contains the subsegment residency bit, is standing in GSC 3 with the residency bit in the high order position. If this bit is a one, it indicates that the desired segment is not resident in real memory. C3 is OR'ed with the complement of the constant value 200 from the instruction word and the output of the ALU sets the ALU status register if the subsegment is not resident, as indicated by the residency bit.

Instruction 326 checks ALU status and if status register stage 2 is set, a branch occurs to address 355. In addition, instruction 326 transfers the complement of the upper half of the Full/Clear word from GSB 0 to GSB-2. The instruction at address 355 forms an abnormal condition status word 0 by transferring the T field and the constant value 13 through the ALU to AC. The VAT then executes instruction 356 which is a jump instruction back to address 306 of the sequence shown in FIG. 31.

If there is no branch at instruction 326 then instruction 327 is executed. The instruction at address 327 loads the Hit Register 2218 with the "clear" location address from GSA/B 2. The instruction also sets address translation error status.

Instruction 330 is a branch instruction which tests to see if the Memory Active flip-flop is still set. If it is set, the instruction branches on itself until the flip-flop is reset, this being an indication that the memory has completed the requested read cycle and word 1 of the subsegment descriptor is available in MVDR 304. The instruction transfers word 1 from MVDR to AC 1100.

Figure 33:
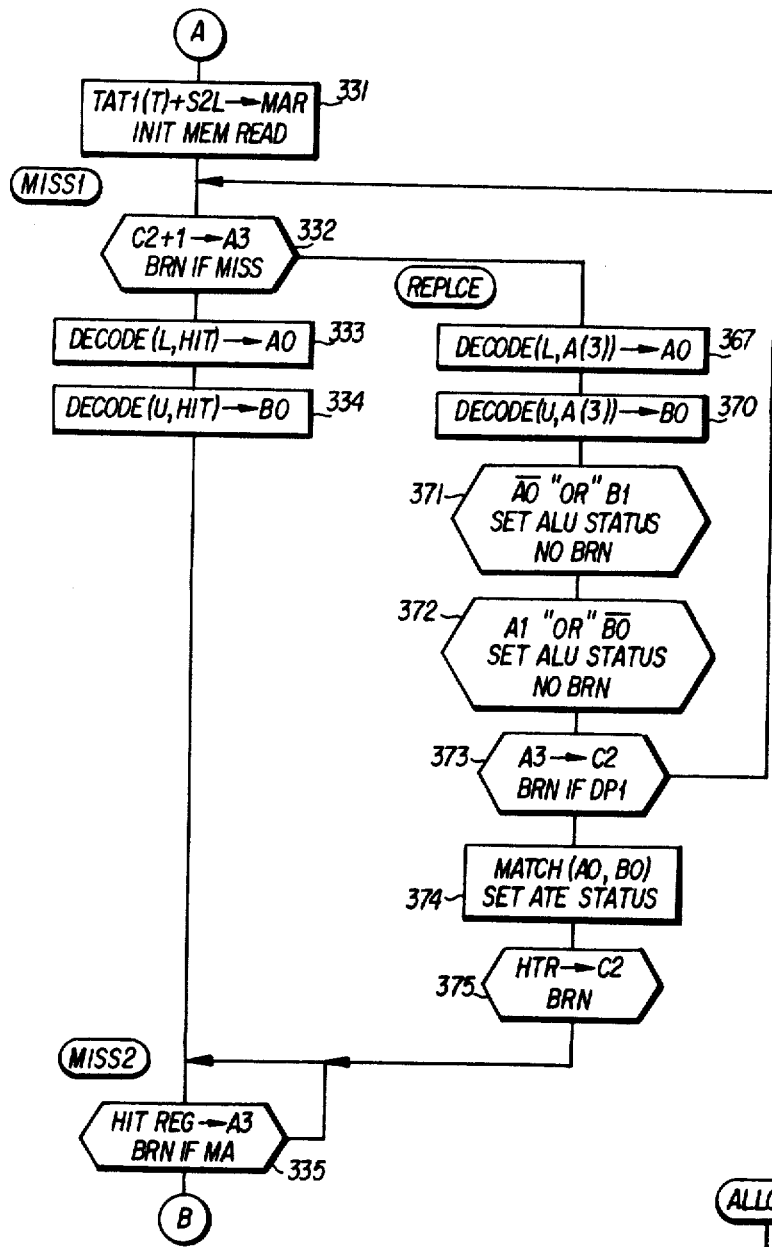

Next, the VAT executes instruction 331 (FIG. 33) to initiate a memory read operation for reading word 0 of the subsegment descriptor from the memory. Instruction 331 transfers the absolute base address from the TAT descriptor, and the S field left shifted two positions, to the ALU and the output of the ALU is gated into MAR 1340. As soon as MAR is loaded, the VAT initiates the memory read cycle and moves on to instruction 332.

Instruction 332 is a branch instruction which updates the round robin pointer from GSC 2, stores it in GSA 3, and causes a branch to the instruction at address 367 if the branch test indicates that a miss has occurred. During execution of instruction 327, the Hit Register was loaded with a "clear" location address. However, if the output of GSA/B2 (the Full/Clear word) indicated that there were no locations in the CAM/WAM that did not contain an entry then the high order stage of the Hit Register was set, and it will be generating the Miss signal.

The branch instruction 367 initiates a round robin replacement algorithm to locate an unlocked subsegment descriptor. Instructions 367 and 368 are executed to convert the binary value in the Hit Register into a 32 bit linear select address. During instruction 367 the lower half of this address is developed and stored in GSA 0. During instruction 368 the upper half of the address is developed and stored in GSB 0.

The complement of the content of GSA 0 is fed to ALU along with the contents of GSB 1 during instruction 371 and stage 2 of the ALU status register is set if the output of the ALU indicates the CAM/WAM entry is locked. A similar operation takes place during instruction 372 except that this time the contents of GSA 1 are ORed with the complement of the contents of GSB 0. If instruction 372 determines that the CAM/WAM entry is locked, it sets stage 2 of the ALU Status Register if it has not already been set by instruction 371. However, if stage 2 was set by instruction 371 then instruction 372 resets stage 3 of the ALU Status Register.

Instruction 373 transfers the round robin pointer from GSA 3 back to GSC 2. Also, a test is made of ALU status and if stage 3 is reset, a branch is made back to instruction 332. The round robin pointer in GSC 2 is again fed through the ALU where it is incremented by 1 and then returned to GSA 3. A branch is again taken to the instruction at address 367 and a check made to see if the address designated by the incremented round robin pointer is locked. The loop of instructions including instructions 332 and 367-373 is repeated until the round robin pointer is incremented to a value representing a CAM/WAM address that is not locked. When this condition occurs, the loop is broken by instruction 373 which tests and finds that stage 3 of the ALU Status Register is not set. The VAT then steps to instruction 374 where the linear select address from GSA/B 0 is passed through the encoder 2200 to enter a binary address into the Hit Register 2218. This address is the one into which the subsegement descriptor will be entered.

The VAt executes instruction 375 which updates the round robin pointer by transferring the contents of the Hit Register to GSC 2. Instruction 375 then unconditionally branches to instruction 335.

Instruction 335 transfers the replacement address from the Hit Register to GSA 3 and branches on itself if the Memory Active flip-flop is still set. When the Memory Active flip-flop is reset, it is an indication that word 0 has been made available by the memory and is present in MVDR.

To summarize at this point, MVDR contains word 0 of the subsegment descriptor, AC contains word 1, and word 2 is stored in GSC 3. The CAM/WAM replacement pointer is in GSA 3. GSA/B 0, 1 and 2 hold a 32 bit linear select address, the 32 bit Lock/Unlock word, and the complement of the Full/Clear word, respectively. GSC 0 and 1 are still reserved for words 0 and 1 of an abnormal status word, and GSC 2 holds the Round Robin Pointer.

Referring again to that point in the sequence where instruction 332 is executed, if the test of the branch condition does not indicate a miss, then the Hit Register contains the clear location. The VAT then executes instructions 333 and 334 to generate the lower and upper halves of a 32 bit linear select address corresponding to the value in the Hit Register. The lower half is entered into GSA 0 and the upper half is entered into GSB 0. The VAT then steps to instruction 335 described above.

Since one of the subsegment descriptors is being replaced, it is necessary to send a five word "miss message" to PMP 153. This miss message comprises five 16-bit words. Word 1 has the value 10 in bits 15 and 14, and bits 0-4 contain the cell number of the CAM/WAM descriptor being flushed. Word 2 contains the contents of the flushed hit counter. Words 3 to 5 contain information on the new CAM/WAM segment descriptor. Word 3 carries the subsegment number, word 4 carries the bank address and task name, and word 5 contains the absolute address.

After execution of instruction 335, the VAT forms the first word of the hit message. The VAT executes instruction 336 wherein the ALU performs a logical OR operation on a first operand obtained from the Hit Register and a second operand which is the constant value 200 from the instruction. The result is entered into GSB 3. The VAT then executes instruction 337 to check the Memory Resume flip-flop to see if a memory resume error occurred when fetching the CAM/WAM descriptor. If the branch condition is met and a memory resume error occurred, a branch is made to instruction location 345.

In FIG. 36, instruction 345 passes the contents of GSA 2 through the ALU, complements it, and stores the result in GSA 0. This restores the lower half of the full/clear word to GSA 0. Next, instruction 346 transfers the contents of GSB 2 to the ALU, complements it, and stores the result in GSB 0. This restores the upper half of the Full/Clear word to GSB 0. Next, instruction 347 is executed to form abnormal condition status word 0. This is formed by passing T and the constant value 15 from the instruction through the ALU and storing the result in the accumulator. The VAT then executes instruction 350 which is a jump instruction returning the program to instruction 306 of the sequence shown in FIG. 31.

Figure 34:
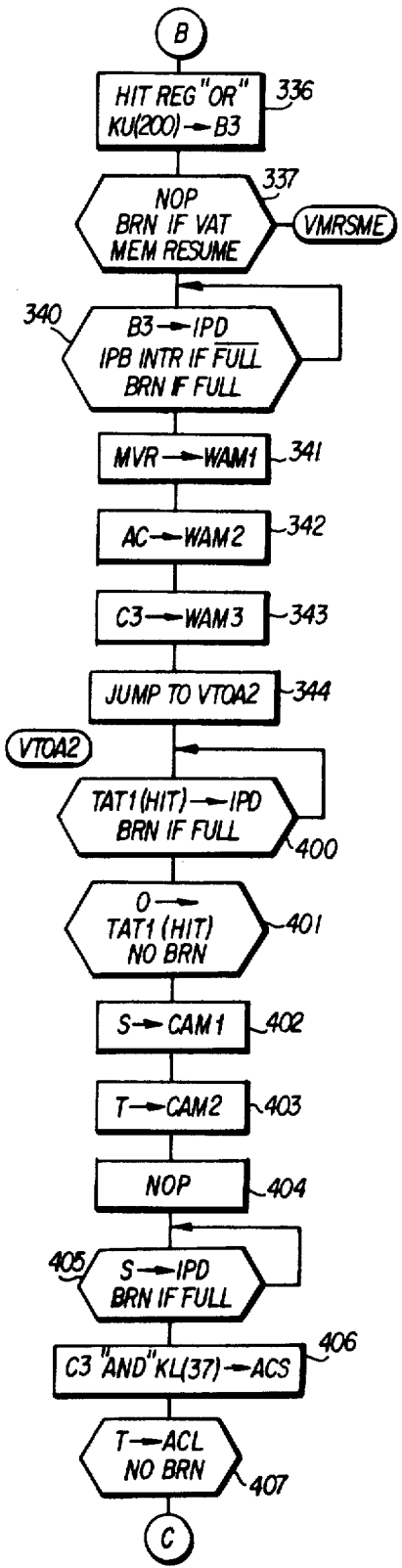

Returning to FIG. 34, if the VAT executes instruction 337 and does not find a memory resume error, it advances to instruction 340 to transfer the first miss message word from GSB 3 to the IPB Data Register 1204. This word has the cell number of the flushed CAM/WAM descriptor in bits 0-4 and has the value 10 in the two high order bits, this value having been placed iin B3 during execution of instruction 336. If the register stack in PMP 153 is full so that is cannot accept this first word of the miss message, the PMP is producing the signal IPB FULL on lead 1290. This causes instruction 340 to branch on itself until the register stack in PMP can accept the miss message word. At this time the signal IPB FULL is terminated and the VAT produces an interrupt signal to PMP for the purpose of transferring the first miss message word.

The VAT then steps to instruction 341 where it transfers the contents of MVDR 304 to WAM 1. This loads word 0 of the new subsegment descriptor into WAM 1. The VAT then executes instruction 342 to transfer the contents of AC 1100 to WAM 2. This loads word 1 of the subsegment descriptor in the WAM 2. Next, instruction 343 is executed to transfer the contents of GSC 3 to WAM 3. This loads word 2 of the subsegment descriptor into WAM 3.

Instruction 344 is a jump instruction with no other operation being performed other than causing the program to jump to the instruction at location 400. Instruction 400 causes the contents of the hit counter in TAT 1 associated with the flushed CAM/WAM cell to be transferred to the IPB Data Register 1204. Instruction 400 may branch on itself in the same manner as instruction 340 until PMP is ready to accept the word. When it is, instruction 400 sends an to PMP the second word of the miss message. Instruction 401 then resets the flushed hit counter by transferring a 0 value thereto.

The VAT next loads the S,T tag into the CAM. Instruction 402 loads S into CAM 1 while instruction 403 loads T into CAM 2. At this point in the routine, the new subsegment descriptor and its tag have been loaded into CAM/WAM. However, the routine must continue in order to send the last three words of the miss message to the PMP and perform other housekeeping chores.

Instruction 404 performs no useful function other than causing the program to jump to instruction 405. Instruction 405 loads S into the IPB Data Register. If the processor is returning an IPB FULL signal to the VAT, then instruction 405 branches on itself until this signal is terminated.

At this time GSC 3 holds the bank address and task name relating to the newly-stored CAM/WAM subsegment descriptor, with the bank address being in bit positions 0-4. Instruction 406 reads out the contents of GSC 3 to the ALU where it is ANDed with the constant value 37 from the instruction. The result is the bank address, and this bank address is entered into the upper half of AC 1100. Instruction 407 then transfers the task name to the lower half of the AC.

While the VAT is waiting for PMP to accept miss message word 3, it proceeds with instruction 410 which is a housekeeping instruction that transfers the lower half of the linear address in GSA 0 to GSB 3. The VAT then executes instruction 411 while it waits for the performance monitor processor. Instruction 411 is a no operation instruction which causes a jump to instruction 412. Instruction 412 transfers the fourth word of the miss message to the IPB Data Register and branches on itself until such time as PMP indicates that it can accept the data. The VAT then steps to instruction 413.

Instruction 413 updates and restores the lower half of the Full/Clear word to GSA 0. The complement of the lower half of the Full/Clear word is in GSA 2. This value is read out to the ALU where it is ORed with the lower half of the linear address from GSB 3. The result is then entered into GSA 0.

Instruction 414 next transfers the upper half of the linear address from GSB 0 to GSC 3. Instruction 415 then updates and restores the upper half of the Full/Clear word to GSB 0. The complement of the upper half of the Full/Clear word is in GSB 2. This value is read out and ORed with the upper half of the linear address read from GSC 3, and the output of the ALU is returned to GSB 0.

Instruction 416 is a no operation jump instruction which causes a jump to instruction 417. This latter instruction sends the absolute address field of the new CAM/WAM subsegment descriptor, still contained in MVDR 304 to the IPB Data Register 1204. Instruction 417 branches on itself as long as the register stack in the performance monitor processor is full. When PMP signals that it can accept the data, the VAT sends the fifth word of the miss message to PMP.

The VAT then executes instruction 420 which enters a 0 value into GSC 3 and this is followed by instruction 421 which is a jump instruction back to the instruction at address location 300. As will be seen in FIG. 31, this is the entry point for the VTOA sequence.

In summary, if the CP 152 issues a virtual address and the search of CAM/WAM reveals that the subsegment descriptor is not present therein, the VAT branches to a subroutine which loads the desired subsegment descriptor into CAM/WAM if it is available in real memory, generates a miss message of five words which is sent to the performance monitor processor 153, and then returns to the beginning of the VTOA sequence to generate the absolute address necessary for accessing the memory and permitting a transfer between the memory and the central processor.

CP-VAT COMMUNICATION

Table V, above, lists the various entry addresses into routines that are carried out for the purpose of CP-VAT communications, as opposed to CP-Memory communications. The initialization sequence is utilized to initialize the VAT circuits and load initial values into the GSA, GSB and GSC stacks. The Read Abnormal Status sequence is used to transfer to the CP the abnormal status words from GSC 0 and 1 if any are loaded therein during a VTOA routine. The Load TAT sequence loads the TAT. The clear Task sequence removes all subsegment descriptors of a named task from the CAM/WAM. The Lock Subsegment and Unlock Subsegment sequences are utilized to insert new Lock/Unlock words in GSA/B 1. The Performance Dump Sequence is utilized to direct the VAT to unload all 32 hit counts from TAT and send them to the Performance Monitor Processor. As the name implies, the load CAM/WAM sequence allows the CP to load the CAM/WAM.

All of the above sequences are initiated by the CP. Since knowledge of these sequences is not necessary for an understanding of the present invention, further details are not presented here for the sake of brevity.

While a specific embodiment of the invention has been described in great detail, it will be understood that various substitutions and modifications may be made therein without departing from the spirit and scope of the invention as defined by the appended claims.

| | | | | | | | | | | | |
|---|---|---|---|---|---|---|---|---|---|---|---|
| | | | | | | | MICRO-CODE LISTING | | | | |
| | | | | | | | MEMORY RESUME (CP) ENTRANCE POINT | | | | |
| 040 | 01 | 06 | 15 | 14 | 16 | 00 | 016 | | RKL | T,KU,ACN | OR,D1 | 016 |
| 041 | 16 | 17 | 17 | 00 | 02 | 0306 | | | MCJ | ZZ,ZZ,NNNN | JP | INTRP |
| 042 | 16 | 17 | 17 | 03 | 02 | 0300 | | INTR3 | MCJ | ZZ,ZZ,NNRS | JP | VTOA |
| | | | | | | VTOA IS THE VIRTUAL TO ABSOLUTE TRANSLATION AND CAM/WAM DESCRIPTOR REPLACEMENT ROUTINE SETADR 0300 | | | | | | |
| 300 | 12 | 04 | 04 | 17 | 04 | 10 | 3 00 | VTOA | MRA | D,W1,ARV | AD,D2 | ASB,SO |
| 301 | 00 | 13 | 00 | 14 | 05 | 02 | 2 05 | | ROA | C3, RT1,ACN | ADF,DLS ATE,T-RNERR | |
| 302 | 01 | 07 | 02 | 00 | 17 | 10 | 1 00 | VTOA1 | ROL | AC,WT1,NOD | X,D2 | SNC,VTOA |
| 303 | 05 | 15 | 04 | 12 | 17 | 14 | 1 03 | | R2L | HTR,BO,IPD | X,D2I | IPF,$ |
| 304 | 01 | 00 | 04 | 00 | 03 | 10 | 0 00 | | ROL | A0,B0,N0 | ZERO D2 | STP,VTOA |
| | | | | | | ADDRESS TRANSLATION ERROR ENTRY POINT | | | | | | |
| 305 | 01 | 06 | 10 | 10 | 16 | 00 | 3 | 16TRNERR | ROL | T,PEC,ACN | OR,D1 | ASM,ASMISS |
| | | | | | | INTERRUPT ENTRY POINT | | | | | | |
| 306 | 05 | 00 | 04 | 00 | 03 | 10 | 3 06 | INTRP | R2L | A0,B0,NOD | ZERO,D2 | MA,$ |
| 307 | 11 | 00 | 04 | 00 | 03 | 10 | 1 57 | | R4L | A0,B0,NOD | ZERO,D2 | ST1,DSPREF |
| 310 | 11 | 00 | 04 | 00 | 03 | 10 | 0 13 | | R4L | AO,BO,NOD | ZERO,D2 | ST0,INTR1 |
| 311 | 05 | 07 | 04 | 10 | 17 | 00 | 0 00 | | R2L | AC,B0,C0 | X,D1 | NBR,0 |
| 312 | 05 | 05 | 04 | 11 | 17 | 00 | 0 00 | | R2L | SD,B0,C1 | X,D1 | NBR,0 |
| 313 | 16 | 17 | 15 | 10 | 02 | 0314 | | INTR1 | MCJ | ZZ,ZS,INNN | JP | INTR2 |
| 314 | 15 | 00 | 16 | 13 | 03 | 00 | 0 00 | INTR2 | MWL | 00,MVR,C3 | ZERO,D1 | N0,S0 |
| 315 | 16 | 17 | 17 | 00 | 02 | 0042 | | | MCJ | ZZ,ZZ,NNNN | JP | INTR3 |
| | | | | | | ASSOCIATIVE MISS ENTRY POINT | | | | | | |
| 316 | 12 | 05 | 02 | 14 | 04 | 00 | 1 00 | ASMISS | MRA | S2L,T1T,ACN | AD,D1 | B,S0 |
| 317 | 00 | 07 | 14 | 04 | 10 | | 002 | | RKA | AC,KL,ARR | AD,D2 | 002 |
| 320 | 01 | 07 | 14 | 00 | 15 | 12 | 001 | | RKL | AC,KL,NOD | XONY,D2S | 001 |
| 321 | 03 | 01 | 05 | 00 | 13 | 12 | 1 51 | | R1L | A1,B1,NOD | AND,D2S | SP1,TDSNR |
| 322 | 03 | | | 00 | 00 | | 1 53 | | R1L | A0,B0,A2 | NX,D1 | SP1,ALLOC |
| 323 | 05 | 16 | 04 | 13 | 17 | 00 | 3 23 | | R2L | MVR,B0,C3 | X,D1 | MA,$ |
| 324 | 04 | 07 | 04 | 14 | 01 | 10 | 0 00 | | R2A | AC,BO,ARR | XXF,D2 | NBR,0 |
| 325 | 01 | 13 | 15 | 00 | 15 | 12 | 200 | | RKL | C3,KU,NOD | XONY,D2S | 0200 |
| 326 | 03 | 00 | 04 | 06 | 05 | 00 | 1 55 | | R1L | A0,B0,B2 | NY,D1 | SP1,SEGNR |
| 327 | 13 | 06 | 13 | 00 | 16 | 10 | 2 12 | | MRL | MTL,MTU,NOD | OR,D2 | AS,F2 |
| 330 | 05 | 16 | 04 | 14 | 17 | 00 | 3 30 | | R2L | MVR,B0,ACN | X,D1 | MA,$ |
| 331 | 12 | 05 | 02 | 14 | 04 | 10 | 0 00 | | MRA | S2L,T1T,ARR | AD,D2 | NO,S0 |
| 332 | 00 | 12 | 04 | 03 | 01 | 00 | 3 | 67MISS1 | ROA | C2,B0,A3 | XXf,D1 | ASM,REPLCE |
| 333 | 13 | 00 | 13 | 00 | 17 | 00 | 0 13 | | MRL | DLH,MTU,A0 | X,D1 | NO,F3 |
| 334 | 13 | 01 | 13 | 04 | 17 | 00 | 0 13 | | MRL | DUH,MTU,B0 | X,D1 | NO,F3 |
| 335 | 05 | 15 | 04 | 03 | 17 | 00 | 3 | 35MISS2 | R2L | HTR,B0,A3 | X,D1 | MA,$ |
| 336 | 01 | 15 | 15 | 07 | 16 | 00 | 200 | | RKL | HTR,KU,B3 | OR,D1 | 0200 |
| 337 | 07 | 00 | 04 | 00 | 03 | 10 | 0 45 | | R3L | A0,B0,NOD | ZERO,D2 | VMR,VMRSME |
| 340 | 05 | 00 | 07 | 12 | 12 | 14 | 1 40 | | R2L | A0,B3,PID | Y,D2I | IPF,$ |
| 341 | 15 | 16 | 04 | 00 | 17 | 10 | 0 10 | | MWL | MVR,W1,NOD | X,D2 | NO,F0 |
| 342 | 15 | 07 | 05 | 00 | 17 | 10 | 0 10 | | MWL | AC,W2,NOD | X,D2 | NO,F0 |
| 343 | 15 | 13 | 06 | 00 | 17 | 10 | 0 10 | | MWL | C3,W3,NOD | X,D2 | NO,F0 |
| 344 | 16 | 17 | 17 | 00 | 02 | 0400 | | | MCJ | ZZ,ZZ,NNNN | JP | VTOA2 |
| | | | | | | VAT MEMORY RESUME ENTRY POINT | | | | | | |
| 345 | 05 | 02 | 04 | 00 | 00 | 00 | 0 | 00VMRSME | R2L | A2,B0,A0, | NX,D1 | NBR,0 |
| 346 | 05 | 00 | 06 | 04 | 05 | 00 | 0 | 00 | R2L | A0,B2,B0 | NY,D1 | NBR,0 |
| 347 | 01 | 06 | 15 | 14 | 16 | 00 | 015 | | RKL | T,KU,ACN | OR,D1 | 015 |
| 350 | 16 | 17 | 17 | 00 | 02 | 0306 | | | MCJ | ZZ,ZZ,NNNN | JP | INTRP |
| | | | | | | TDS NOT RESIDENT ENTRY POINT | | | | | | |
| 351 | 01 | 06 | 15 | 14 | 16 | 00 | | 012TDSNR | RKL | T,KU,ACN | OR,D1 | 012 |
| 352 | 16 | 17 | 17 | 00 | 02 | 0306 | | | MCJ | ZZ,ZZ,NNNN | JP | INTRP |
| | | | | | | C/W ENTRIES ALL LOCKED ENTRY POINT | | | | | | |
| 353 | 01 | 06 | 15 | 14 | 16 | 00 | | 014ALLOCK | RKL | T,KU,ACN | OR,D1 | 014 |
| 354 | 16 | 17 | 17 | 00 | 02 | 0306 | | | MCJ | ZZ,ZZ,NNNN | JP | INTRP |
| | | | | | | SUBSEGMENT SEGMENT NOT RESIDENT ENTRY POINT | | | | | | |
| 355 | 01 | 06 | 15 | 14 | 16 | 00 | | 013 SEGNR | RKL | T,KU,ACN | OR,D1 | 013 |
| 356 | 16 | 17 | 17 | 00 | 02 | 0306 | | | MCJ | ZZ,ZZ,NNNN | JP | INTRP |
| | | | | | | ROUND ROBIN REPLACEMENT ALGORITHM EMTRY POINT | | | | | | |
| 367 | 13 | 02 | 13 | 00 | 17 | 00 | 0 13 | REPLCE | MRL | DLD,MTU,A0 | X,D1 | NO,F3 |
| 370 | 13 | 03 | 13 | 04 | 17 | 00 | 0 13 | | MRL | DUD,MTU,B0 | X,D1 | NO,F3 |
| 371 | 05 | 00 | 05 | 00 | 10 | 12 | 0 00 | | R2L | A0,B1,NOD | NXOYD2S | NBR,0 |
| 372 | 05 | 01 | 04 | 00 | 15 | 12 | 0 00 | | R2L | A1,B0,NOD | XONY,D2S | NBR,0 |
| 373 | 03 | 03 | 04 | 12 | 17 | 00 | 2 32 | | R1L | A3,B0,C2 | X,D1 | DP1,MISS |
| 374 | 13 | 06 | 13 | 00 | 16 | 10 | 2 10 | | MRL | MTL,MTU,NOD | OR,D2 | AS,F0 |
| 375 | 03 | 15 | 04 | 12 | 17 | 00 | 0 35 | | R1L | HTR,B0,C2 | X,D1 | UBR,MISS |
| | | | | | | CONTINUATION OF VTOA ROUTINE SETADR 0400 | | | | | | |
| 400 | 05 | 00 | 00 | 12 | 12 | 10 | 1 00 | VTOA2 | R2L | A0,RT1,IPD | Y,D2 | IPF,$ |
| 401 | 05 | 00 | 02 | 00 | 17 | 10 | 0 00 | | R2L | 00,WT1,NOD | X,D2 | NBR,0 |
| 402 | 15 | 00 | 10 | 00 | 03 | 10 | 0 00 | | MWL | 00,CM1,NOD | ZERO,D2 | NO,S0 |
| 403 | 15 | 00 | 11 | 00 | 03 | 10 | 0 00 | | MWL | 00,CM2,NOD | ZERO,D2 | NO,S0 |
| 404 | 16 | 17 | 17 | 00 | 02 | 0405 | | | MCJ | ZZ,ZZ,NNNN | JP | $+1 |
| 405 | 05 | 04 | 04 | 12 | 17 | 10 | 1 05 | | R2L | S,B0,IPD | X,D2 | IPF,$ |
| 406 | 01 | 13 | 14 | 17 | 13 | 00 | 037 | | RKL | C3,KL,ACS | AND,D1 | 037 |
| 407 | 05 | 06 | 04 | 16 | 17 | 00 | 0 00 | | R2L | T,B0,ACL | X,D1 | NBR |
| 410 | 05 | 00 | 04 | 07 | 17 | 00 | 0 00 | | R2L | A0,B0,B3 | X,D1 | NBR,0 |
| 411 | 16 | 17 | 17 | 00 | 02 | 0412 | | | MCJ | ZZ,ZZ,NNNN | JP | $+1 |
| 412 | 05 | 07 | 04 | 12 | 17 | 10 | 1 12 | | R2L | AC,B0,IPD | X,D2 | IPF,$ |
| 413 | 05 | 02 | 07 | 00 | 10 | 00 | 0 00 | | R2L | A2,B3,A0 | NXOY,D1 | NBR,0 |
| 414 | 05 | 00 | 04 | 13 | 12 | 00 | 0 00 | | R2L | A0,B0,C3 | Y,D1 | NBR,0 |
| 415 | 05 | 13 | 06 | 04 | 15 | 00 | 0 00 | | R2L | C3,B2,B0 | XONY,D1 | NBR,0 |
| 416 | 16 | 17 | 17 | 00 | 02 | 0417 | | | MCJ | ZZ,ZZ,NNNN | JP | $+1 |
| 417 | 05 | 16 | 04 | 12 | 17 | 10 | 1 17 | | R2L | MVR,B0,IPD | X,D2 | IPF,$ |
| 420 | 05 | 00 | 04 | 13 | 03 | 00 | 0 00 | | R2L | A0,B0,C3 | ZERO,D1 | NBR,0 |
| 421 | 16 | 17 | 17 | 00 | 02 | 0300 | | | NCJ | ZZ,ZZ,NNNN | JP | VTOA |

The embodiments of the invention in which an exclusive property or privilege is claimed are defined as follows:

1. In a virtual addressing system including a central processor, a main memory having addressable word locations, a virtual address translator responsive to virtual addresses from said central processor for accessing a word location in said main memory, and means for transferring a word between an accessed location in said main memory and said central processor, the improvement comprising:
    means in said central processor for storing first and second task names defining instruction storage space and operand storage space, respectively,
    means in said central processor for generating subsegment and deflection field portions of a virtual address each time said memory is to be accessed; and,
    means in said central processor for selecting said first or said second task name as a portion of the virtual address depending upon whether said virtual address, after translation, is for accessing said main memory for instruction or operand purposes, respectively.

2. The improvement as claimed in claim 1 wherein the means for storing said first and second task names comprises a single register, said means for selecting including a selector for selecting one of said names and control circuit means for controlling said selector.

3. In a data processing system including a virtual address translator, a memory addressed by said virtual address translator, and a central processor for generating virtual addresses including a task name, the improvement wherein said central processor comprises:
    first means generating a virtual address including a first task name each time an instruction reference to memory is desired;
    second means generating a virtual address including a second task name each time an operand reference to memory is desired; and,
    means controlling said second means to change the task name generated thereby,
    whereby said central processor may operate in a program utilizing instructions from instruction storage space in said memory and operands from either of two operand storage spaces in said memory.

4. The improvement as claimed in claim 3 wherein one of said second task names is the same as said first task name.

5. In a virtual addressing system including a central processor, a main memory having addressable word locations, and a virtual address translator for translating virtual addressed generated by said central processor into absolute memory addresses for addressing said main memory, the improvement comprising:
    means in said central processor for generating a virtual address having task name, subsegment number and deflection fields;
    associative memory means in said translator having a plurality of cells each storing a tag and an associated subsegment descriptor, each subsegment descriptor including an absolute base address and a bounds field defining the size of the subsegment;
    means in said translator for applying the task name and subsegment number of said virtual address to said associative memory as a search tag word, said associative memory means including means for reading out the subsegment descriptor associated with a tag matching said search tag word;
    means in said translator combining an absolute base address read from said associative memory means with the deflection field of said virtual address to obtain an absolute memory address;
    means in said translator responsive to said absolute memory address for addressing a word location in said main memory; and
    means for transferring a word between said central processor and the addressed word location;
    said means generating a virtual address including means generating a first task name for instruction references to said memory and means generating a second task name for operand references to said main memory.

6. The improvement as claimed in claim 5 wherein said translator includes comparing means for comparing the bounds field of each subsegment descriptor read from the associative memory means with the deflection field of the virtual address which caused the subsegment descriptor to be read from the associative memory means, said comparing means producing a bounds error signal if the deflection field is greater than the bounds field.

* * * * *

UNITED STATES PATENT AND TRADEMARK OFFICE
CERTIFICATE OF CORRECTION

PATENT NO. : 4,096,568

DATED : June 20, 1978

INVENTOR(S) : Donald Bruce Bennett, Leo John Slechta, Jr. and Thomas Ormond Wolff It is certified that error appears in the above-identified patent and that said Letters Patent are hereby corrected as shown below:

Column 28, line 64, add two new lines to the chart in the right-most column and reading--Right symbol implies STATUS 0,2 Left symbol implies STATUS 1,3--.

Column 33, line 45, "FB" should appear in the column headed hexadecimal output.

Column 52, line 21, for "Cp" read--CP--.

Column 74, line 7, for "addressed" read--addresses--.

Column 74, line 35, for "said memory" read--said main memory--.

The following corrections apply to the micro-code listing appearing at columns 71 and 72. The numbers appearing in the leftmost column of the listing are utilized as the line numbers for identifying the location of the following corrections.

Line 301, for "ADF,DLS" read--ADF,D1S--.

Line 301, last column, insert--ATE,TRNERR--.

Between lines 301 and 302, cancel "ATE,T-RNERR".

Line 305, for "01 06 10 10 16   00    3      16TRNERR" read-- 01 06 10 14 16 00    3 16TRNERR--.

Line 322, for "03                00  00" read-- 03 00 04 02 00 00--.

Line 322, for "SP1,ALLOC" read--SP1,ALLOCK--.

Line 332, for "XXf,D1" read--XXF,D1--.

Line 340, for "A0,B3,PID" read--A0,B3,IPD--.

Between lines 354 and 355, cancel "SEGMENT".

Between lines 356 and 367, for "EMTRY" read--ENTRY--.

Line 371, for "NXOYD2S" read--NXOY,D2S--.

Line 373, for "DP1,MISS" read--DP1,MISS1--.

Line 375, for "UBR,MISS" read--UBR,MISS2--.

UNITED STATES PATENT AND TRADEMARK OFFICE
CERTIFICATE OF CORRECTION

PATENT NO. : 4,096,568
DATED : June 20, 1978
INVENTOR(S) : Donald Bruce Bennett, Leo John Slechta, Jr. and Thomas Ormond Wolff It is certified that error appears in the above-identified patent and that said Letters Patent are hereby corrected as shown below:

Column 19, line 62 through Column 20, line 6, the chart should read:

| Octal Code | MNEM | |
|---|---|---|
| 00 | ROA | where R → VAT register inst (FORMAT 1) |
| 01 | ROL | 0 → Group 0 Branch |
| 02 | R1A | 1 → Group 1 Branch |
| 03 | R1L | 2 → Group 2 Branch |
| 04 | R2A | 3 → Group 3 Branch |
| 05 | R2L | 4 → Group 4 Branch |
| 06 | R3A | A → Arithmetic ALU operations |
| 07 | R3L | L → Logical ALU operations |
| 10 | R4A | |
| 11 | R4L | |

Column 23, on the line for octal code 01, for "TAt" read --TAT--.
Columns 27 and 28, line 7, for "Branch if Switch Dey Key set" read --Branch if Switch Key 3 set--.

Signed and Sealed this

Twenty-sixth Day of December 1978

[SEAL]

Attest:

RUTH C. MASON
Attesting Officer

DONALD W. BANNER
Commissioner of Patents and Trademarks